United States Patent
Sano et al.

(10) Patent No.: US 6,760,067 B1
(45) Date of Patent: Jul. 6, 2004

(54) IMAGING APPARATUS

(75) Inventors: Toshiyuki Sano, Yokohama (JP); Makoto Sube, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 759 days.

(21) Appl. No.: 09/644,844

(22) Filed: Aug. 24, 2000

(30) Foreign Application Priority Data

Aug. 26, 1999 (JP) ............................................ 11-240513

(51) Int. Cl.[7] .......................... H04N 3/14; H04N 5/217
(52) U.S. Cl. ...................... 348/241; 348/250; 348/297; 348/312; 348/622; 382/265; 708/320
(58) Field of Search .................. 348/207.99, 222.1, 348/229.1, 241, 242, 243, 250, 257, 294, 296–298, 311, 312, 607, 620, 622; 382/254, 260, 265, 270, 275; 358/448, 463; 708/300, 320; H04N 5/217, 3/14

(56) References Cited

U.S. PATENT DOCUMENTS

| | | | | |
|---|---|---|---|---|
| 4,679,086 A | * | 7/1987 | May ............................ | 348/620 |
| 4,682,251 A | * | 7/1987 | Hirota et al. ................ | 386/114 |
| 5,428,391 A | * | 6/1995 | Murata et al. ............ | 348/240.2 |
| 5,442,462 A | * | 8/1995 | Guissin ....................... | 358/463 |
| 5,719,793 A | | 2/1998 | Nitta et al. .................. | 382/275 |
| 5,838,371 A | * | 11/1998 | Hirose et al. ............. | 348/240.2 |
| 6,144,800 A | * | 11/2000 | Kobayashi ................... | 386/114 |
| 6,512,791 B1 | * | 1/2003 | Takayama ................ | 375/240.01 |

FOREIGN PATENT DOCUMENTS

JP 5236312 9/1993

OTHER PUBLICATIONS

European Search Report dated Mar. 1, 2002.

* cited by examiner

*Primary Examiner*—Ngoc-Yen Vu
(74) *Attorney, Agent, or Firm*—Stevens, Davis, Miller & Mosher, LLP

(57) ABSTRACT

An imaging apparatus includes a CCD for accumulating an image signal by an n-times long-time-accumulation (n is an integer of "1" or more); a timing control circuit for controlling to read out the image signal accumulated in the CCD according to the n-times long-time-accumulation; a memory for storing the read-out image signal for one frame period or more; and a recursive noise reduction circuit for performing a noise reduction process on the basis of the image signal read out from the CCD and the one-frame-period-or-more delayed image signal read out from the memory. In case of the 2n-times long-time-accumulation, in a vertical scanning period in which the image signal is output from the CCD, the image signal from the recursive noise reduction circuit is written to the memory. On the other hand, in a vertical scanning period in which the image signal is not output from the CCD, the writing of the image signal generated by the recursive noise reduction circuit to the memory is inhibited, and the image signal is output as an output signal as it is.

27 Claims, 40 Drawing Sheets

IMAGING APPARATUS

BACKGROUND OF THE INVENTION

1. Field of the Invention

The present invention generally relates to an imaging apparatus, and particularly to an imaging apparatus having a picture memory function to simultaneously achieve a recursive noise reduction circuit (hereinafter, referred to simply as "recursive NR circuit"), and long time accumulation (accumulation sensitivity increase) of CCD.

2. Description of the Related Art

Conventionally, such a recursive NR circuit has been used in a video system in order to reduce noise using a memory. However, semiconductor memories have recently developed to have large capacity at low cost, so that a memory and a recursive NR circuit have been incorporated in an imaging apparatus. Thus, the imaging apparatus have had the combination with various functions using memories.

For example, JP-A-5-23612 describes various functions using a recursive NR circuit and a memory system. Particularly, in the second noise reduction mode, the noise reduction effect is achieved by the recursive NR circuit and the accumulation sensitivity increase over 2-field periods.

Such a conventional imaging apparatus will be described with reference to FIG. 38. FIG. 38 is a schematic block diagram of a conventional imaging apparatus.

The imaging apparatus shown in FIG. 38 includes: a CCD 101 for converting a light image into an electrical image signal; a CDS 102 for sampling the electrical image signal; an A/D circuit 103 for converting the sampled image signal into a digital signal; a recursive NR circuit 104 that performs the recursive filtering process to the digital image signal in the time-axis direction to reduce the noise component of the image signal; a digital process circuit 105 that performs the necessary signal process to the recursive-filtered image signal; a D/A circuit 106 that converts the processed image signal into an analog signal to be output; a field memory 107 for storing an output signal of the recursive NR circuit 104; a field memory control circuit 108 for controlling the field memory 107; and a microcomputer 109 for controlling the whole imaging apparatus.

The field memory control circuit 108 delays the output signal of the recursive NR circuit 104 by one vertical scanning period, and outputs this delayed signal to the recursive NR circuit 104 as a cyclic signal.

The microcomputer 109 controls the cyclic coefficient of the recursive NR circuit 104, and controls the field memory control circuit 108 to write to and read from the field memory 107.

The CCD 101 is controlled by a charge reading pulse from a timing control circuit 110. The accumulation sensitivity increase is achieved when the microcomputer 109 controls the accumulation time that is input to the timing control circuit 110.

FIG. 39 is a timing chart showing the operation timing of this imaging apparatus in the normal operation.

As illustrated in FIG. 39, in the normal operation, the timing control circuit 110 outputs the charge reading pulse to the CCD 101 every vertical scanning period, so that the image signal is output from the CCD 101.

When an image signal x is output from the CCD 101, the cyclic coefficient K which is input from the microcomputer 109 to the recursive NR circuit 104 is set to be k. The recursive NR circuit 104 performs the arithmetic operation using the image signal x and an output signal X-2 of the field memory 107 to output the result as an output signal X. The output signal X is written to the field memory 107.

When an image signal x+1 is output from the CCD 101, the cyclic coefficient K which is input from the microcomputer 109 to the recursive NR circuit 104 is set to be "0". Consequently, the output signal X of the field memory 107 is output from the recursive NR circuit 104 as the output signal X as it is. At this time, the output signal X of the recursive NR circuit 104 is not written to the field memory 107.

FIG. 40 is a timing chart showing the operation timing of this imaging apparatus in a 2-times accumulation sensitivity increase operation.

As illustrated in FIG. 40, when the accumulation sensitivity is increased twice, the timing control circuit 110 outputs the charge reading pulse to the CCD 101 every two vertical scanning periods. Therefore, the CCD 101 accumulates charges for two vertical scanning periods, and outputs the accumulated charges as an image signal.

When an image signal x is output from the CCD 101, the cyclic coefficient K which is input from the microcomputer 109 to the recursive NR circuit 104 is set to be k. The recursive NR circuit 104 performs the arithmetic operation using the image signal x and an output signal X-2 of the field memory 107 to output the result as an output signal X. The output signal X is written to the field memory 107.

When an image signal x+1 is output from the CCD 101, the timing control circuit 110 outputs no charge reading pulse, and hence the CCD 101 outputs no image signal.

Therefore, the cyclic coefficient K which is input from the microcomputer 109 to the recursive NR circuit 104 is set to be "0" so that the output signal X of the field memory 107 is output from the recursive NR circuit 104 as the output signal X as it is. In addition, the output signal X of the recursive NR circuit 104 is not written to the field memory 107.

Thus, the accumulation sensitivity can be increased twice, and at the same time the recursive NR can be achieved. Both of the sensitivity increase and the noise reduction can be attained.

In the above conventional imaging apparatus, however, the recursive NR is performed using the field memory 107, and the noise reduction operation by the recursive NR in the normal operation is performed by circulation of only one-field signal of the interlaced signal with the other-field signal not used. As a result, the vertical resolution is deteriorated. In addition, when the normal operation is changed to the accumulation sensitivity increase operation or when the accumulation sensitivity increase operation is changed to the normal operation, uncomfortable feeling occurs in the recursive NR operation.

SUMMARY OF THE INVENTION

It is an object of the invention to provide an imaging apparatus that has functions to use the both-fields signals of the interlaced signal for the recursive noise reduction in the normal operation, and to prevent the uncomfortable feeling in the recursive NR when the accumulation time of CCD (the accumulation sensitivity increase operation) is changed.

In order to achieve the above object, an imaging apparatus according to the first aspect of the invention includes:

imaging means for accumulating an image signal by an n-times long time accumulation (n is an integer of "1" or more);

timing control means for controlling to read out the image signal stored in the imaging means according to the n-times long time accumulation;

memory means for storing the image signal read out by the timing control means for one frame period or more;

memory control means for controlling the memory means; and recursive noise reduction means for performing a noise reduction process on the basis of the image signal read out from the imaging means and the one-frame-period-or-more delayed image signal read out from the memory means to generate a noise-reduction processed image signal, wherein when the imaging means performs a 2n-times long time accumulation, in a vertical scanning period in which the image signal is output from the imaging means, the memory control means writes to the memory means the image signal generated by the recursive noise reduction means, and the recursive noise reduction means outputs the generated image signal as an output signal as it is; and in a vertical scanning period in which the image signal is not output from the imaging means, the memory control means inhibits the writing of the image signal generated by the recursive noise reduction means to the memory means, and the recursive noise reduction means outputs the image signal read out from the memory means, as the output signal as it is.

This imaging apparatus may use the memory means such as a frame memory, and performs the recursive noise reduction process to the both-fields signal of the interlaced signal in the normal operation. Thereby, it is possible to reduce noise without deteriorating the vertical resolution. Further, even if the imaging means such as a CCD performs the 2n-times long time accumulation (or the accumulation sensitivity increase), it is possible to make the recursive noise reduction means operate properly.

In an imaging apparatus according to the second aspect of the invention, when the long time accumulation in the imaging means changes from one-time to 2n-times, after 2n vertical scanning periods from this change, the recursive noise reduction means outputs the image signal from the imaging means as the output signal as it is, without performing the noise reduction process.

In this imaging apparatus, even when the long time accumulation in the imaging means changes from one-time to 2n-times, after 2n vertical scanning periods from this change, the recursive noise reduction means outputs the image signal from the imaging means as the output signal as it is, without performing the noise reduction process. Thereby, it is possible to prevent the recursive noise reduction means from the erroneous operation. Further, it is possible to change the one-time accumulation sensitivity increase operation to the 2n-times accumulation sensitivity increase operation without any uncomfortable feeling.

In an imaging apparatus according to the third aspect of the invention, when the long time accumulation in the imaging means changes from 2m-times (m is an integer of "1" or more, m≠n) to 2n-times, after 2n vertical scanning periods from this change, the recursive noise reduction means outputs the image signal from the imaging means as the output signal as it is, without performing the noise reduction process.

In this imaging apparatus, even when the long time accumulation in the imaging means changes from 2m-times to 2n-times, after 2n vertical scanning periods from this change, the recursive noise reduction means outputs the image signal from the imaging means as the output signal as it is, without performing the noise reduction process. Thereby, it is possible to prevent the recursive noise reduction means from the erroneous operation. Further, it is possible to change from the 2m-times accumulation sensitivity increase operation to the 2n-times accumulation sensitivity increase operation without any uncomfortable feeling.

In an imaging apparatus according to the fourth aspect of the invention, when the long time accumulation in the imaging means changes from 2n-times to one-time, in a vertical scanning period after one vertical scanning period from this change, the recursive noise reduction means outputs the image signal from the imaging means as the output signal as it is, without performing the noise reduction process.

In this imaging apparatus, even when the long time accumulation in the imaging means changes from 2n-times to one-time, in a vertical scanning period after one vertical scanning period from this change, the recursive noise reduction means outputs the image signal from the imaging means as the output signal as it is, without performing the noise reduction process. Thereby, it is possible to prevent the recursive noise reduction means from the erroneous operation. Further, it is possible to change from the 2n-times accumulation sensitivity increase operation to the one-time accumulation sensitivity increase operation without any uncomfortable feeling.

In an imaging apparatus according to the fifth aspect of the invention, when the long time accumulation in the imaging means changes from 2n-times to one-time, in two or more vertical scanning periods after one vertical scanning period from this change, the recursive noise reduction means outputs the image signal from the imaging means as the output signal as it is, without performing the noise reduction process.

In this imaging apparatus, even when the long time accumulation in the imaging means changes from 2n-times to one-time, in two or more vertical scanning periods after one vertical scanning period from this change, the recursive noise reduction means outputs the image signal from the imaging means as the output signal as it is, without performing the noise reduction process. Thereby, it is possible to prevent the recursive noise reduction means from the uncomfortable feeling in operation. Further, it is possible to remove the uncomfortable feeling between the fields of the interlaced signal in the two vertical scanning periods.

In an imaging apparatus according to the sixth aspect of the invention, when the long time accumulation in the imaging means changes from 2n-times to one-time, in a vertical scanning period after one vertical scanning period from this change, the memory control means reads out an image signal of an opposite field stored in the memory means, and makes the recursive noise reduction means perform the noise reduction process on the basis of the read-out image signal of the opposite field and the image signal from the imaging means.

In this imaging apparatus, even when the long time accumulation in the imaging means changes from 2n-times to one-time, in a vertical scanning period after one vertical scanning period from this change, the memory control means reads out an image signal of an opposite field stored in the memory means, and makes the recursive noise reduction means perform the noise reduction process on the basis of the read-out image signal of the opposite field and the image signal from the imaging means. Thereby, by outputting the opposite-field signal as the cyclic data after one vertical scanning period from the change, it is possible to prevent the recursive noise reduction means from the erroneous operation, and to change from the 2n-times accumulation sensitivity increase operation to the one-time accumulation sensitivity increase operation without any uncomfortable feeling.

In an imaging apparatus according to the seventh aspect of the invention, when the long time accumulation in the imaging means changes from 2n-times to one-time, in a vertical scanning period after one vertical scanning period from this change, the memory control means reads out an image signal of an opposite field stored in the memory means, makes vertical-phase correction means perform a vertical-phase correction process to correct the read-out image signal of the opposite field for ½ line spatial phase shift, and makes the recursive noise reduction means perform the noise reduction process on the basis of the vertical-phase-correction processed image signal and the image signal from the imaging means.

In this imaging apparatus, even when even when the long time accumulation in the imaging means changes from 2n-times to one-time, in a vertical scanning period after one vertical scanning period from this change, the memory control means reads out an image signal of an opposite field stored in the memory means, makes vertical-phase correction means perform a vertical-phase correction process to correct the read-out image signal of the opposite field for ½ line spatial phase shift, and makes the recursive noise reduction means perform the noise reduction process on the basis of the vertical-phase-correction processed image signal and the image signal from the imaging means. Thereby, by outputting the opposite-field signal as the cyclic data after one vertical scanning period from the change to correct the ½ line vertical phase shift, it is possible to prevent the recursive noise reduction means from the erroneous operation, and to change from the 2n-times accumulation sensitivity increase operation to the one-time accumulation sensitivity increase operation without any uncomfortable feeling.

An imaging apparatus according to the eighth aspect of the invention further comprises two of the memory means, wherein when the imaging means performs the long time accumulation, in a vertical scanning period in which the image signal is output from the imaging means, the memory control means writes the image signal generated by the recursive noise reduction means to each memory means.

In this imaging apparatus, when the imaging means performs the long time accumulation, in a vertical scanning period in which the image signal is output from the imaging means, the memory control means writes the image signal generated by the recursive noise reduction means to each memory means. Thereby, it is possible to prevent the recursive noise reduction means from the erroneous operation. Further, it is possible to provide the imaging apparatus without any uncomfortable feeling.

In an imaging apparatus according to the ninth aspect of the invention, when the imaging means performs a (2n+1)-times long time accumulation, in a vertical scanning period in which the image signal is output from the imaging means, the memory control means writes the image signal generated from the recursive noise reduction means to the memory means, and the recursive noise reduction means outputs the generated image signal as the output signal as it is; and in a vertical scanning period in which the image signal is not output from the imaging means, the memory control means inhibits the writing of the image signal generated from the recursive noise reduction means to the memory means, and the recursive noise reduction means outputs the image signal read out from the memory means, as the output signal as it is, without performing the noise reduction process.

In this imaging apparatus, even when the imaging means performs the (2n+1)-times long time accumulation, it is possible to prevent the vertical resolution of the output signal from being deteriorated. Further, it is possible to provide the imaging apparatus in which the recursive noise reduction process can be performed using the interlaced signals with the same vertical phase.

An imaging apparatus according to the tenth aspect of the invention includes:

imaging means for accumulating an image signal by an n-times long time accumulation (n is an integer of "1" or more);

timing control means for controlling to read out the image signal stored in the imaging means according to the n-times long time accumulation;

memory means for storing the image signal read out by the timing control means for one frame period or more;

memory control means for controlling the memory means; and recursive noise reduction means for performing a noise reduction process on the basis of the image signal read out from the imaging means and the one-frame-period-or-more delayed image signal read out from the memory means to generate a noise-reduced image signal, and for outputting the generated image signal to the memory control means, wherein when the imaging means performs a 2n-times long time accumulation, in a vertical scanning period in which the image signal is output from the imaging means, the memory control means reads out the one-frame-period-or-more delayed image signal stored in the memory means, outputs the read-out image signal, and writes the image signal generated by the recursive noise reduction means to the memory means; and in a vertical scanning period in which the image signal is not output from the imaging means, the memory control means inhibits the writing of the image signal generated by the recursive noise reduction means to the memory means, reads out the one-frame-period-or-more delayed image signal stored in the memory means, and outputs the read-out image signal as an output signal as it is.

In this imaging apparatus, by using the memory means such as a frame memory, the recursive noise reduction process (the noise reduction process) is performed to the both-fields signals of the interlaced signal in the normal operation. Thereby, it is possible to reduce the noise component of the image signal without deteriorating the vertical resolution. Further, even when the imaging means such as a CCD performs the 2n-times long time accumulation (accumulation sensitivity increase) operation, it is possible to make the recursive noise reduction means operate properly, and to control the cyclic coefficient simply.

In an imaging apparatus according to the eleventh aspect of the invention, when the long time accumulation in the imaging means changes from one-time to 2n-times, after 2n vertical scanning periods from this change, the recursive noise reduction means reads out the image signal stored in the memory means, and outputs the read-out image signal as the output signal as it is, without performing the noise reduction process by the recursive noise reduction means.

In this imaging apparatus, even when the long time accumulation in the imaging means changes from one-time to 2n-times, after 2n vertical scanning periods from this change, the recursive noise reduction means reads out the image signal stored in the memory means, and outputs the read-out image signal as the output signal as it is, without performing the noise reduction process by the recursive noise reduction means. Thereby, it is possible to prevent the recursive noise reduction means from the erroneous operation. Further, it is possible to change from the one-time accumulation sensitivity increase operation to the 2n-times accumulation sensitivity increase operation without any uncomfortable feeling.

In an imaging apparatus according to the twelfth aspect of the invention, when the long time accumulation in the imaging means changes from 2m-times (m is an integer of "1" or more, m≠n) to 2n-times, after 2n vertical scanning periods from this change, the recursive noise reduction means reads out the image signal stored in the memory means, and outputs the read-out image signal as the output signal as it is, without performing the noise reduction process by the recursive noise reduction means.

In this imaging apparatus, even when the long time accumulation in the imaging means changes from 2m-times to 2n-times, after 2n vertical scanning periods from this change, the recursive noise reduction means reads out the image signal stored in the memory means, and outputs the read-out image signal as the output signal as it is, without performing the noise reduction process by the recursive noise reduction means. Thereby, it is possible to prevent the recursive noise reduction means from the erroneous operation. Further, it is possible to change from the 2m-times accumulation sensitivity increase operation to the 2n-times accumulation sensitivity increase operation without any uncomfortable feeling.

In an imaging apparatus according to the thirteenth aspect of the invention, when the long time accumulation in the imaging means changes from 2n-times to one-time, in one vertical scanning period after one vertical scanning period from this change, the recursive noise reduction means reads out the image signal stored in the memory means, and outputs the read-out image signal as the output signal as it is, without performing the noise reduction process by the recursive noise reduction means.

In this imaging apparatus, even when the long time accumulation in the imaging means changes from 2n-times to one-time, in one vertical scanning period after one vertical scanning period from this change, the recursive noise reduction means reads out the image signal stored in the memory means, and outputs the read-out image signal as the output signal as it is, without performing the noise reduction process by the recursive noise reduction means. Thereby, it is possible to prevent the recursive noise reduction means from the erroneous operation. Further, it is possible to change from the 2n-times accumulation sensitivity increase operation to the one-time accumulation sensitivity increase operation without any uncomfortable feeling.

In an imaging apparatus according to the fourteenth aspect of the invention, when the long time accumulation in the imaging means changes from 2n-times to one-time, in two vertical scanning periods or more after one vertical scanning period from this change, the recursive noise reduction means reads out the image signal stored in the memory means, and outputs the read-out image signal as the output signal as it is, without performing the noise reduction process by the recursive noise reduction means.

In this imaging apparatus, even when the long time accumulation in the imaging means changes from 2n-times to one-time, in two vertical scanning periods or more after one vertical scanning period from this change, the recursive noise reduction means reads out the image signal stored in the memory means, and outputs the read-out image signal as the output signal as it is, without performing the noise reduction process by the recursive noise reduction means. Thereby, it is possible to prevent the recursive noise reduction means from having any uncomfortable feeling in the operation. Further, it is possible to remove the uncomfortable feeling between the fields of the interlaced signal in the two vertical scanning periods.

In an imaging apparatus according to the fifteenth aspect of the invention, when the long time accumulation in the imaging means changes from 2n-times to one-time, in a vertical scanning period after one vertical scanning period from this change, the memory control means reads out an image signal of an opposite field stored to the memory means, and makes the recursive noise reduction means perform the noise reduction process on the basis of the read-out image signal of the opposite field and the image signal from the imaging means.

In this imaging apparatus, even when the long time accumulation in the imaging means changes from 2n-times to one-time, in a vertical scanning period after one vertical scanning period from this change, the memory control means reads out an image signal of an opposite field stored to the memory means, and makes the recursive noise reduction means perform the noise reduction process on the basis of the read-out image signal of the opposite field and the image signal from the imaging means. Thereby, by outputting the opposite-filed signal as the cyclic data after one vertical scanning period, it is possible to prevent the recursive noise reduction means from the erroneous operation, and to change from the 2n-times accumulation sensitivity increase operation to the one-time accumulation sensitivity increase operation without any uncomfortable feeling.

In an imaging apparatus according to the sixteenth aspect of the invention, when the long time accumulation in the imaging means changes from 2n-times to one-time, in one vertical scanning period after one vertical scanning period from this change, the memory control means reads out an image signal of an opposite field stored in the memory means, makes vertical-phase correction means perform a vertical-phase correction process to correct the read-out image signal of the opposite field for ½ line spatial phase shift, and makes the recursive noise reduction means perform the noise reduction process on the basis of the vertical-phase-correction processed image signal and the image signal from the imaging means.

In this imaging apparatus, even when the long time accumulation in the imaging means changes 2n-times to one-time, in one vertical scanning period after one vertical scanning period from this change, the memory control means reads out an image signal of an opposite field stored in the memory means, makes vertical-phase correction means perform a vertical-phase correction process to correct the read-out image signal of the opposite field for ½ line spatial phase shift, and makes the recursive noise reduction means perform the noise reduction process on the basis of the vertical-phase-correction processed image signal and the image signal from the imaging means. Thereby, by producing the opposite-field signal as the cyclic data after one vertical scanning period from this change to correct for the ½ line vertical phase shift, it is possible to prevent the recursive noise reduction means from the erroneous operation, and to change from the 2n-times accumulation sensitivity increase operation to the one-time accumulation sensitivity increase operation without any uncomfortable feeling.

An imaging apparatus according to the seventeenth aspect of the invention further comprises two of the memory means, wherein when the imaging means performs the long time accumulation, in a vertical scanning period in which the image signal is output from the imaging means, the memory control means writes the image signal generated by the recursive noise reduction means to each memory means.

In this imaging apparatus, when the imaging means performs the long time accumulation, in a vertical scanning period in which the image signal is output from the imaging means, the memory control means writes the image signal generated by the recursive noise reduction means to each memory means. Thereby, it is possible to prevent the recursive noise reduction means from the erroneous operation. Further, it is possible to provide the imaging apparatus in which the uncomfortable feeling removed.

In an imaging apparatus according to the eighteenth aspect of the invention, when the imaging means performs a (2n+1)-times long time accumulation, in a vertical scanning period in which the image signal is output from the imaging means, the memory control means reads out the one-frame-or-more delayed image signal stored in the memory means, outputs the read-out image signal as an output signal as it is, and writes the image signal generated from the recursive noise reduction means to the memory means; and in a vertical scanning period in which the image signal is not output from the imaging means, the memory control means inhibits the writing of the image signal generated from the recursive noise reduction means to the memory means, and the recursive noise reduction means outputs the image signal read out from the memory means, as the output signal as it is.

In this imaging apparatus, even when the imaging means performs the (2n+1) times long time accumulation operation, it is possible to prevent the vertical resolution of the output signal from being deteriorated, and to provide the imaging apparatus in which the recursive noise reduction process is performed using the interlaced signals with the same vertical phase.

An imaging apparatus according to the nineteenth aspect of the invention, includes:

imaging means for accumulating an image signal by an n-times long time accumulation (n is an integer of "1" or more);

timing control means for controlling to read out the image signal stored in the imaging means according to the n-times long time accumulation;

memory means for storing the image signal read out by the timing control means for one frame period or more, and having first and second outputs;

memory control means for controlling the memory means; and recursive noise reduction means for performing a noise reduction process on the basis of the image signal read out from the imaging means and the one-frame-period-or-more delayed image signal read out from the first outputs of the memory means to generate a noise-reduced image signal, and outputs the noise-reduced image signal to the memory control means, wherein when the imaging means performs a 2n-times long time accumulation, in a vertical scanning period in which the image signal is output from the imaging means, the memory control means writes to the memory means the image signal generated by the recursive noise reduction means, reads out the one-frame-period-or-more delayed image signal from the second output of the memory means, and outputs the read-out image signal as an output signal as it is; and in a vertical scanning period in which the image signal is not output from the imaging means, the memory control means inhibits the writing of the image signal generated by the recursive noise reduction means to the memory means, reads out the one-frame-period-or-more delayed image signal from the second output of the memory means, and outputs the read-out image signal as an output signal as it is.

In this imaging apparatus, by using the memory means such as a frame memory, in the normal operation, the recursive noise reduction process (the noise reduction process) is performed to the both-fields signals of the interlaced signal. Thereby, it is possible to reduce the noise component of the image signal without deteriorating the vertical resolution. Further, even when the imaging means such as a CCD performs the 2n-times long time accumulation (accumulation sensitivity increase) operation, it is possible to make the recursive noise reduction means operate properly, and to control the cyclic coefficient and the memory output simply.

In an imaging apparatus according to the twentieth aspect of the invention, when the long time accumulation in the imaging means changes from one-time to 2n-times, after 2n vertical scanning periods from this change, the memory control means reads out from the second outputs the image signal stored in the memory means, and outputs the read-out image signal as the output signal as it is, without performing the noise reduction process by the recursive noise reduction means.

In this imaging apparatus, even when the long time accumulation in the imaging means changes from one-time to 2n-times, after 2n vertical scanning periods from this change, the memory control means reads out from the second outputs the image signal stored in the memory means, and outputs the read-out image signal as the output signal as it is, without performing the noise reduction process by the recursive noise reduction means. Thereby, it is possible to prevent the recursive noise reduction means from the erroneous operation. Further, it is possible to change from the one-time accumulation sensitivity increase operation to the 2n-times accumulation sensitivity increase operation without any uncomfortable feeling.

In an imaging apparatus according to the twenty-first aspect of the invention, when the long time accumulation in the imaging means changes from 2m-times (m is an integer of "1" or more, m≠n) to 2n-times, after 2n vertical scanning periods from this change, the memory control means reads out from the second outputs the image signal stored in the memory means, and outputs the read-out image signal as the output signal as it is, without performing the noise reduction process by the recursive noise reduction means.

In this imaging apparatus, even when the long time accumulation in the imaging means changes from 2m-times (m is an integer of "1" or more, m≠n) to 2n-times, after 2n vertical scanning periods from this change, the memory control means reads out from the second outputs the image signal stored in the memory means, and outputs the read-out image signal as the output signal as it is, without performing the noise reduction process by the recursive noise reduction means. Thereby, it is possible to prevent the recursive noise reduction means from the erroneous operation. Further, it is possible to change from the 2m-times accumulation sensitivity increase operation to the 2n-times accumulation sensitivity increase operation without any uncomfortable feeling.

In an imaging apparatus according to the twenty-second aspect of the invention, when the long time accumulation in the imaging means changes from 2n-times to one-time, in one vertical scanning period after one vertical scanning period from this change, the memory control means reads out from the second outputs the image signal stored in the memory means, and outputs the read-out image signal as the output signal as it is, without performing the noise reduction process by the recursive noise reduction means.

In this imaging apparatus, even when the long time accumulation in the imaging means changes from 2n-times to one-time, in one vertical scanning period after one vertical scanning period from this change, the memory control means reads out from the second outputs the image signal stored in the memory means, and outputs the read-out image signal as the output signal as it is, without performing the noise reduction process by the recursive noise reduction means. Thereby, it is possible to prevent the recursive noise reduction means from the erroneous operation. Further, it is possible to change from the 2n-times accumulation sensitivity increase operation to the one-time accumulation sensitivity increase operation without any uncomfortable feeling.

In an imaging apparatus according to the twenty-third aspect of the invention, when the long time accumulation in the imaging means changes from 2n-times to one-time, in two vertical scanning periods or more after one vertical scanning period from this change, the memory control means reads out from the second outputs the image signal stored in the memory means, and outputs the read-out image signal as the output signal as it is, without performing the noise reduction process by the recursive noise reduction means.

In this imaging apparatus, even when the long time accumulation in the imaging means changes from 2n-times to one-time, in two vertical scanning periods or more after one vertical scanning period from this change, the memory control means reads out from the second outputs the image signal stored in the memory means, and outputs the read-out image signal as the output signal as it is, without performing the noise reduction process by the recursive noise reduction means. Thereby, it is possible to prevent the recursive noise reduction means from having uncomfortable feeling in the operation. Further, it is possible to remove the uncomfortable feeling between the fields of the interlaced signal in the two vertical scanning periods.

In an imaging apparatus according to the twenty-fourth aspect of the invention, when the long time accumulation in the imaging means changes from 2n-times to one-time, in a vertical scanning period after one vertical scanning period from this change, the memory control means reads out an image signal of an opposite field stored to the memory means, and makes the recursive noise reduction means perform the noise reduction process on the basis of the read-out image signal of the opposite field and the image signal from the imaging means.

In this imaging apparatus, even when the long time accumulation in the imaging means changes from 2n-times to one-time, in a vertical scanning period after one vertical scanning period from this change, the memory control means reads out an image signal of an opposite field stored to the memory means, and makes the recursive noise reduction means perform the noise reduction process on the basis of the read-out image signal of the opposite field and the image signal from the imaging means. Thereby, by outputting the opposite-field signal as the cyclic data after one vertical scanning period after the change, it is possible to prevent the recursive noise reduction means from the erroneous operation, and to change from the 2n-times accumulation sensitivity increase operation to the one-time accumulation sensitivity increase operation without any uncomfortable feeling.

In an imaging apparatus according to the twenty-fifth aspect of the invention, when the long time accumulation in the imaging means changes from 2n-times to one-time, in one vertical scanning period after one vertical scanning period from this change, the memory control means reads out an image signal of an opposite field stored in the memory means, makes vertical-phase correction means perform a vertical-phase correction process to correct the read-out image signal of the opposite field for ½ line spatial phase shift, and makes the recursive noise reduction means perform the noise reduction process on the basis of the vertical-phase-correction processed image signal and the image signal from the imaging means.

In this imaging apparatus, even when the long time accumulation in the imaging means changes from 2n-times to one-time, in one vertical scanning period after one vertical scanning period from this change, the memory control means reads out an image signal of an opposite field stored in the memory means, makes vertical-phase correction means perform a vertical-phase correction process to correct the read-out image signal of the opposite field for ½ line spatial phase shift, and makes the recursive noise reduction means perform the noise reduction process on the basis of the vertical-phase-correction processed image signal and the image signal from the imaging means. Thereby, by outputting the opposite-field signal as the cyclic data after one vertical scanning period from the change to correct the ½ line vertical phase shift, it is possible to prevent the recursive noise reduction means from the erroneous operation, and to change from the 2n-times accumulation sensitivity increase operation to the one-time accumulation sensitivity increase operation without any uncomfortable feeling.

In an imaging apparatus according to the twenty-sixth aspect of the invention further comprises two of the memory means, wherein when the imaging means performs the long time accumulation, in a vertical scanning period in which the image signal is output from the imaging means, the memory control means writes the image signal generated by the recursive noise reduction means to each memory means.

In this imaging apparatus, when the imaging means performs the long time accumulation, in a vertical scanning period in which the image signal is output from the imaging means, the memory control means writes the image signal generated by the recursive noise reduction means to each memory means. Thereby, it is possible to prevent the recursive noise reduction means from the erroneous operation. Further, it is possible to provide the imaging apparatus without any uncomfortable feeling.

In an imaging apparatus according to the twenty-seventh aspect of the invention, when the imaging means performs a (2n+1)-times long time accumulation, in a vertical scanning period in which the image signal is output from the imaging means, the memory control means writes the image signal generated by the recursive noise reduction means to the memory means, reads out the one-frame-or-more delayed image signal stored in the memory means from the second output, and outputs the read-out image signal as an output signal as it is; and in a vertical scanning period in which the image signal is not output from the imaging means, the memory control means inhibits the writing of the image signal generated from the recursive noise reduction means to the memory means, reads out the one-frame-or-more delayed image signal stored in the memory means from the second output, and outputs the read-out image signal as the output signal as it is.

In this imaging apparatus, even when the imaging means performs the (2n+1)-times long time accumulation, it is possible to prevent the vertical resolution of the output signal from being deteriorated, and to perform the recursive noise reduction process using the interlaced signals with the same vertical phase.

DESCRIPTION OF THE EMBODIMENTS

Imaging apparatuses according to the first through third embodiments of the invention will be described with reference to FIGS. 1–37.

First Embodiment

Figure 1:
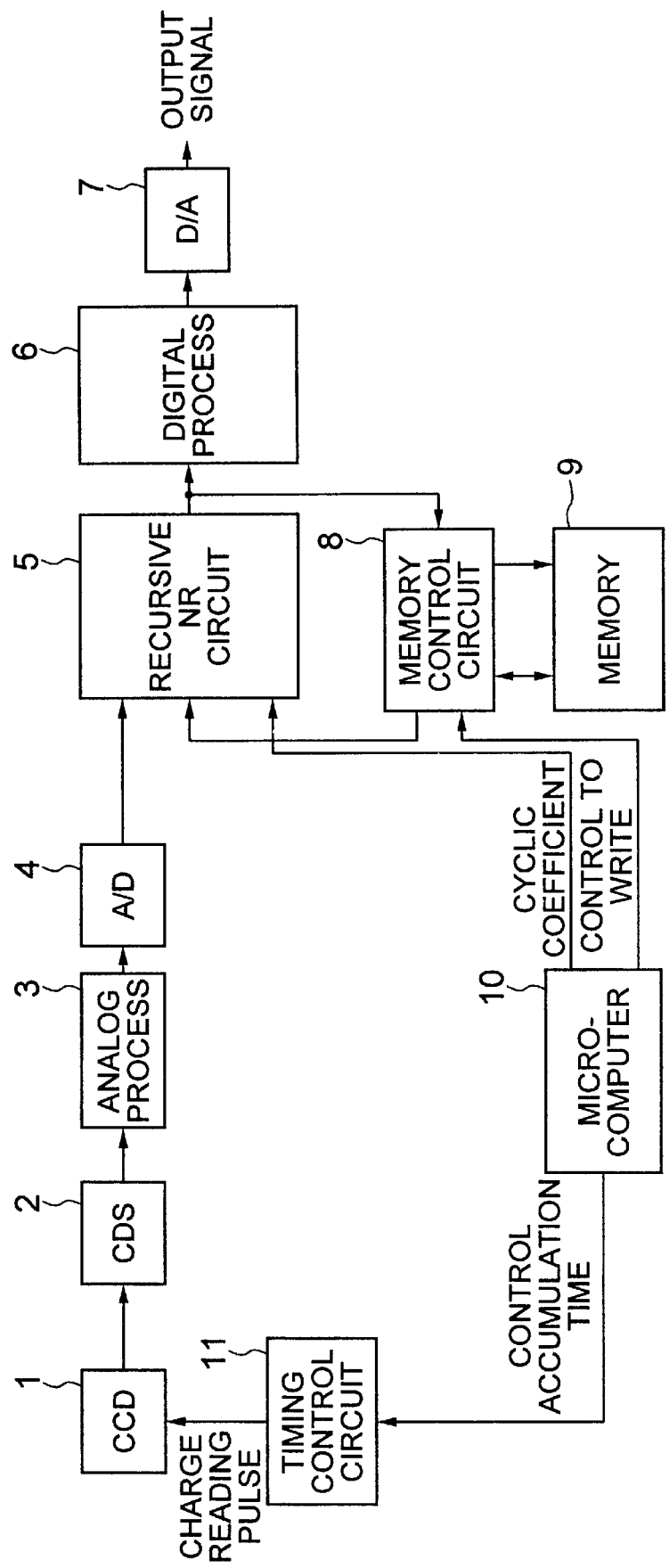
FIG. 1 is a schematic block diagram of an imaging apparatus according to a first embodiment of the invention.

FIG. 1 is a block diagram showing the schematic construction of the imaging apparatus according to the first embodiment of the invention.

The imaging apparatus shown in FIG. 1 includes: a CCD 1 (the imaging means) for converting a light image into an electrical image signal; a CDS 2 for sampling the electrical image signal; an analog process circuit 3 for performing an analog signal process to the sampled image signal; an A/D (analog/digital conversion) circuit 4 for converting the analog-signal processed image signal into a digital signal; a recursive NR circuit 5 (the recursive noise reduction means) for performing a recursive filtering process to the digital image signal in the time-axis direction to reduce the noise component of this image signal; a digital process circuit 6 for performing a necessary signal process to the recursive-filtering processed image signal, a D/A (digital/analog conversion) circuit 7 for converting the necessary-signal processed image signal into an analog signal; a memory 9 (the storage means) for storing an output signal of the recursive NR circuit 5 for one frame period or more; a memory control circuit 8 (the memory control means) for controlling the memory 9; a microcomputer 10 for controlling the whole imaging apparatus; and a timing control circuit 11 (the timing control means) for controlling the long-time-accumulation time of CCD 1.

The output signal of the recursive NR circuit 5, under the control of the memory control circuit 8, is supplied to the memory 9, delayed by two vertical scanning periods, and then fed back to the recursive NR circuit 5 as a cyclic signal.

The microcomputer 10 controls the cyclic coefficient input to the recursive NR circuit 5, and controls the memory control circuit 8 to write to and read from the memory 9.

The CCD 1 is controlled by a charge reading pulse from the timing control circuit 11. The accumulation sensitivity increase of the CCD 1 is performed when the microcomputer 10 controls the accumulation time input to the timing control circuit 11.

The operation timing of this imaging apparatus in the normal operation will be described with reference to FIG. 2.

Figure 2:
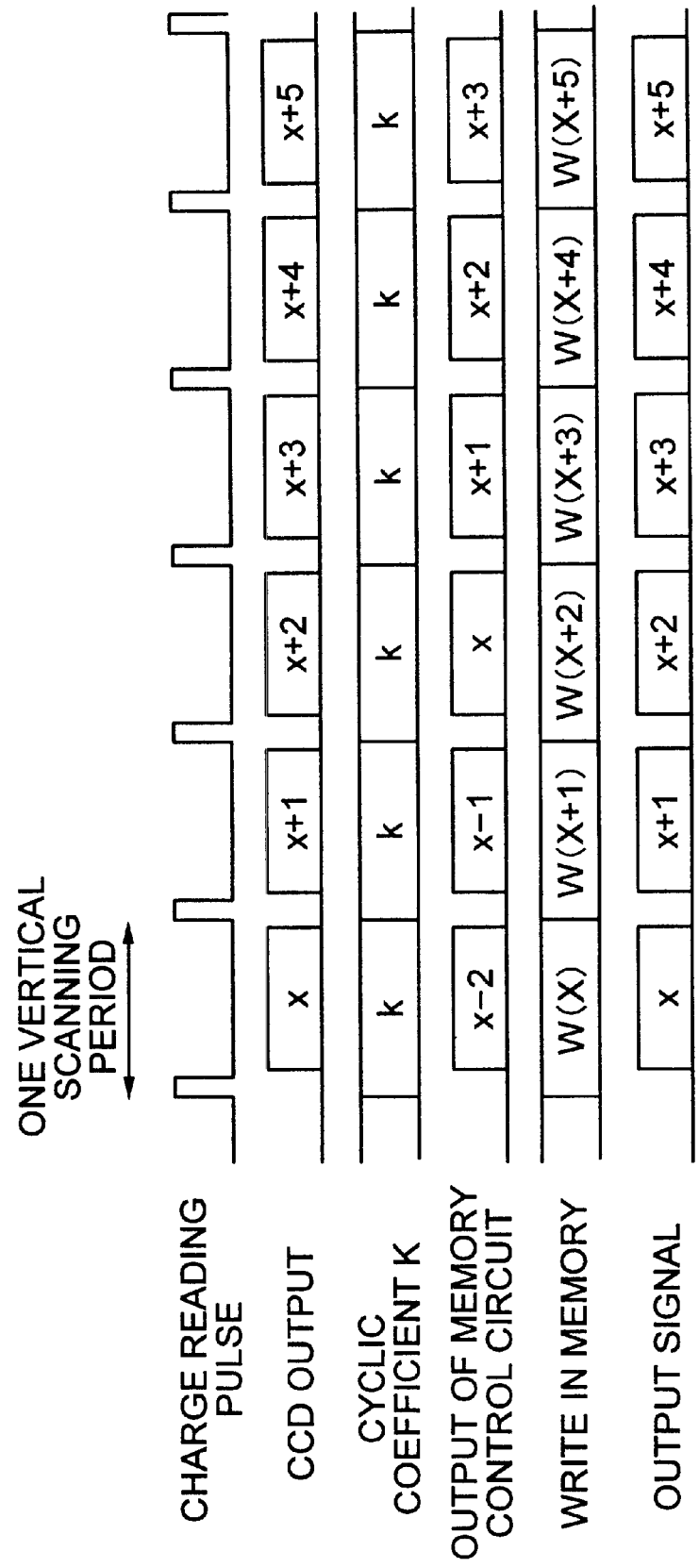
FIG. 2 is a timing chart showing the operation timing of the imaging apparatus according to the first embodiment in the normal operation.

As illustrated in FIG. 2, in the normal operation, the timing control circuit 11 supplies the charge reading pulse to the CCD 1 every vertical scanning period, and the CCD 1 outputs the image signal.

When an image signal x is output from the CCD 1, the cyclic coefficient K which is input from the microcomputer 10 to the recursive NR circuit 5 is set to be k. The recursive NR circuit 5 performs the arithmetic operation using the image signal x and an output signal X−2 of the memory control circuit 8 to output the result as an output signal X. The output signal X is written to the memory 9.

When an image signal x+1 is output from the CCD 1, the cyclic coefficient K which is input from the microcomputer 10 to the recursive NR circuit 5 is similarly set to be k. The recursive NR circuit 5 performs the arithmetic operation using the image signal x+1 and an output signal X−1 of the memory control circuit 8 to output the result as an output signal X+1. The output signal X+1 is written to the memory 9.

The similar operations are repeated hereinafter.

Next, the operation timing of this imaging apparatus in the 2-times accumulation sensitivity increase will be described with reference to FIG. 3.

Figure 3:
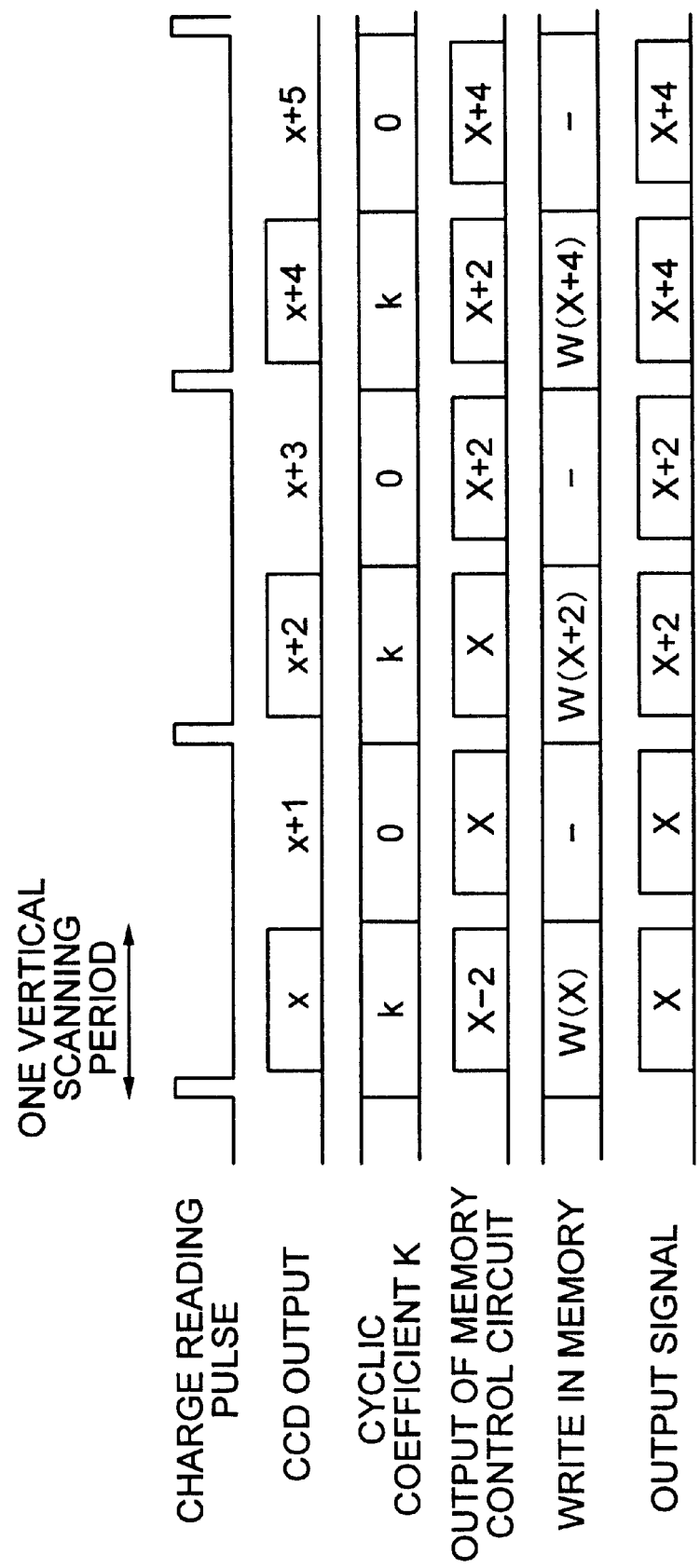
FIG. 3 is a timing chart showing the operation timing of the imaging apparatus according to the first embodiment in the 2n-times accumulation sensitivity increase operation.

As illustrated in FIG. 3, in the 2-times accumulation sensitivity increase, the timing control circuit 11 supplies the charge reading pulse to the CCD 1 every two vertical scanning periods, and the CCD 1 accumulates charges for two vertical scanning periods, and outputs the accumulated charges as the image signal.

When an image signal x is output from the CCD 1, the cyclic coefficient K which is input from the microcomputer 10 to the recursive NR circuit 5 is set to be k. The recursive NR circuit 5 performs the arithmetic operation using the image signal x and an output signal X−2 of the memory control circuit 8 to output the result as an output signal X. The output signal X is written to the memory 9.

When an image signal x+1 is output, the timing control circuit 11 supplies no charge reading pulse to the CCD 1, and hence the CCD 1 outputs no image signal.

Therefore, the cyclic coefficient K which is input from the microcomputer 10 to the recursive NR circuit 5 is set to be "0". As a result, an output signal X of the memory control circuit 8 is output as the output signal of the recursive NR circuit 5 as it is. At this time, the output signal X is not written to the memory 9.

Then, by the similar control as above, it is possible to perform the 2n-times (n is an integer of "1" or more) accumulation sensitivity increase operation.

As illustrated in FIG. 2, in the normal operation, the signal stored in the memory 9 is used as the cyclic signal to the recursive NR circuit 5. Thereby, the recursive NR process is performed using the signals in both fields of the interlaced signal without reducing the vertical resolution to perform the noise reduction. In addition, as illustrated in FIG. 3, even when the 2-times accumulation sensitivity increase operation is performed, the recursive NR circuit 5 can be normally operated, and the cyclic coefficient can be simply controlled.

Next, the operation timing of this imaging apparatus when the normal operation is changed to the 2-times accumulation sensitivity increase operation will be described with reference to FIG. 4.

Figure 4:
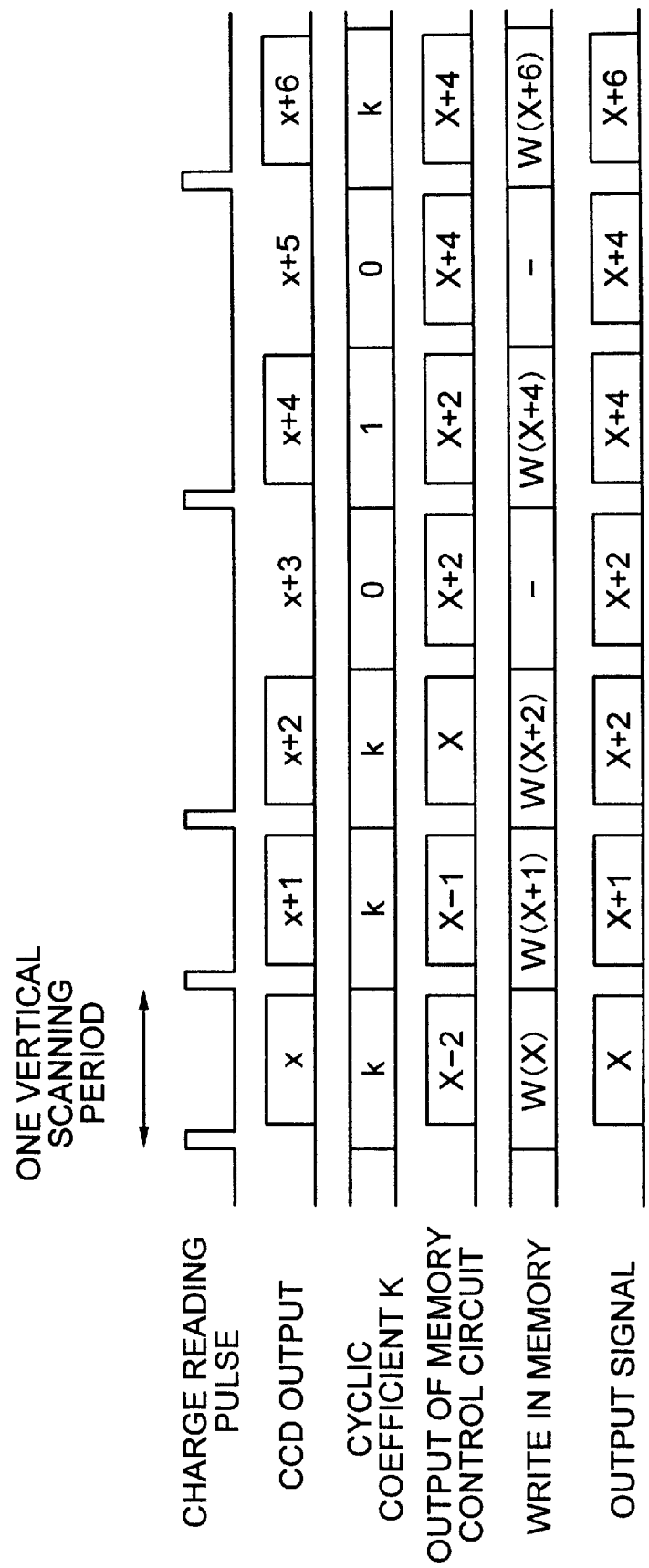
FIG. 4 is a timing chart showing the operation timing of the imaging apparatus according to the first embodiment when the normal operation is changed to the 2n-times accumulation sensitivity increase operation.

As illustrated in FIG. 4, when the normal operation is changed to the 2-times accumulation sensitivity increase operation, the CCD 1 performs the normal operation until the timing of an image signal x+2, and then performs the 2-times accumulation sensitivity increase operation.

Thus, the cyclic coefficient K is always set to be k until the timing of the image signal x+2, and the writing to the memory 9 is performed every vertical scanning period.

The 2-times accumulation sensitivity increase operation begins at the timing of an image signal x+3. At the timing of an image signal x+4, the image signal X+2 (the output signal of the memory control circuit 8) in the normal operation and the image signal x+4 in the 2-times accumulation sensitivity increase operation are supplied to the recursive NR circuit 5.

Therefore, the recursive NR circuit 5 performs the arithmetic operation using two kinds of signals with different amplitudes, and thus cannot properly operate. Consequently, the recursive NR circuit 5 outputs a signal with uncomfortable feeling.

Thus, at the image signal x+4 after two vertical scanning periods from the change of operation, the cyclic coefficient K is set to be "1" so that the image signal x+4 from the CCD 1 is output from the recursive NR circuit 5 as it is.

Then, the operation shown in FIG. 3 is repeated.

As mentioned above, even when the normal operation is changed to the 2-times accumulation sensitivity increase operation, the cyclic coefficient K after 2n vertical scanning periods from this change of operation is set to be "1". Thereby, it is possible to prevent the recursive NR circuit 5 from the erroneous operation, and to change from the normal operation to the 2n-times accumulation sensitivity increase operation without any uncomfortable feeling.

Next, the operation timing of the imaging apparatus when the 2m-times (m is an integer of "1" or more) accumulation sensitivity increase operation is changed to the 2n-times (n is an integer of "1" or more) accumulation sensitivity increase operation will be described with reference to FIG. 5.

Figure 5:
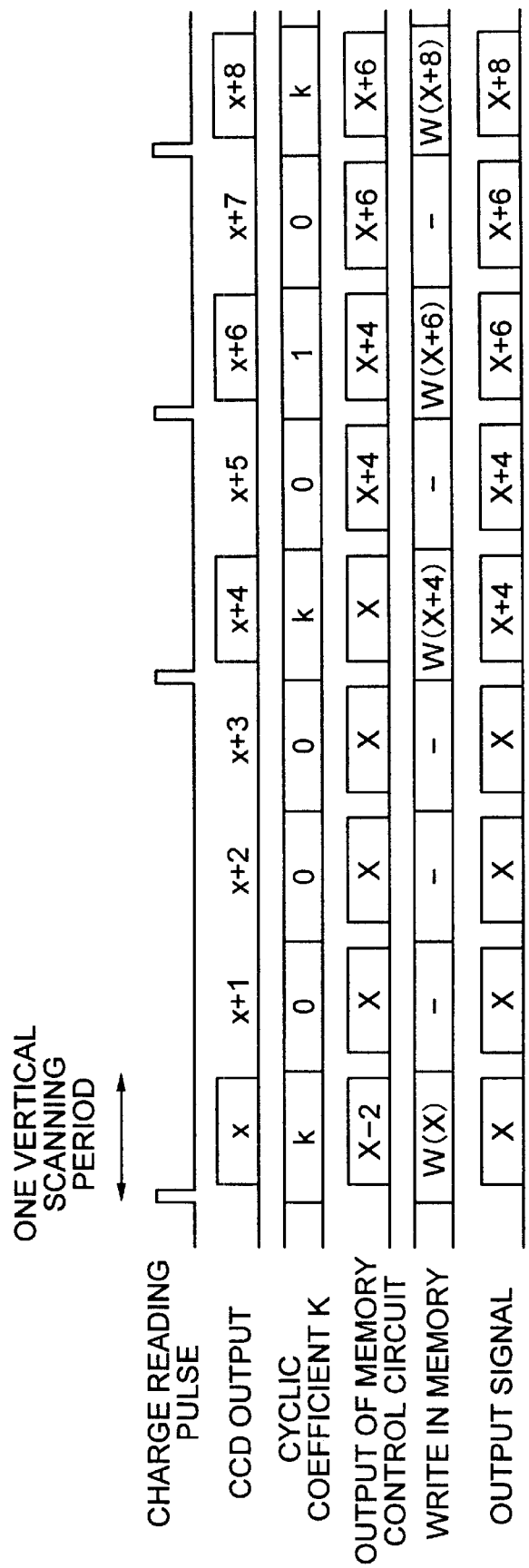
FIG. 5 is a timing chart showing the operation timing of the imaging apparatus according to the first embodiment when the 2m-times accumulation sensitivity increase operation is changed to the 2n-times accumulation sensitivity increase operation.

As illustrated in FIG. 5, when the accumulation sensitivity is changed from 4-times (m=2) to 2-times (n=1), the CCD 1 performs the 4-times accumulation sensitivity increase operation until the timing of an image signal x+4, and then performs the 2-times accumulation sensitivity increase operation.

Therefore, until the timing of the image signal x+4, the cyclic coefficient K is set to be k only during the vertical scanning period in which the image signal is output from the CCD 1. On the other hand, during the vertical scanning period in which the image signal is not output from the CCD 1, the cyclic coefficient K is set to be "0" so that the output signal of the memory control circuit 8 is output as the output signal of the recursive NR circuit 5 as it is, and the writing to the memory 9 is not performed.

The 2-times accumulation sensitivity increase operation is performed from the timing of an image signal x+5. At the timing of an image signal x+6, the image signal X+4 in the 4-times accumulation sensitivity increase operation and the image signal x+6 in the 2-times accumulation sensitivity increase operation are supplied to the recursive NR circuit 5.

The recursive NR circuit 5, however, cannot correctly operate since it performs the arithmetic operation using the two signals with different amplitudes. Consequently, a signal with uncomfortable feeling is output from the recursive NR circuit 5.

Thus, at the timing of the image signal x+6 after two vertical scanning periods from the change of operation, the cyclic coefficient K is set to be "1" so that the image signal x+6 from the CCD 1 is output from the recursive NR circuit 5 as it is, and the output signal X+6 of the recursive NR circuit 5 is written to the memory 9.

Then, the operation shown in FIG. 3 is repeated.

As mentioned above, even when the 2m-times accumulation sensitivity increase operation is changed to the 2n-times accumulation sensitivity increase operation, the cyclic coefficient K after 2n vertical scanning periods from this change is set to be "1". Thereby, it is possible to prevent the recursive NR circuit 5 from the erroneous operation. Further, it is possible to change the 2m-times accumulation sensitivity increase operation is changed to the 2n-times accumulation sensitivity increase operation without any uncomfortable feeling.

Next, the operation timing of the imaging apparatus when the 2n-times (n is an integer of "1" or more) accumulation sensitivity increase operation is changed to the normal operation will be described with reference to FIG. 6.

Figure 6:
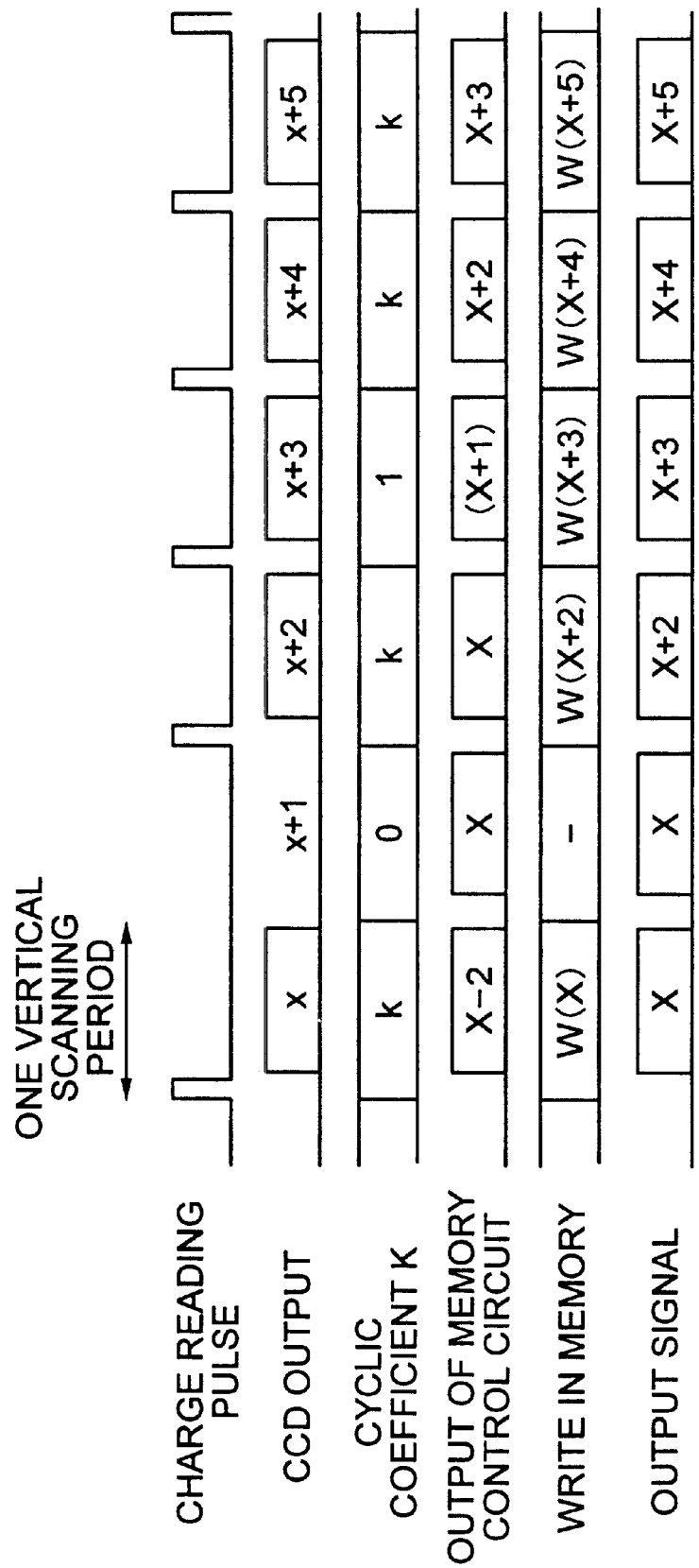
FIG. 6 is a timing chart showing the operation timing of the imaging apparatus according to the first embodiment when the 2n-times accumulation sensitivity increase operation is changed to the normal operation.

As illustrated in FIG. 6, when the 2-times (n=1) accumulation sensitivity increase operation is changed to the normal operation, the CCD 1 performs the 2-times accumulation sensitivity increase operation until the timing of an image signal x+2, and then performs the normal operation.

Therefore, at the timing of the image signal x+2, the cyclic coefficient K is set to be k only during the vertical scanning period in which the image signal is output from the CCD 1. On the other hand, in the vertical scanning period in which the image signal is not output from the CCD 1, the cyclic coefficient K is set to be "0" so that the output signal of the memory control circuit 8 is output from the recursive NR circuit 5 as it is, and the writing to the memory 9 is not performed.

The normal operation begins from the timing of an image signal x+3. At the timing of the image signal x+3, an output signal X+1 of the memory control circuit 8 is to be essentially supplied to the recursive NR circuit 5.

However, since the 2-times operation is performed during the accumulation sensitivity increase operation, only the one-field signals of the interlaced signal are used, and thus the signal X+1 is not the proper signal which has just been written to the memory 9. Therefore, the recursive NR circuit 5 performs the arithmetic operation using the improper signal, and hence cannot properly operate. Consequently, a signal with uncomfortable feeling is output from the recursive NR circuit 5.

Thus, at the timing of the image signal x+3 after one vertical scanning period from the change of operation, the cyclic coefficient K is set to be "1" so that the image signal x+3 from the CCD 1 is output from the recursive NR circuit 5 as it is, and the output signal X+3 of the recursive NR circuit 5 is written to the memory 9.

Then, the operation shown in FIG. 1 is repeated.

Thus, even when the 2n-times accumulation sensitivity increase operation is changed to the normal operation, the cyclic coefficient K after one vertical scanning period from this change is controlled to be "1". Thereby, it is possible to prevent the recursive NR circuit 5 from the erroneous operation, and to change from the 2-times accumulation sensitivity increase operation to the normal operation without any uncomfortable feeling.

Figure 7:
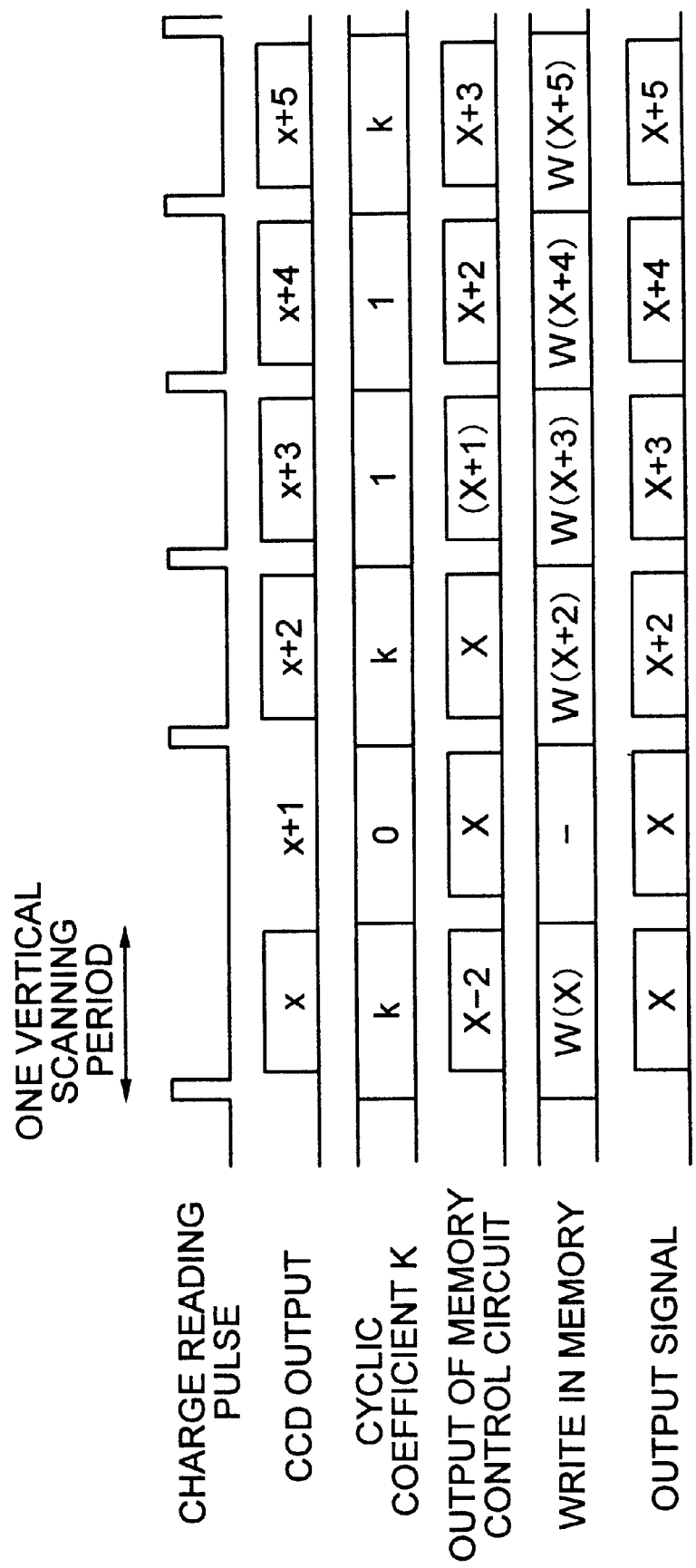
FIG. 7 is a timing chart showing the operation timing of the imaging apparatus according to the first embodiment when the 2n-times accumulation sensitivity increase operation is changed to the normal operation.

Next, another operation timing of this imaging apparatus when the 2n-times (n is an integer of "1" or more) accumulation sensitivity increase operation is changed to the normal operation will be described with reference to FIG. 7.

At the operation timings shown in FIG. 6, a signal X+3 written to the memory 9 is a image signal x+3 itself output from the CCD 1. Also, a signal X+4 written to the memory 9 is a signal the noise component of which has been reduced in the recursive NR circuit 5. Therefore, a signal with uncomfortable feeling occurs between the fields of the interlaced signal.

Therefore, at the timings of the image signals x+3 and x+4 in the two vertical scanning periods after one vertical scanning period from the change of operation, the cyclic coefficient K is set to be "1" so that the image signals x+3 and x+4 from the CCD 1 are output from the recursive NR circuit 5.

Thereby, even when the 2n-times accumulation sensitivity increase operation is changed to the normal operation, the cyclic coefficient K in the two vertical scanning periods after one vertical scanning period from this change is controlled to be "1". Thus, it is possible to provide the imaging apparatus which has no signal with any uncomfortable feeling between the fields of the interlaced signal.

Next, still another operation timing of this imaging apparatus when the 2n-times (n is an integer of "1" or more) accumulation sensitivity increase operation is changed to the normal operation will be described with reference to FIG. 8.

Figure 8:
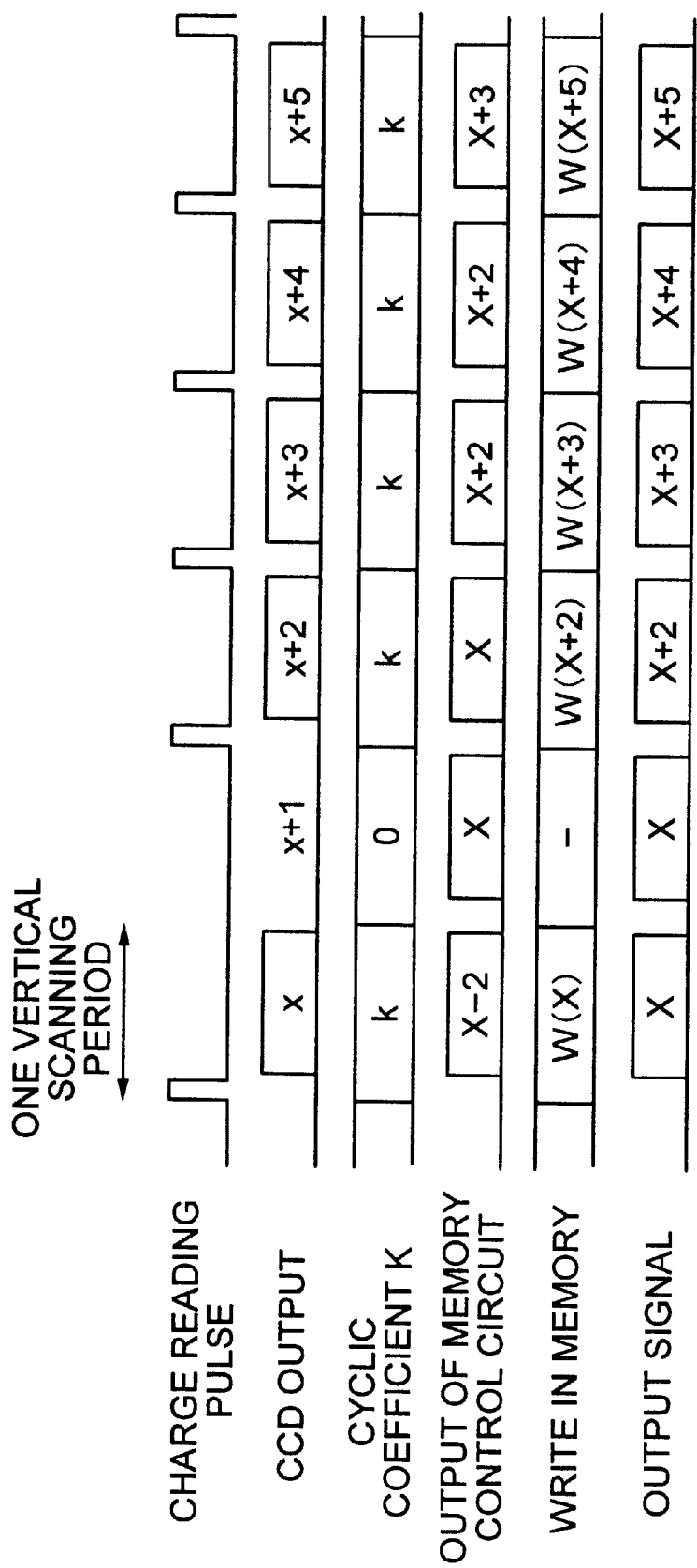
FIG. 8 is a timing chart showing the operation timing of the imaging apparatus according to the first embodiment when the 2n-times accumulation sensitivity increase operation is changed to the normal operation.

As illustrated in FIG. 8, when the 2-times (n=1) accumulation sensitivity increase operation is change to the normal operation, the CCD 1 performs the 2-times accumulation sensitivity increase operation until the timing of an image signal x+2, and then performs the normal operation.

The normal operation begins from the timing of an image signal x+3. Since there is no cyclic signal corresponding to the timing of the image signal x+3, an image signal X+2 of the opposite field, which has just been written to the memory 9, is output from the memory control circuit 8.

Therefore, at the timing of the image signal x+3, even if the cyclic coefficient K is maintained to be k, the noise reduction can be performed intermittently without any uncomfortable feeling.

Thus, even when the 2n-times accumulation sensitivity increase operation is changed to the normal operation, the opposite-field signal is output as the cyclic data in one vertical scanning period from this change. Thereby, even if the cyclic coefficient K is maintained to be k, the erroneous operation of the recursive NR circuit 5 can be prevented, and the change from the 2n-times accumulation sensitivity increase operation to the normal operation can be made without any uncomfortable feeling.

Next, another imaging apparatus according to the embodiment will be described with reference to FIGS. 9 and 10. In the imaging apparatus shown in FIG. 9, the same blocks corresponding to those of the imaging apparatus shown in FIG. 1 are identified by the same reference numerals, and their constructions and operations will not be described.

Figure 9:
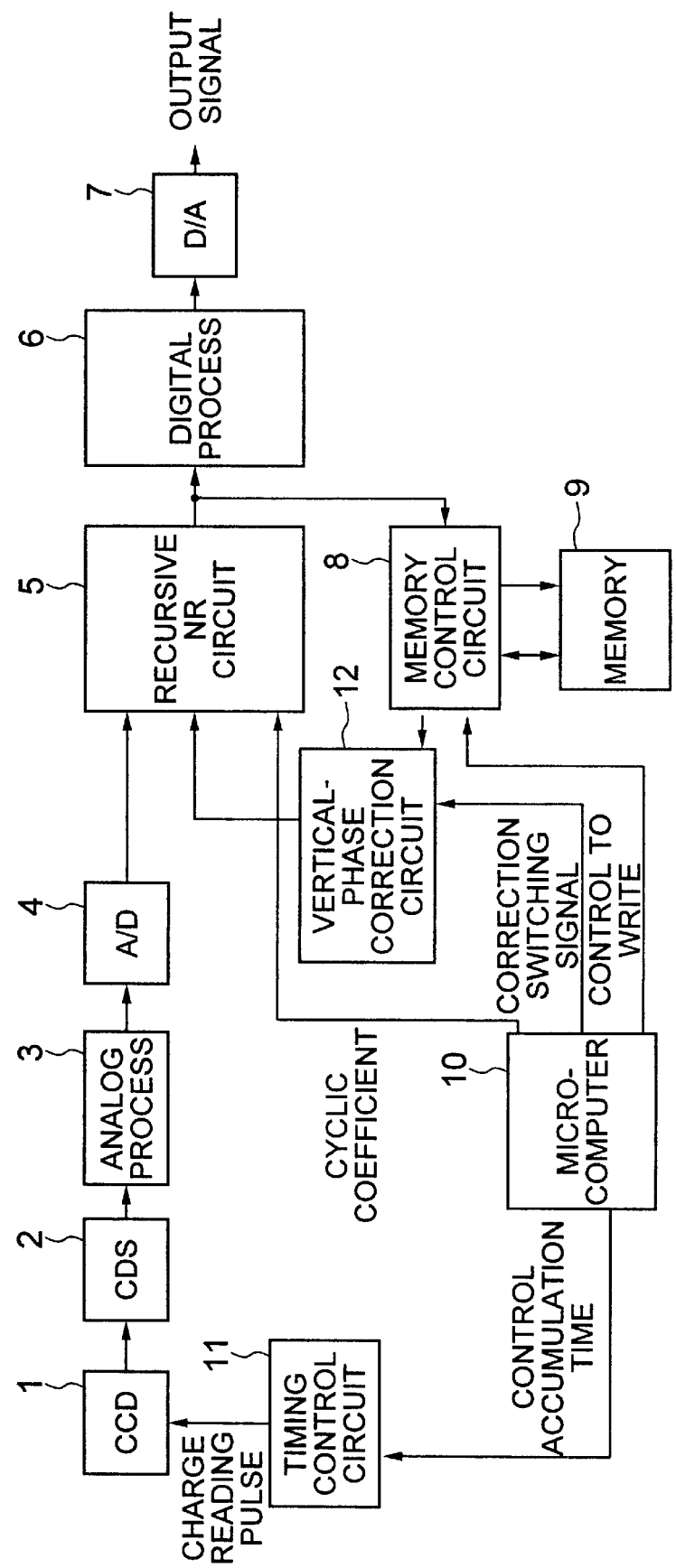
FIG. 9 is a block diagram showing a modification of the imaging apparatus according to the first embodiment.

The imaging apparatus shown in FIG. 9 includes a vertical-phase correction circuit 12 (the vertical-phase correction means) for performing a vertical-phase correction process in which ½ line spatial phase shift is corrected to an image signal of the opposite field read out by the memory control circuit 8, to supply the vertical-phase-correction processed image signal to the recursive NR circuit 5.

Figure 10:
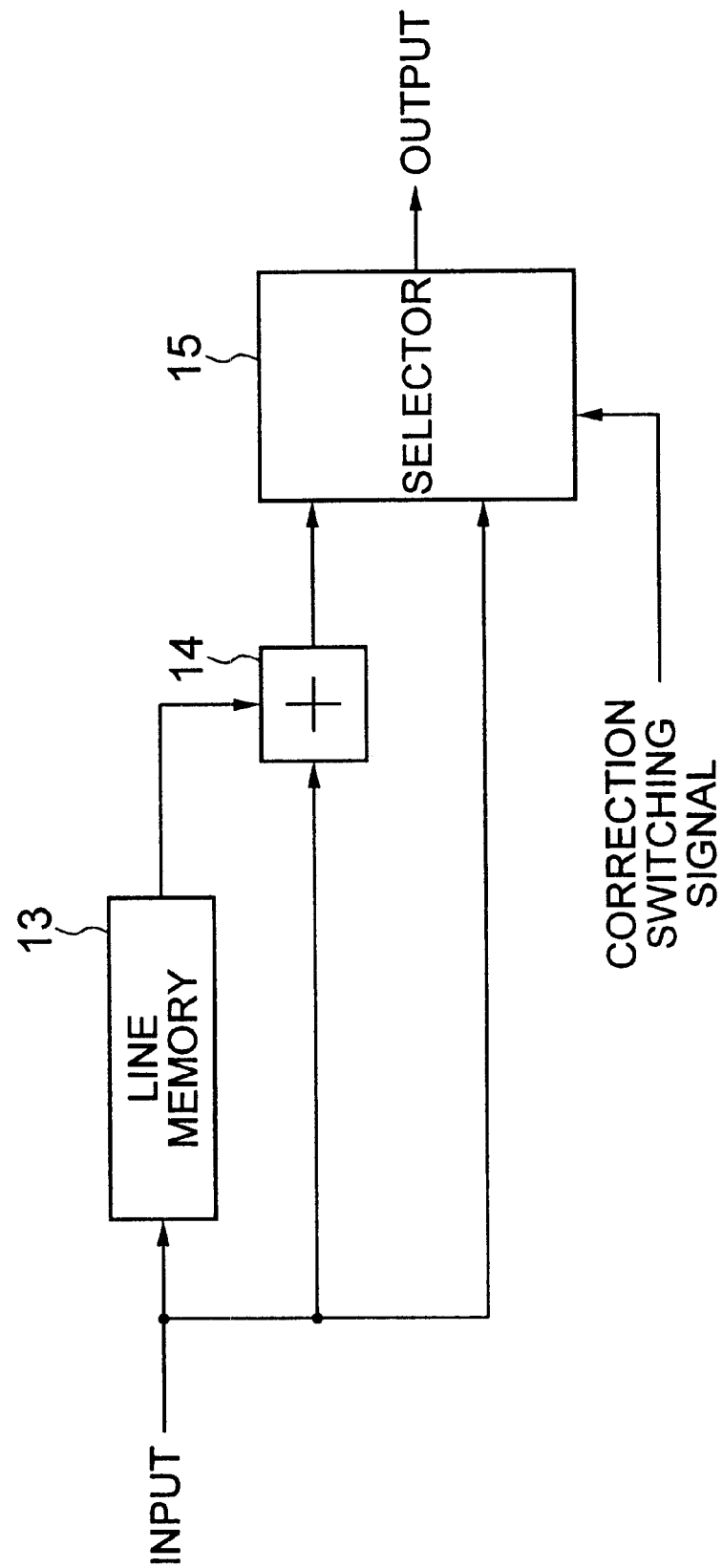
FIG. 10 is a schematic block diagram showing a vertical-phase correction circuit of the imaging apparatus shown in FIG. 9.

The vertical-phase correction circuit 12 includes, as shown in FIG. 10, a line memory 13 for delaying by one horizontal period the image signal read out by the memory control circuit 8; an adder 14 for adding the image signal read out by the memory control circuit 8 and the one-horizontal-period delayed signal from the line memory 13 and dividing the sum by "2"; and a selector 15 for selecting one of an output of the adder 14 and the image signal read out by the memory control circuit 8 in accordance with a correction switching signal from the microcomputer 10.

The operation timing of this imaging apparatus will be described with reference to FIG. 11.

Figure 11:
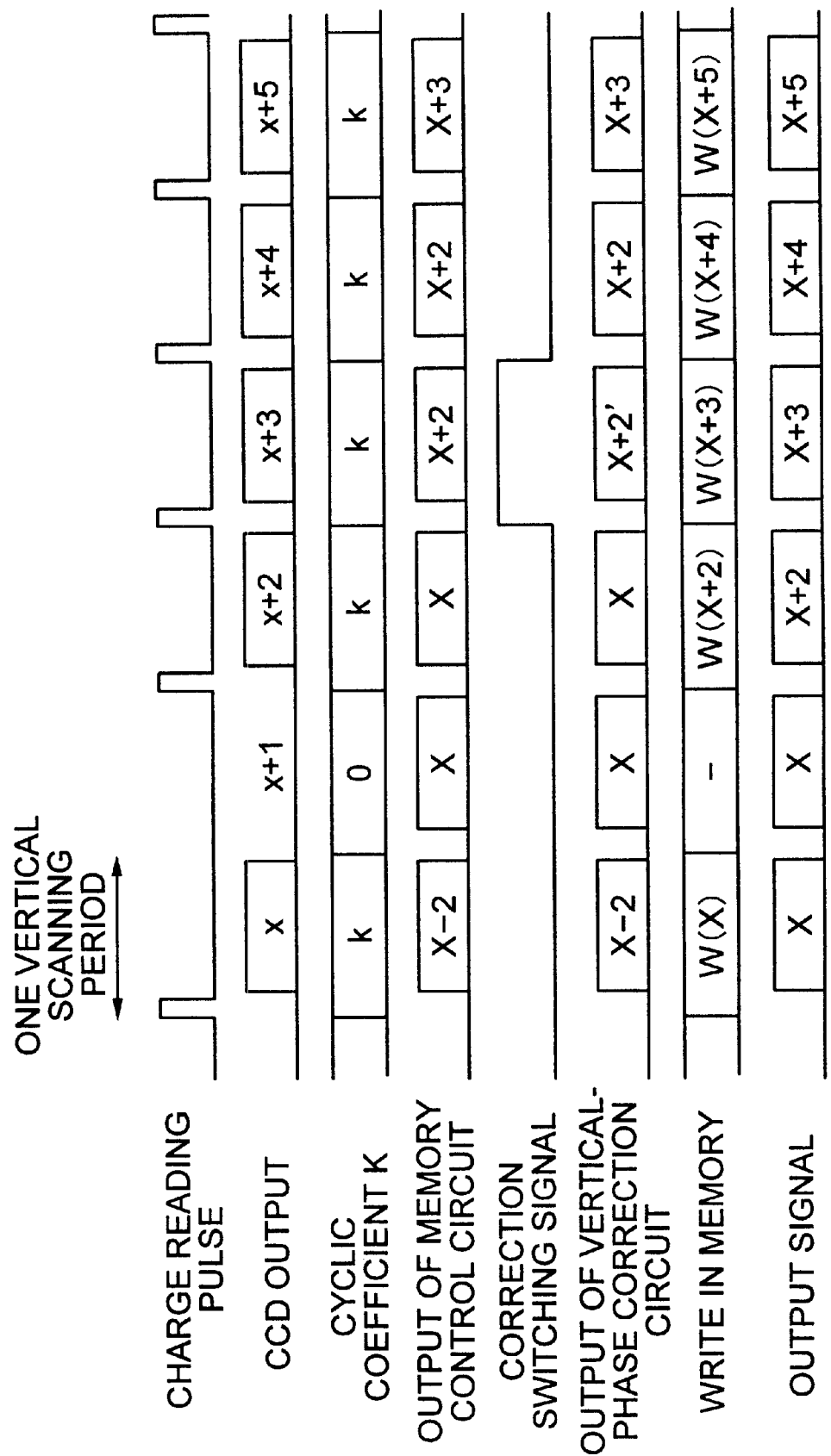
FIG. 11 is a timing chart showing the operation timing of the imaging apparatus shown in FIG. 9 when the 2n-times accumulation sensitivity increase operation is changed to the normal operation.

As illustrated in FIG. 11, the 2-times accumulation sensitivity increase operation is change to the normal operation, the CCD 1 performs the 2-times accumulation sensitivity increase operation until the timing of an image signal x+2, and then performs the normal operation.

The normal operation begins from the timing of an image signal x+3. Since there is no cyclic signal corresponding to the timing of the image signal x+3, an signal X+2 of the opposite field which has just been written to the memory 9 is output from the memory control circuit 8.

Since the signal X+2 is the opposite-field signal of the interlaced signal, it is deviated by ½ line in the vertical phase from the image signal x+3. Thus, the correction switching signal is changed at the timing of the image signal x+3, a ½-line corrected signal X+2' is produced from the vertical-phase correction circuit 12. Thereby, at the timing of the image signal x+3, the ½-line vertical-phase deviation can be corrected with maintaining the cyclic coefficient K to be k. Thus, the noise reduction can be intermittently performed without any uncomfortable feeling.

In this way, even when the 2n-times accumulation sensitivity increase operation is changed to the normal operation, the opposite-field signal in which the ½-line vertical-phase deviation is corrected is used as the cyclic data in one vertical scanning period from this change. Thus, the change from the 2n-times accumulation sensitivity increase operation to the normal operation can be made without any uncomfortable feeling.

Next, another operation timing of the imaging apparatus shown in FIG. 9 when the 2n-times accumulation sensitivity increase operation is changed to the normal operation will be described with reference to FIG. 12.

The CCD 1 performs the 2-times accumulation sensitivity increase operation until the timing of an image signal x+2, and then performs the normal operation.

Figure 12:
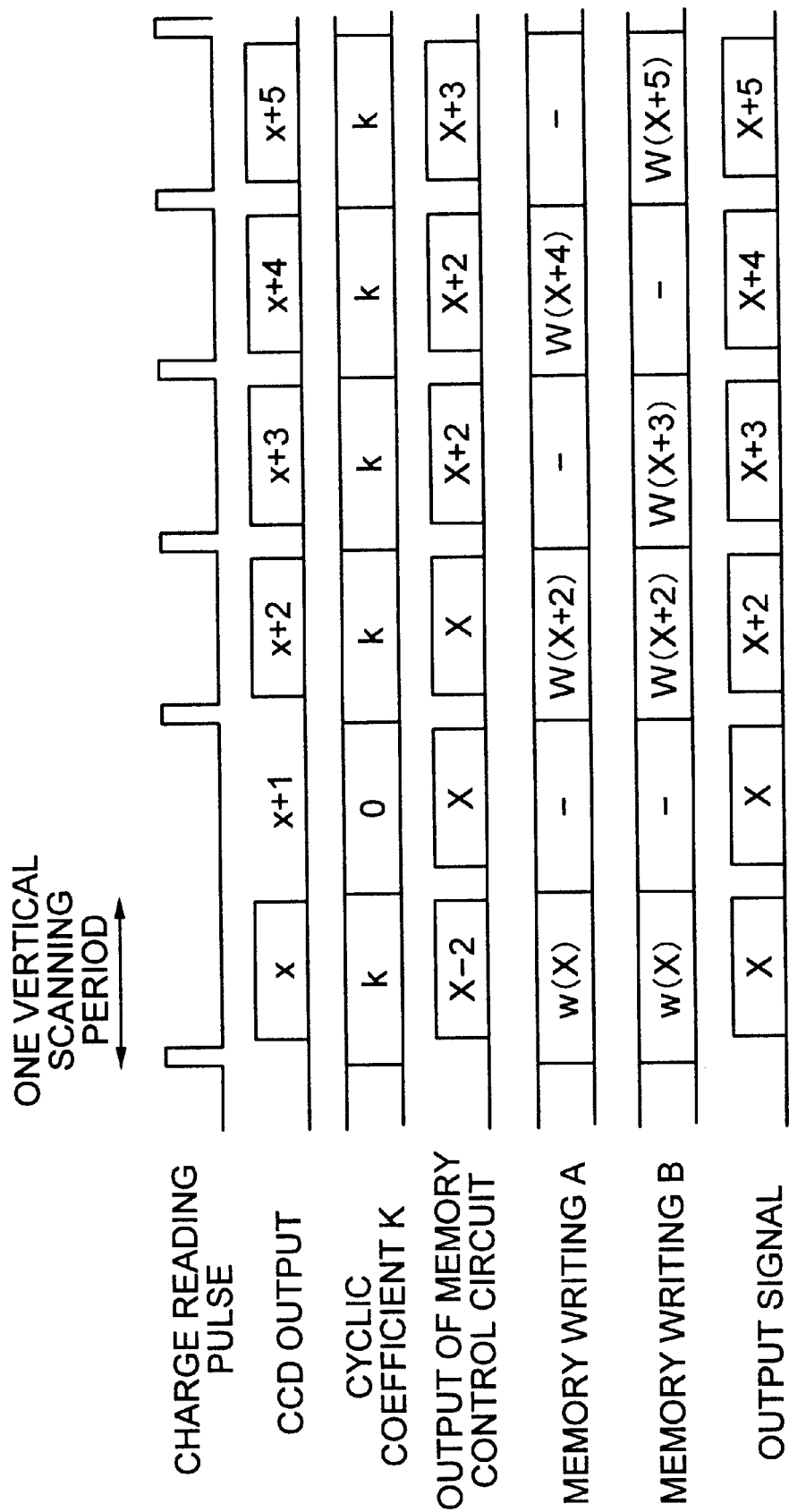
FIG. 12 is a timing chart showing the operation timing of the imaging apparatus according to the first embodiment when the 2n-times accumulation sensitivity increase operation is changed to the normal operation.

As illustrated in FIG. 12, during this accumulation sensitivity increase operation, memory writings A and B which respectively correspond to the two fields are always controlled so that the field signals are written to both of the memories.

The normal operation begins from the timing of an image signal x+3. At the timing of the image signal x+3, since a signal X+2 is previously written to the memory, the recursive NR process is performed to the image signals x+3 and X+2.

Thus, at the timing of the image signal x+3, the noise reduction can be intermittently made without any uncomfortable feeling with maintaining the cyclic coefficient K to be k.

Since the signals are always written to the both memories corresponding to two fields during the accumulation sensitivity increase operation, the change from the 2n-times accumulation sensitivity increase operation to the normal operation can be made without ant uncomfortable feeling with maintaining the cyclic coefficient to be k.

Next, the operation of the imaging apparatus according to this embodiment in the (2n+1) accumulation sensitivity increase operation will be described with reference to FIG. 13.

Figure 13:
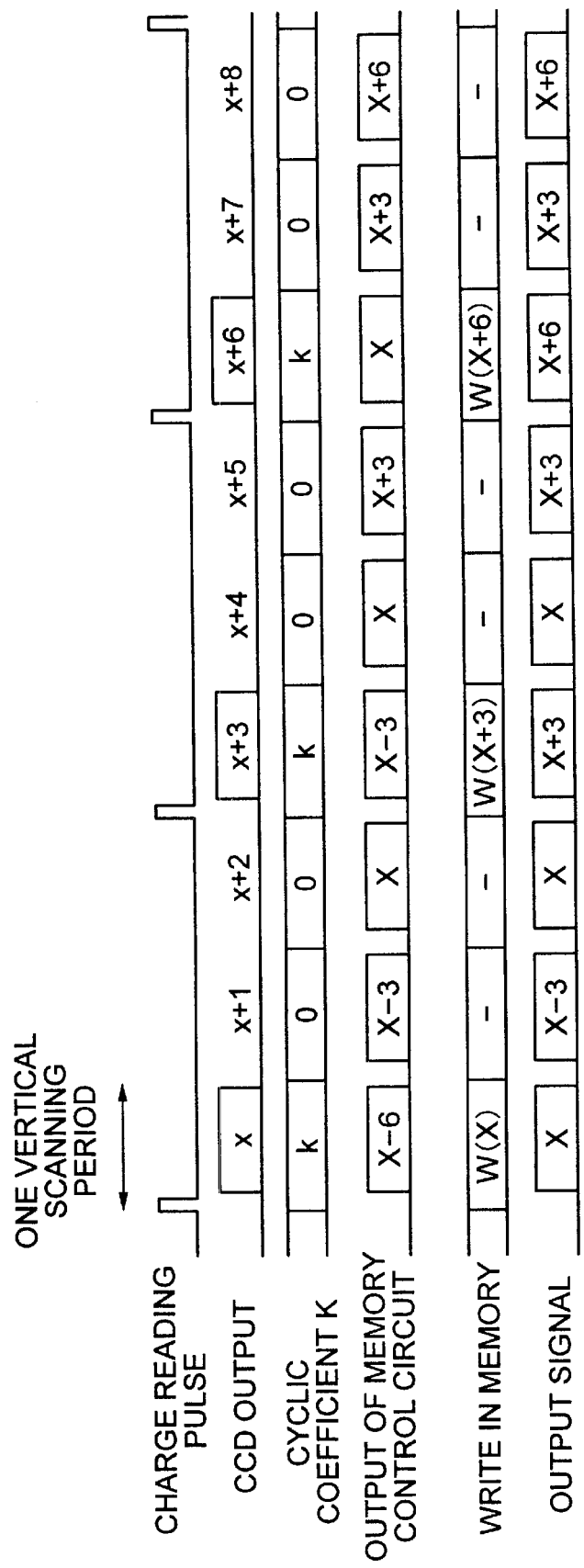
FIG. 13 is a timing chart showing the operation timing of the imaging apparatus according to the first embodiment in the (2n+1)-times accumulation sensitivity increase operation.

As illustrated in FIG. 13, in the 3-times (n=1) accumulation sensitivity increase operation, the charge reading pulse is output from the timing control circuit 11 to the CCD 1 every three vertical scanning periods. The CCD 1 accumulates charges corresponding to three vertical scanning periods to output the accumulated charges as an image signal.

At the timing when an image signal x is output from the CCD 1, the cyclic coefficient K which is input from the microcomputer 10 to the recursive NR circuit 5 is set to be k. The recursive NR circuit 5 performs the arithmetic operation using the image signal x and an output signal X−6 of the memory control circuit 8 which is the most adjacent signal with the same vertical phase in the interlaced signal to produce an output signal X. The output signal X is written to the memory 9.

At the timings of image signals x+1 and x+2, the charge reading pulse is not output from the timing control circuit 11 to the CCD 1, so that the CCD 1 outputs no image signal.

Therefore, the cyclic coefficient K which is input from the microcomputer 10 to the recursive NR circuit 5 is set to be "0". Consequently, the output signals X−3 and X of the memory control circuit 8 are output as the output signals of the recursive NR circuit 5 as they are. At this time, the output signals are not written to the memory 9.

At the timing of an image signal x+3, the image signal x+3 is output from the CCD 1. The recursive NR circuit 5 performs the arithmetic operation using the image signal x+3 and an output signal X−3 of the memory control circuit 8 which is the most adjacent signal with the same vertical phase in the interlaced signal to produce an output signal X+3. The output signal X+3 is written to the memory 9.

Thus, even when the (2n+1)-times accumulation sensitivity increase operation is performed, the output signal can be prevented from its vertical resolution deterioration, and the recursive NR process can be made using the interlaced signals with the same vertical phase.

Second Embodiment

Figure 14:
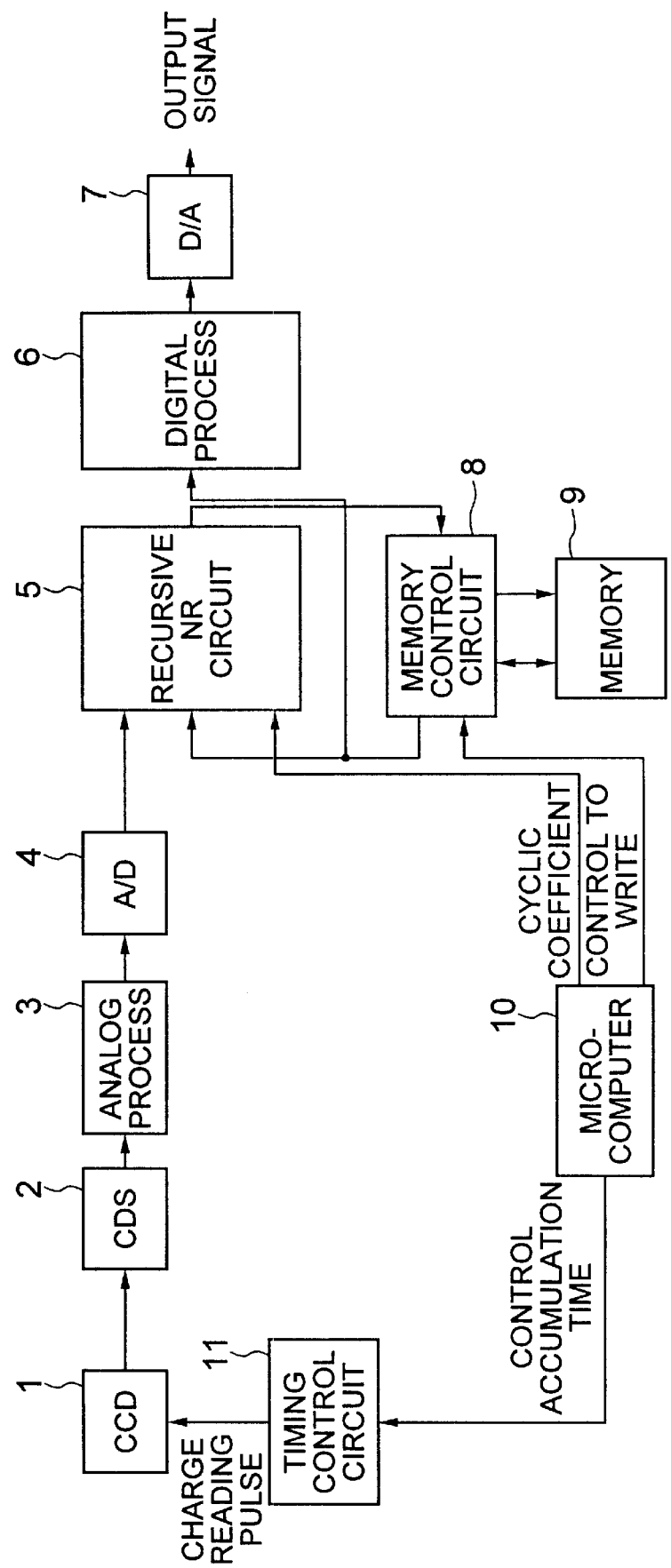
FIG. 14 is a schematic block diagram of an imaging apparatus according to a second embodiment of the invention.

The imaging apparatus according to the second embodiment of the invention will be described. FIG. 14 is a block diagram showing the schematic structure of the imaging apparatus. In the imaging apparatus shown in FIG. 14, the same blocks as those of the imaging apparatus shown in FIG. 1 are identified by the same reference numerals, and their constructions and operations will not be described.

The imaging apparatus shown in FIG. 14 is different from the imaging apparatus shown in FIG. 1 in that the output signal of the recursive NR circuit 5 is supplied not to the digital process circuit 6, but to the memory control circuit 8, and the output signal of the memory control circuit 8 is supplied to the digital process circuit 6.

The operation of this imaging apparatus will be described below.

In this imaging apparatus, the recursive NR circuit 5 performs the recursive filtering process to the image signal in the time-axis direction, and the memory control circuit 8 controls the memory 9 to write the processed image signal. The memory control signal 8 then controls the memory 9 to read out that signal in such a manner as to delay it by two vertical scanning periods. The read-out signal is supplied as a cyclic signal to the recursive NR circuit 5 and also supplied to the digital process circuit 6 where the necessary signal process is performed. The output signal of the digital process circuit is converted into an analog signal by the D/A circuit 7.

Next, the operation timing of this imaging apparatus in the normal operation will be described with reference to FIG. 15.

Figure 15:
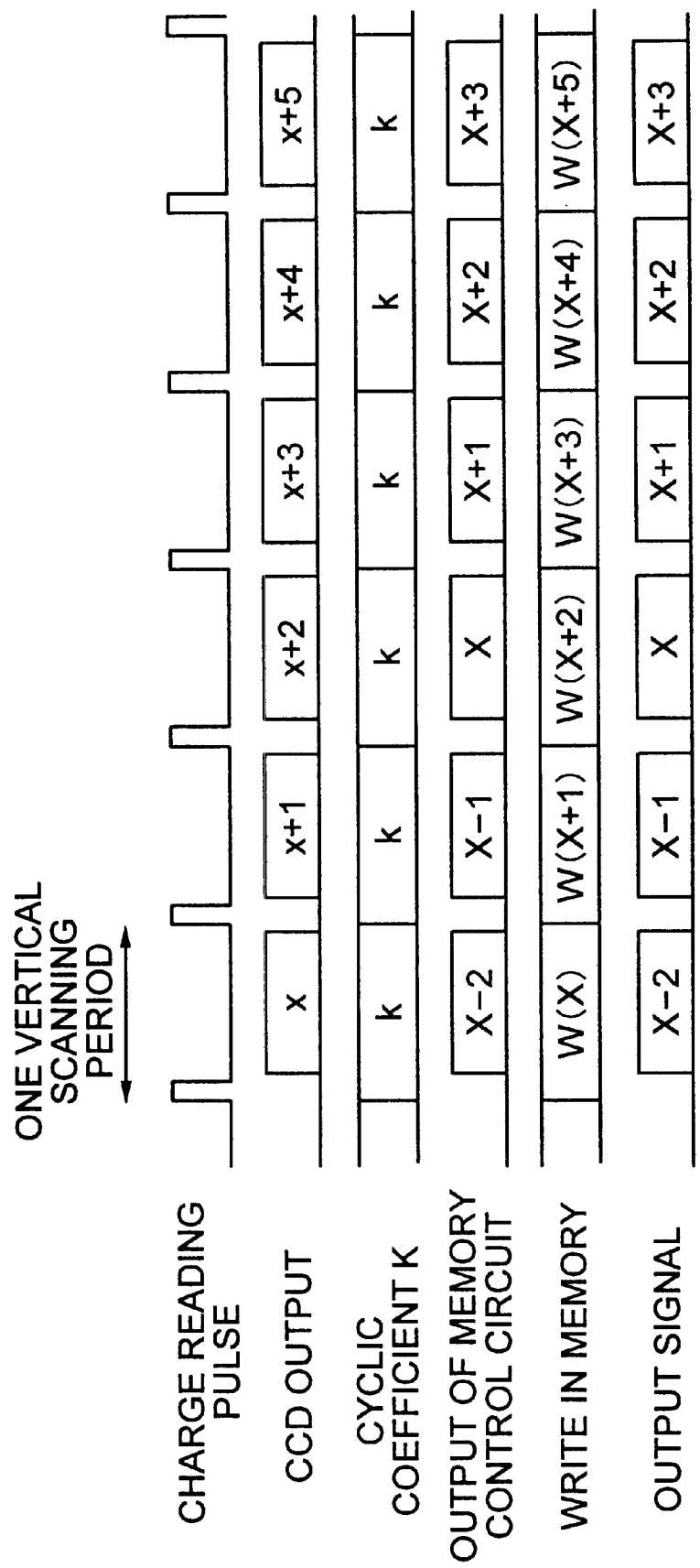
FIG. 15 is a timing chart showing the operation timing of the imaging apparatus according to the second embodiment in the normal operation.

As illustrated in FIG. 15, at the timing when an image signal x is output from the CCD 1, the cyclic coefficient K which is input from the microcomputer 10 to the recursive NR circuit 5 is set to be k. The recursive NR circuit 5 performs the arithmetic operation using the image signal x and an output signal X−2 of the memory control circuit 8. An output signal X of the recursive NR circuit 5 is written to the memory 9. The output signal X−2 of the memory control circuit 8 is output to the outside through the digital process circuit 6 and the D/A circuit 7.

At the timing when an image signal x+1 is output from the CCD 1, the cyclic coefficient K which is input from the microcomputer 10 to the recursive NR circuit 5 is set to be k. The recursive NR circuit 5 performs the arithmetic operation using the image signal x+1 and an output signal X−1 of the memory control circuit 8. An output signal X+1 of the recursive NR circuit 5 is written to the memory 9. The output signal X−1 of the memory control circuit 8 is output to the outside through the digital process circuit 6 and the D/A circuit 7.

Then, the similar operation is repeated.

Next, the operation timing of this imaging apparatus in the 2-times accumulation sensitivity increase operation will be described with reference to FIG. 16.

Figure 16:
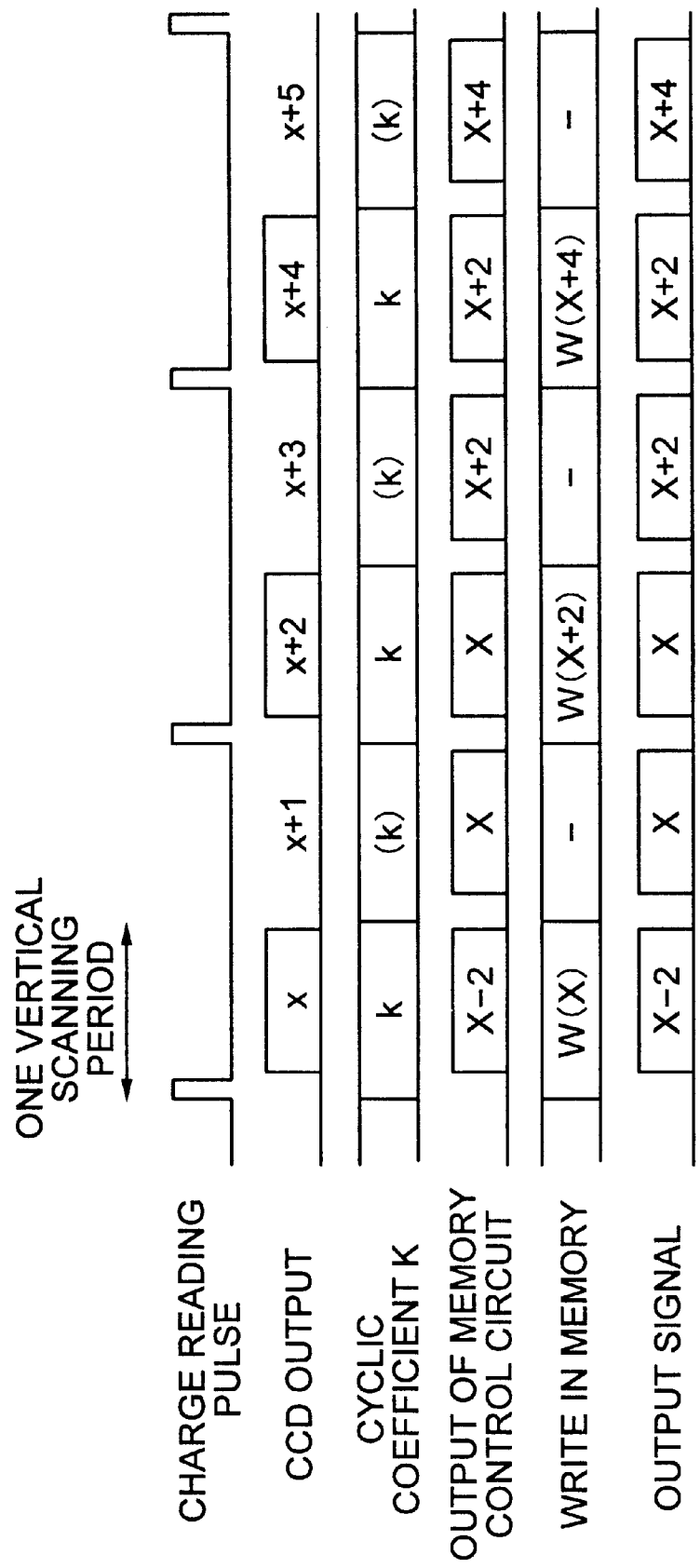
FIG. 16 is a timing chart showing the operation timing of the imaging apparatus according to the second embodiment in the 2n-times accumulation sensitivity increase operation.

As illustrated in FIG. 16, in the 2-times accumulation sensitivity increase operation, at the timing when an image signal x is output from the CCD 1, the cyclic coefficient K which is input from the microcomputer 10 to the recursive NR circuit 5 is set to be k. The recursive NR circuit 5 performs the arithmetic operation using the image signal x and an output signal X−2 of the memory control circuit 8. An output signal X of the recursive NR circuit 5 is written to the memory 9. The output signal X−2 of the memory control circuit 8 is output to the outside through the digital process circuit 6 and the D/A circuit 7.

At the timing when an image signal x+1 is output from the CCD 1, an output signal X of the memory control circuit 8 is output to the outside through the digital process circuit 6 and the D/A circuit 7. At this time, since the output signal of the recursive NR circuit 5 is not written to the memory 9, the cyclic coefficient K may be an arbitrary value. However, if the cyclic coefficient K is set to be k, it is not necessary to switch the values of the cyclic coefficient K according to the timing, and thus the cyclic coefficient can be simply controlled.

Then, the similar operation is repeated.

According to this imaging apparatus, in the normal operation, the signal written to the memory 9 is used as the cyclic signal to the recursive NR circuit 5. Thereby, the recursive NR process is performed using the both-fields signals of the interlaced signal without deteriorating the vertical resolution to perform the noise reduction. Even if the accumulation time of CCD 1 is changed to perform the 2n-times accumulation sensitivity increase operation, the recursive NR circuit can be properly operated and the cyclic coefficient can be simply controlled.

Next, the operation timing of this imaging apparatus when the normal operation is changed to the 2n-times accumulation sensitivity increase operation will be described with reference to FIG. 17.

Figure 17:
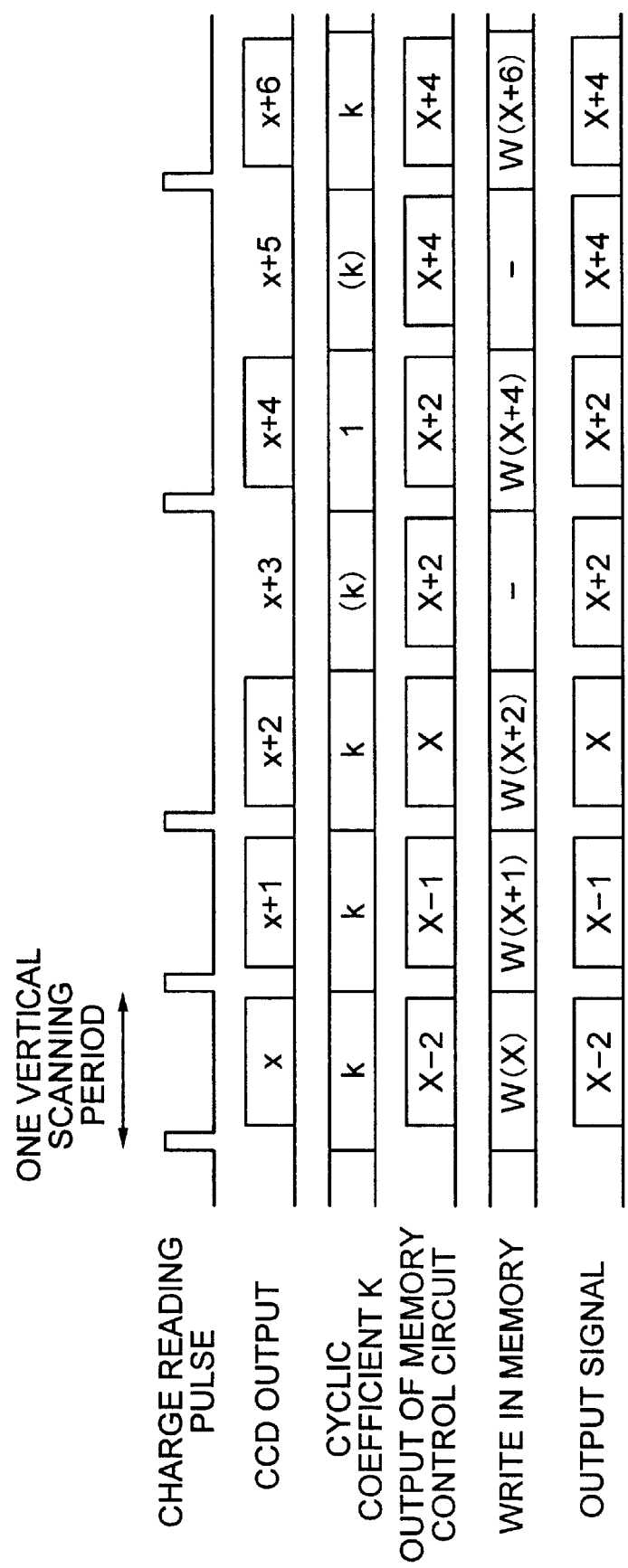
FIG. 17 is a timing chart showing the operation timing of the imaging apparatus according to the second embodiment when the normal operation is changed to the 2n-times accumulation sensitivity increase operation.

As illustrated in FIG. 17, when the normal operation is changed to the 2-times (n=1) accumulation sensitivity increase operation, the CCD 1 performs the normal operation until the timing of an image signal x+2, and then performs the 2-times accumulation sensitivity increase operation.

The 2-times accumulation sensitivity increase operation begins from the timing of an image signal x+3. At the timing of an image signal x+4, an image signal X+2 in the normal operation and the image signal x+4 in the 2-times accumulation sensitivity increase operation are supplied to the recursive NR circuit 5.

However, the recursive NR circuit 5 cannot properly operate because it carries out the arithmetic operation using the two signals with different amplitudes. Consequently, a signal with uncomfortable feeling is output from the recursive NR circuit 5.

Thus, at the timing of the image signal x+4 after two vertical scanning periods from the change of operation, the cyclic coefficient K is set to be "1" so that the image signal from the CCD 1 is output as it is.

Then, the operation shown in FIG. 16 is repeated.

Thus, even when the normal operation is changed to the 2n-times accumulation sensitivity increase operation, the cyclic coefficient K after 2n vertical scanning periods from this change is set to be "1". Thereby, the recursive NR circuit 5 can be prevented from the erroneous operation, and the change from the normal operation to the 2n-times accumulation sensitivity increase operation can be made without any uncomfortable feeling.

Figure 18:
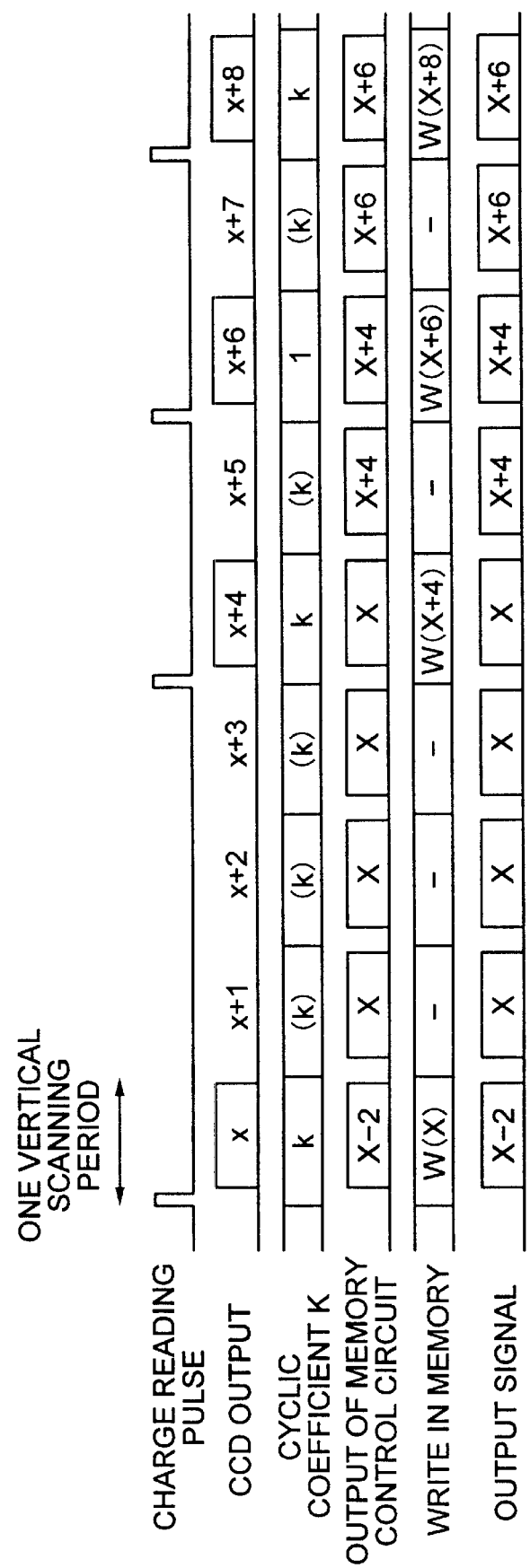
FIG. 18 is a timing chart showing the operation timing of the imaging apparatus according to the second embodiment when the 2m-times accumulation sensitivity increase operation is changed to the 2n-times accumulation sensitivity increase operation.

Next, the operation timing of this imaging apparatus when the 2m-times (m is an integer of "1" or more) accumulation sensitivity increase operation is changed to the 2n-times (n is an integer of "1" or more) accumulation sensitivity increase operation will be described with reference to FIG. 18.

The CCD 1 performs the 4-times (m=2) accumulation sensitivity increase operation until the timing of an image signal x+4, and then performs the 2-times (n=1) accumulation sensitivity increase operation.

The 2-times accumulation sensitivity increase operation begins from the timing of an image signal x+5. At the timing of an image signal x+6, an image signal X+4 in the 4-times accumulation sensitivity increase operation and the image signal x+6 in the 2-times accumulation sensitivity increase operation are supplied to the recursive NR circuit 5.

However, the recursive NR circuit 5 cannot properly operate because it performs the arithmetic operation using the two signals with different amplitudes. Consequently, a signal with uncomfortable feeling is output from the recursive NR circuit 5.

Thus, at the timing of the image signal x+6 after two vertical scanning periods from the change of operation, the cyclic coefficient K is set to be "1" so that the image signal from the CCD 1 is outputted as it is.

Then, the operation shown in FIG. 16 is repeated.

Thus, even when the 2m-times accumulation sensitivity increase operation is changed to the 2n-times accumulation sensitivity increase operation, the cyclic coefficient K after 2n vertical scanning periods from this change is set to be "1". Thereby, it is possible to prevent the recursive NR circuit 5 from the erroneous operation, and to change from the 2m-times accumulation sensitivity increase operation to the 2n-times accumulation sensitivity increase operation without any uncomfortable feeling.

Next, the operation timing of this imaging apparatus when the 2n-times (n is an integer of "1" or more) accumulation sensitivity increase operation is changed to the normal operation will be described with reference to FIG. 19.

The CCD 1 performs the 2-times (n=1) accumulation sensitivity increase operation, and then performs the normal operation.

The normal operation begins from the timing of an image signal x+3. At the timing of the image signal x+3, a signal X+1 should be essentially supplied to the recursive NR circuit 5. However, since the 2-times accumulation sensitivity increase operation is performed, only the one-field signals of the interlaced signal are used. The signal X+1 is not a correct one which has just been written to the memory 9. Therefore, the recursive NR circuit 5 cannot properly operate because it performs the arithmetic operation using the incorrect signal. Consequently, a signal with uncomfortable feeling is output from the recursive NR circuit 5.

Thus, at the timing of the image signal x+3 after one vertical scanning period from the change of operation, the cyclic coefficient K is set to be "1" so that the image signal from the CCD is output as it is. Therefore, since the output signal of the memory control circuit 8 is output to the outside as the output signal, the signal X+2 is output from the memory 9.

In this way, even when the 2n-times accumulation sensitivity increase operation is changed to the normal operation, the cyclic coefficient K after one vertical scanning period from this change is set to be "1". Thereby, the recursive NR circuit 5 can be prevented from the erroneous operation, and the imaging apparatus has no uncomfortable feeling.

Figure 20:
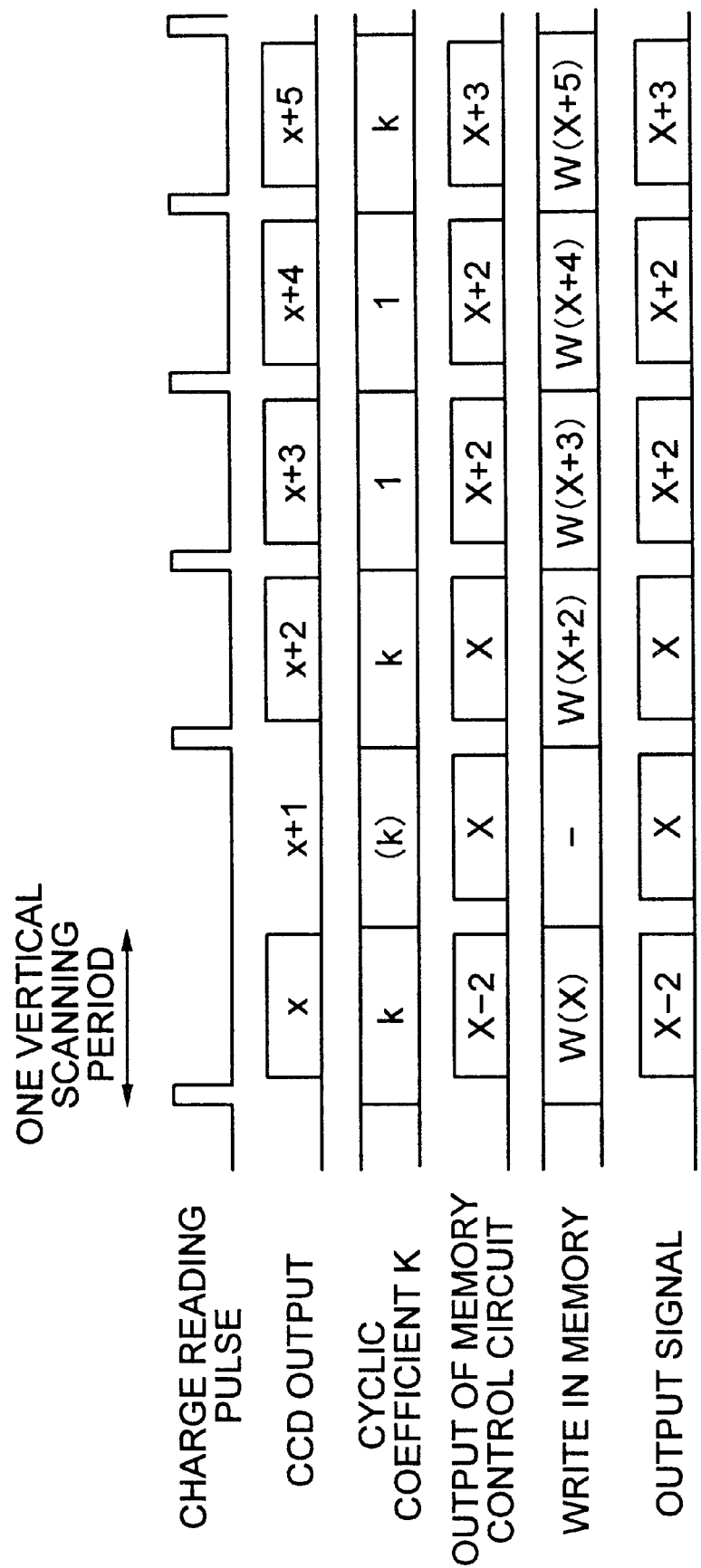
FIG. 20 is a timing chart showing the operation timing of the imaging apparatus according to the second embodiment when the 2n-times accumulation sensitivity increase operation is changed to the normal operation.

Next, the operation timing of this imaging apparatus when the 2n-times (n is an integer of "1" or more) accumulation sensitivity increase operation is changed to the normal operation will be described with reference to FIG. 20.

Figure 19:
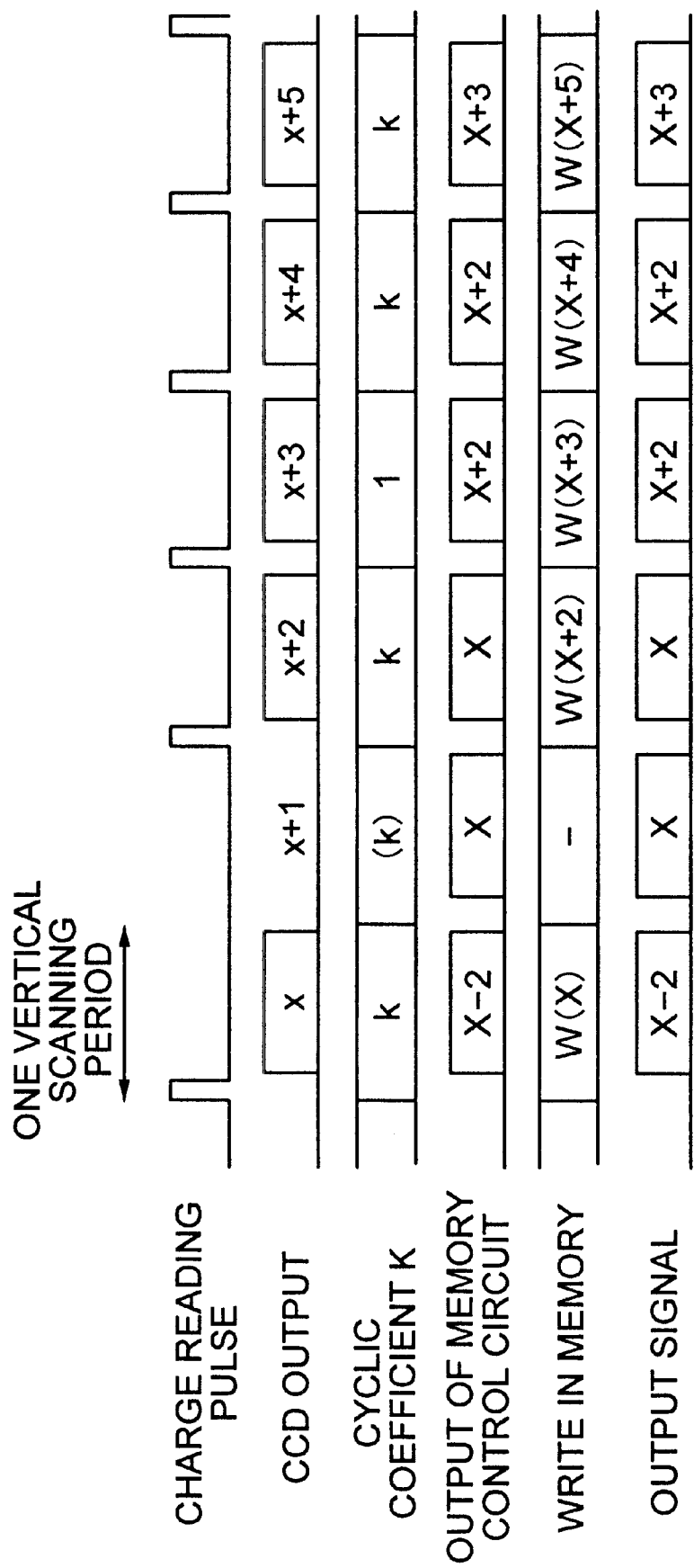
FIG. 19 is a timing chart showing the operation timing of the imaging apparatus according to the second embodiment when the 2-times accumulation sensitivity increase operation is changed to the normal operation.

At the operation timings shown in FIG. 19, a signal X+3 written to the memory 9 is an image signal x+3 from the CCD 1, and an signal X+4 is a noise-reduced signal from the recursive NR circuit 5. Thus, the signal between the fields of the interlaced signal is a signal with uncomfortable feeling.

Thus, at the timings of the image signals x+3 and x+4 in the two vertical scanning periods after one vertical scanning period from the change of operation, the cyclic coefficient K is set to be "1" so that the image signals x+3 and x+4 from the CCD 1 are outputted as they are.

In this way, even when the 2n-times accumulation sensitivity increase operation is changed to the normal operation, the cyclic coefficient K in two vertical scanning periods after one vertical scanning period from this change is set to be "1". Thereby, the uncomfortable feeling between the fields of the interlaced signal can be removed, and the change of the 2n-times accumulation sensitivity increase operation to the normal operation can be made without any uncomfortable feeling.

Figure 21:
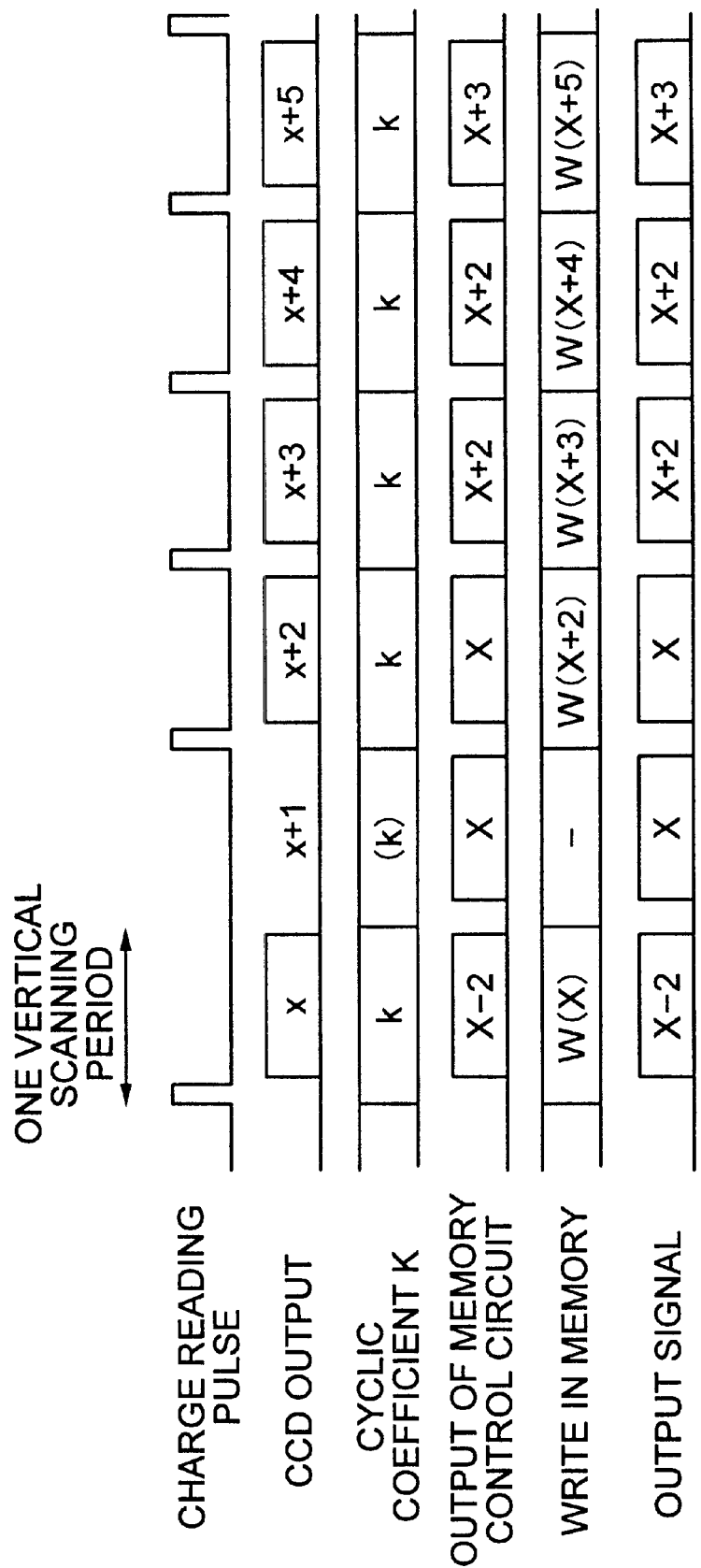
FIG. 21 is a timing chart showing the operation timing of the imaging apparatus according to the second embodiment when the 2n-times accumulation sensitivity increase operation is changed to the normal operation.

Next, still another operation timing of this imaging apparatus when the 2n-times (n is an integer of "1" or more) accumulation sensitivity increase operation is changed to the normal operation will be described with reference to FIG. 21.

The CCD 1 performs the 2-times (n=1) accumulation sensitivity increase operation until the timing of an image signal x+2, and then performs the normal operation.

The normal operation begins from the timing of an image signal x+3. Since there is no cyclic signal corresponding to the timing of the image signal x+3, an signal X+2 of the opposite field which has just been written to the memory 9 is output from the memory control circuit 8.

Thereby, at the timing of the image signal x+3, the cyclic coefficient K is maintained to be k, and the noise reduction can be intermittently made without any uncomfortable feeling.

Thus, even when the 2n-times accumulation sensitivity increase operation is changed to the normal operation, the opposite-field signal is output as the cyclic data in one vertical scanning period after one vertical scanning period from this change. Thereby, the recursive NR circuit 5 can be prevented from the erroneous operation, and the change from the 2n-times accumulation sensitivity increase operation to the normal operation can be made without any uncomfortable feeling.

Next, another imaging apparatus according to this embodiment will be described with reference to FIG. 22. In the imaging apparatus shown in FIG. 22, the blocks corresponding to those of the imaging apparatus shown in FIG. 1 are identified by the same reference numerals, and their constructions and operations will not be described.

Figure 22:
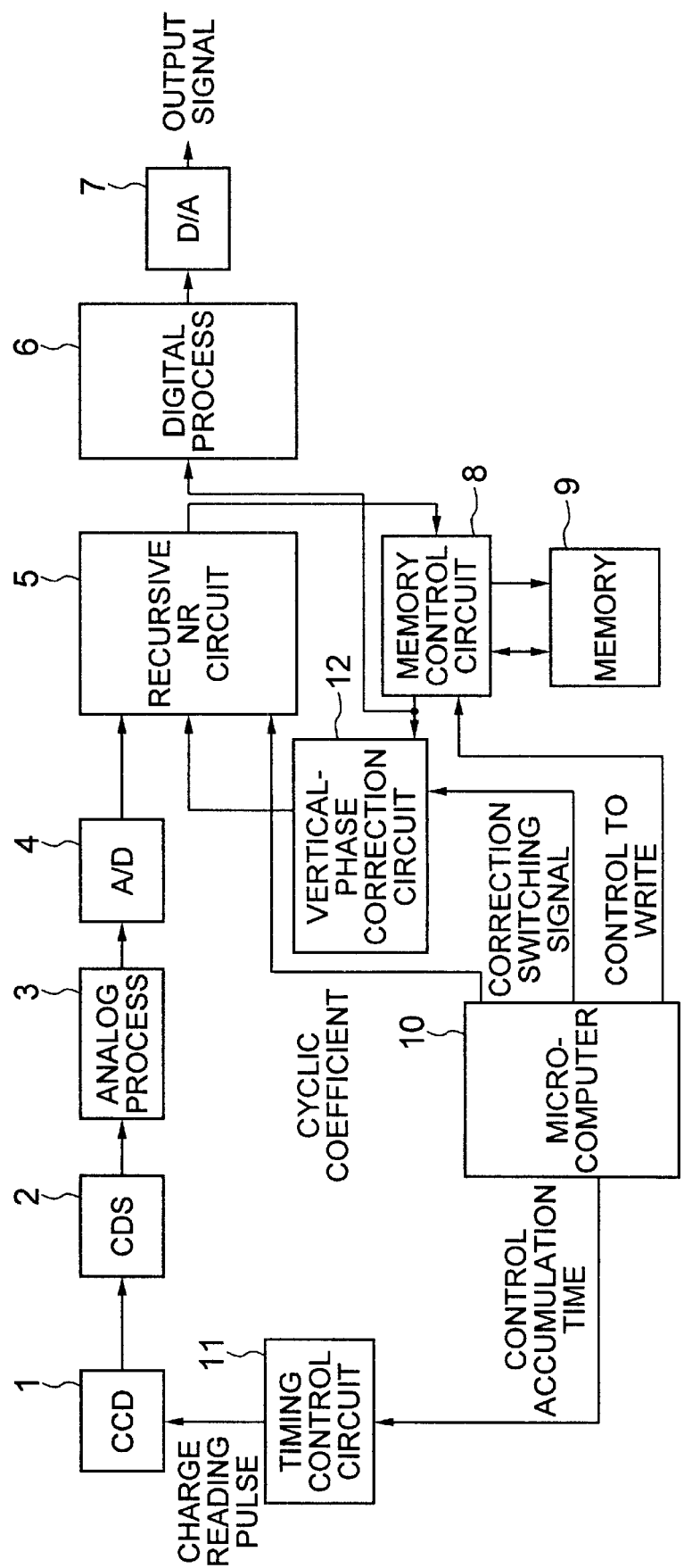
FIG. 22 is a block diagram showing a modification of the imaging apparatus according to the second embodiment.

The imaging apparatus shown in FIG. 22 includes the vertical-phase correction circuit 12 that performs the vertical-phase correction process in which the ½-line spatial phase shift is corrected to the image signal of the opposite field read out by the memory control circuit 8, to supply the vertical-phase-correction processed image signal to the recursive NR circuit 5.

The vertical-phase correction circuit 12, as shown in FIG. 10, includes: the memory 13 for delaying by one horizontal scanning period the image signal read out by the memory control circuit 8; the adder 14 for adding the image signal read out by the memory control circuit 8 and the image signal delayed by one horizontal scanning period by the line memory 13 and diving the sum by "2"; and the selector 15 for switching the output of the adder 14 and the image signal read out by the memory control circuit 8 in accordance with the correction switching signal from the microcomputer 10.

Next, the operation timing of this imaging apparatus when the 2n-times accumulation sensitivity increase operation is changed to the normal operation will be described with reference to FIG. 23.

Figure 23:
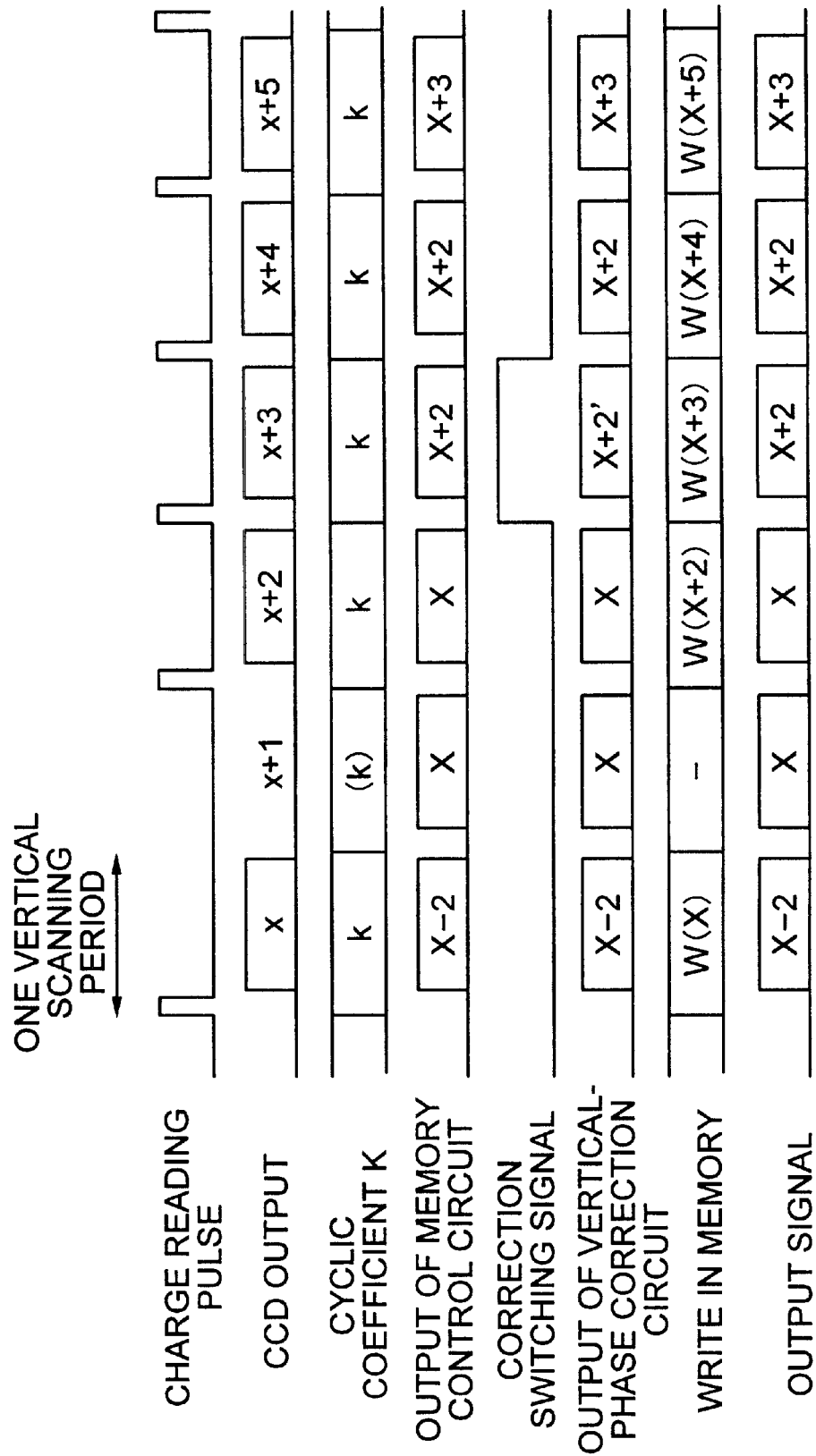
FIG. 23 is a timing chart showing the operation timing of the imaging apparatus shown in FIG. 22 when the 2n-times accumulation sensitivity increase operation is changed to the normal operation.

As illustrated in FIG. 23, when the 2-times (n=1) accumulation sensitivity increase operation is changed to the normal operation, the CCD 1 performs the 2-times accumulation sensitivity increase operation until the timing of an image signal x+2, and then performs the normal operation.

The normal operation begins from the timing of an image signal x+3. Since there is no cyclic signal corresponding to the timing of the image signal x+3, a signal X+2 of the opposite field which has just been written to the memory 9 is output from the memory control circuit 8.

Since the signal X+2 is the opposite-field signal of the interlaced signal, the vertical phase of the signal X+2 deviates by ½ line from the image signal x+3.

Thus, a ½-line corrected signal X+2' is output from the vertical-phase correction circuit 12 by changing the correction switching signal at the timing of the image signal x+3. Consequently, at the timing of the image signal x+3, the cyclic coefficient K is maintained to be k and the ½-line vertical phase shift is corrected, so that the noise reduction can be performed without any uncomfortable feeling.

In this way, even when the 2n-times accumulation sensitivity increase operation is changed to the normal operation, the opposite-field signal is output as the cyclic data in one vertical scanning period after one vertical scanning period from this change to correct the ½-line vertical phase shift.

Thereby, the recursive NR circuit 5 can be prevented from the erroneous operation, and the change from the 2n-times accumulation sensitivity increase operation to the normal operation can be made without any uncomfortable feeling.

Next, another operation timing of this imaging apparatus when the 2n-times(n is an integer of "1" or more) accumulation sensitivity increase operation is changed to the normal operation will be described with reference to FIG. 24.

The CCD 1 performs the 2-times (n=1) accumulation sensitivity increase operation until the timing of an image signal x+2, and then performs the normal operation.

Figure 24:
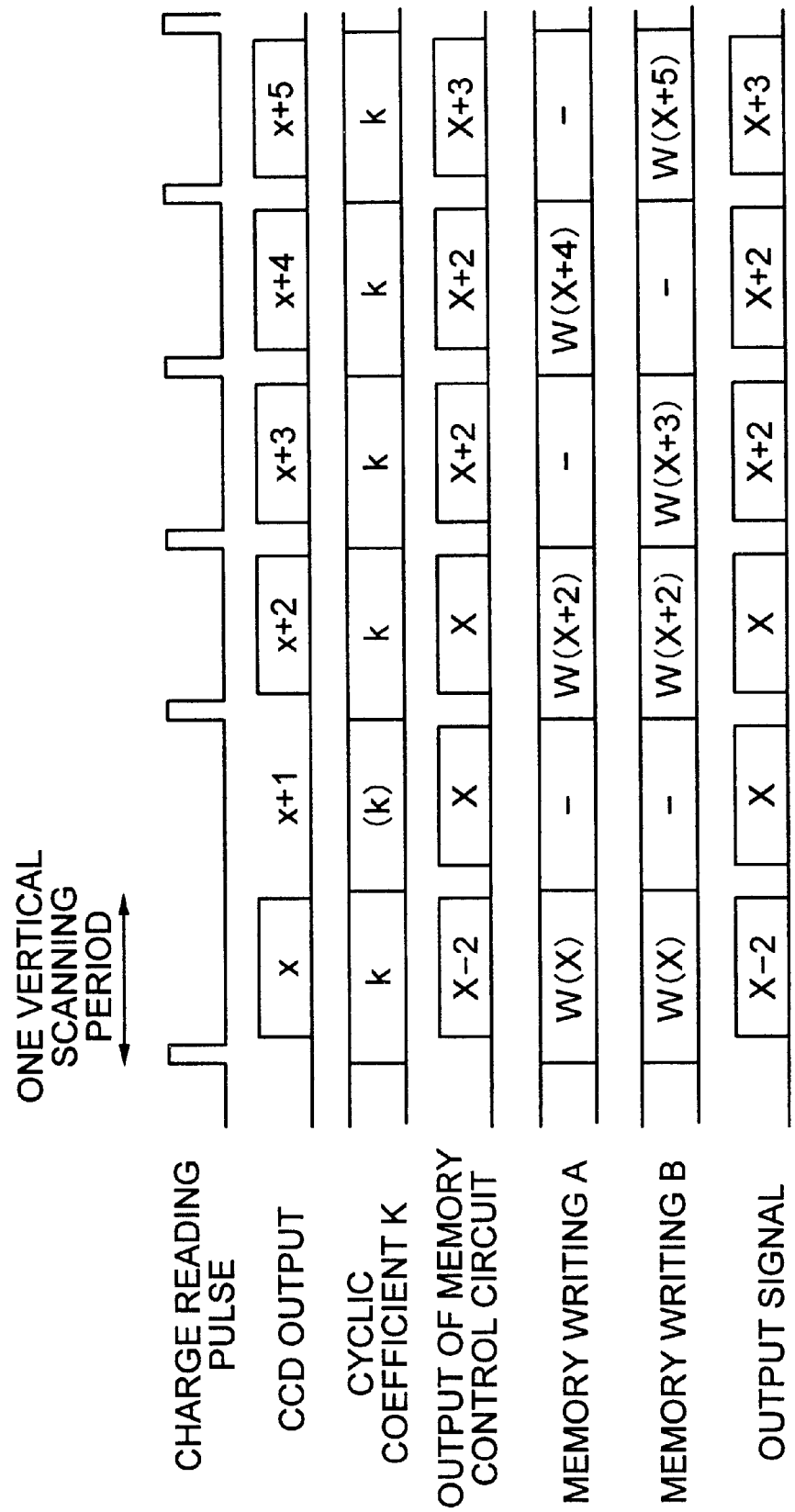
FIG. 24 is a timing chart showing the operation timing of the imaging apparatus according to the second embodiment when the 2n-times accumulation sensitivity increase operation is changed to the normal operation.

As illustrated in FIG. 24, during the accumulation sensitivity increase operation, the memory writing A and the memory writing B which respectively correspond to the two fields are always controlled so that the field signals are written to the two memories.

The normal operation begins from the timing of an image signal x+3. In the output of the memory control circuit 8 corresponding to the timing of the image signal x+3, the recursive NR process is performed using the image signal x+3 and an signal X+2 since the signal X+2 is previously written to the memory 9.

Thereby, at the timing of the image signal x+3, the cyclic coefficient K is maintained to be k and the noise reduction can be intermittently made without any uncomfortable feeling.

Thus, the signals are written to both memories corresponding to the two fields during the accumulation sensitivity increase operation. Thereby, even when the 2n-times accumulation sensitivity increase operation is changed to the normal operation, the recursive NR circuit 5 can be prevented from the erroneous operation, and the change from the 2n-times accumulation sensitivity increase operation to the normal operation can be made without any uncomfortable feeling.

Figure 25:
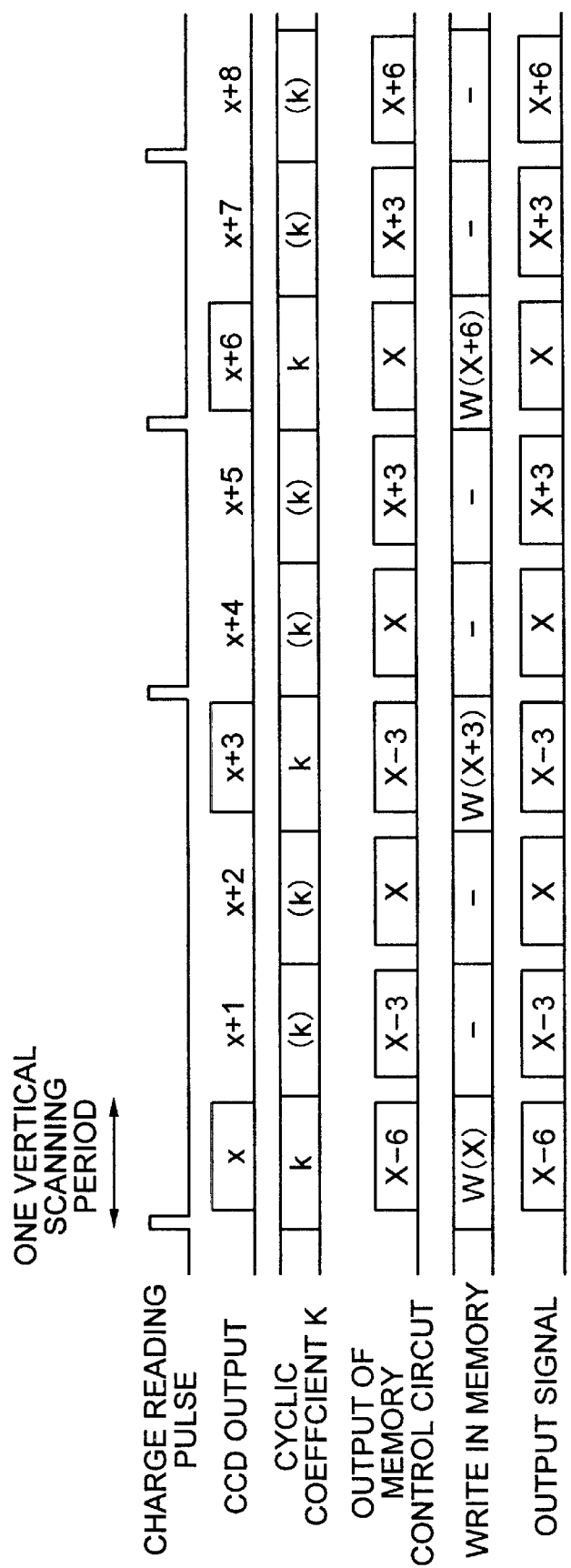
FIG. 25 is a timing chart showing the operation timing of the imaging apparatus according to the second embodiment in the (2n+1)-times accumulation sensitivity increase operation.

Next, the operation timing of this imaging apparatus in the (2n+1) (n is an integer of "1" or more) accumulation sensitivity increase operation will be described with reference to FIG. 25.

In the 3-times (n=1) accumulation sensitivity increase operation, at the timing when an image signal x is output from the CCD 1, the cyclic coefficient K which is input from the microcomputer 10 to the recursive NR circuit 5 is set to be k. The recursive NR circuit 5 performs the arithmetic operation using the image signal x and an output signal X−6 of the memory control circuit 8 which is the most adjacent signal with the same vertical phase in the interlaced signal, to produce an output signal X. The output signal X of the memory control circuit 8 is output to the outside through the digital process circuit 6 and the D/A circuit 7.

At the timings of image signals x+1 and x+2, the output signals X−3 and X of the memory control circuit 8 are output to the outside as they are.

Thus, even when the (2n+1) accumulation sensitivity increase operation is performed, the vertical resolution of the output signal can be prevented from deterioration, and the recursive NR process can be performed using the interlaced signals with the same vertical phase.

Third Embodiment

Figure 26:
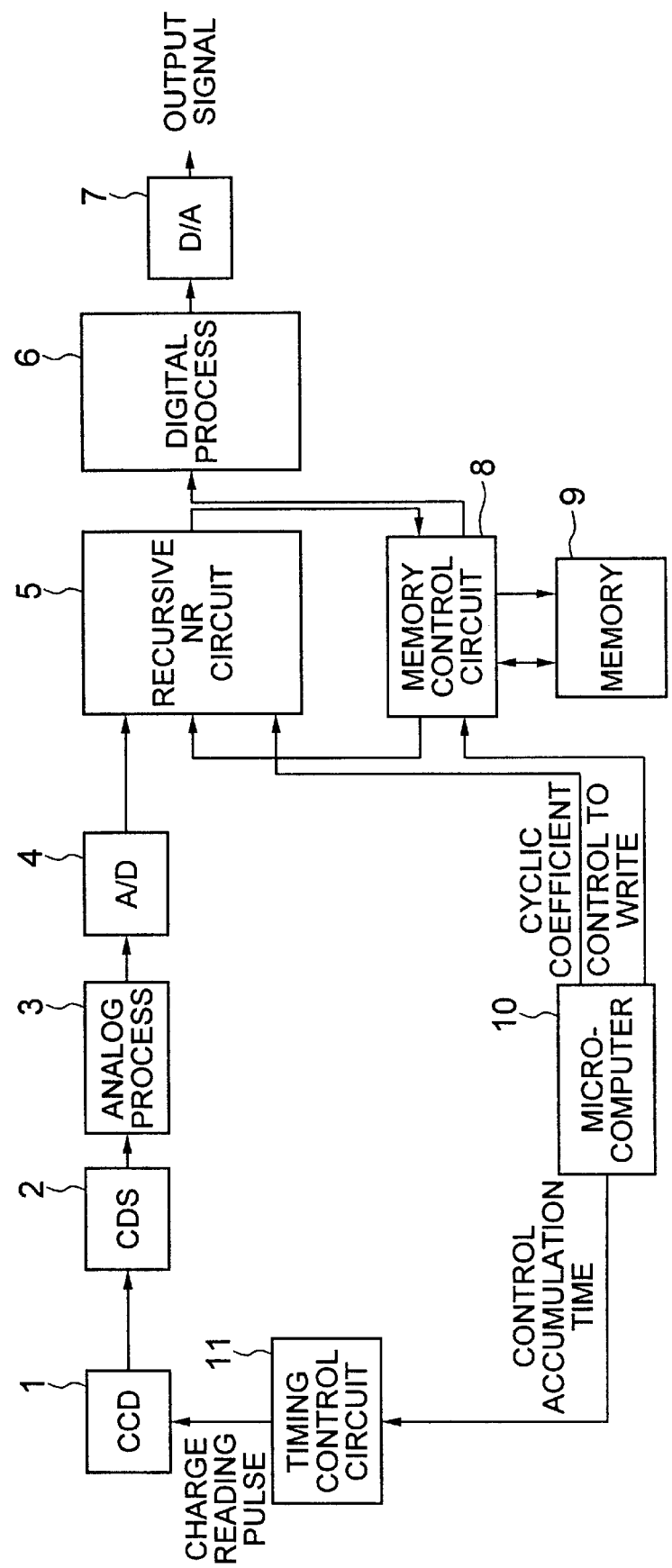
FIG. 26 is a schematic block diagram of an imaging apparatus according to a third embodiment of the invention.

The imaging apparatus according to the third embodiment of the invention will be described below. FIG. 26 is a schematic block diagram of the imaging apparatus according to the third embodiment. In the imaging apparatus shown in FIG. 26, the same blocks as those of the imaging apparatus shown in FIG. 1 are identified by the same reference numerals, and their constructions and operations will not be described.

The imaging apparatus shown in FIG. 26 is different from the imaging apparatus shown in FIG. 1 in that the output signal of the recursive NR circuit 5 is supplied not to the digital process circuit 6, but to the memory control circuit 8, and the output signal of the memory control circuit 8 is supplied as the first output signal to the recursive NR circuit 5 and as the second output signal to the digital process circuit 6.

The operation of this imaging apparatus will be described.

In this imaging apparatus, the recursive NR circuit 5 performs the recursive filtering process to image signal in the time-axis direction, and the recursive-filtering processed signal is supplied to the memory control circuit 8. The memory control circuit 8 writes the recursive-filtering processed image signal to the memory 9.

The memory control circuit 8 reads out from the memory 9 the image signal, which is delayed by two vertical scanning periods, as the first output signal to supply it to the recursive NR circuit 5 as the cyclic signal.

The memory control circuit 8 also supplies the read-out signal from the memory 9 as the second output signal to the digital process circuit 6. The second output signal is converted into an analog signal by the D/A circuit 7, and then output to the outside.

Next, the operation timing of this imaging apparatus in the normal operation will be described with reference to FIG. 27.

Figure 27:
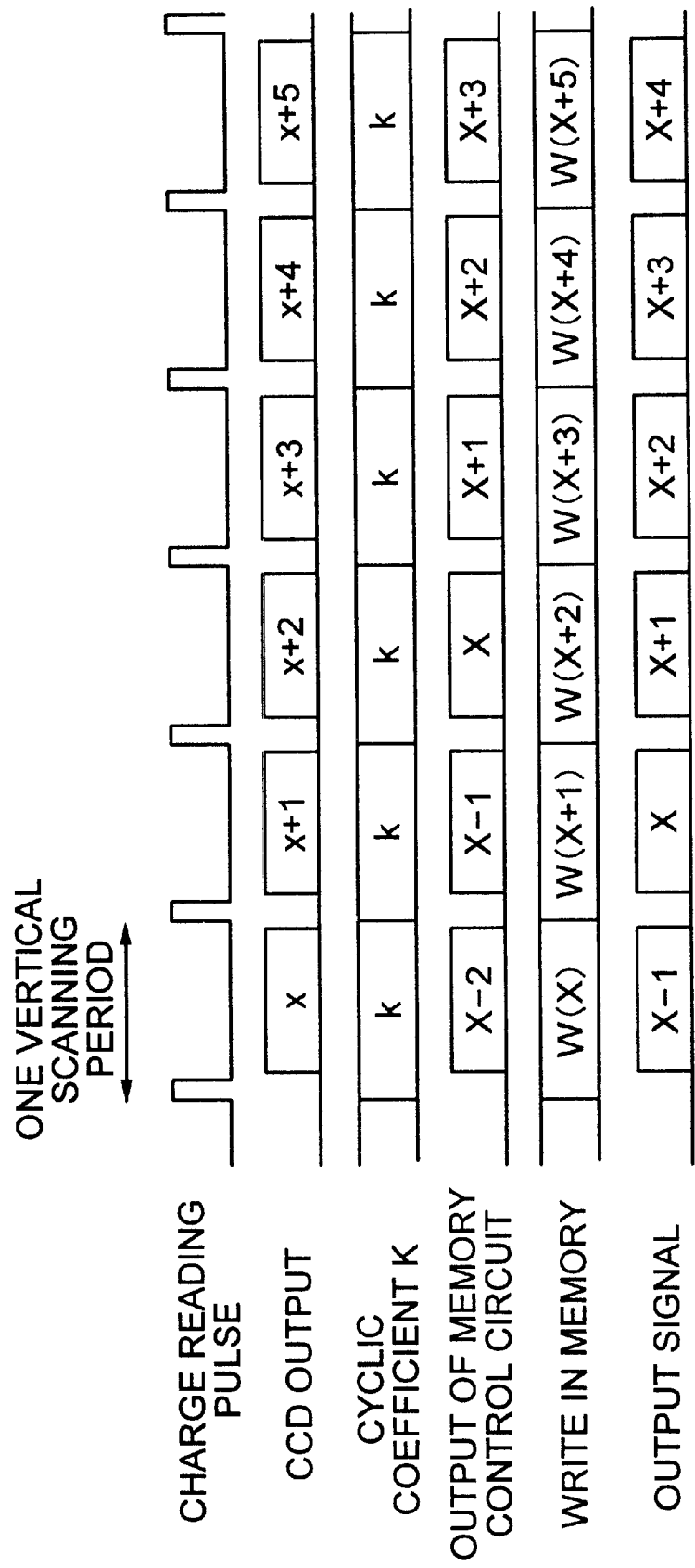
FIG. 27 is a timing chart showing the operation timing of the imaging apparatus according to the third embodiment in the normal operation.

As illustrated in FIG. 27, at the timing when an image signal x is output from the CCD 1, the cyclic coefficient K which is input from the microcomputer 10 to the recursive NR circuit 5 is set to be k. The recursive NR circuit 5 performs the arithmetic operation using the image signal x and the first output signal X−2 of the memory control circuit 8. An output signal X of the recursive NR circuit 5 is written to the memory 9.

An image signal X−1 stored in memory 9 and delayed by one vertical scanning period is output from the memory control circuit 8 as the second output signal.

At the timing when an image signal x+1 is output from the CCD 1, the cyclic coefficient K which is input from the microcomputer 10 to the recursive NR circuit 5 is set to be k. The recursive NR circuit 5 performs the arithmetic operation using the image signal x+1 and the first output signal X−1 of the memory control circuit 8. The memory control circuit 8 writes the output signal X+1 of the recursive NR circuit 5 to the memory 9, and reads out the signal X stored to the memory 9 to output the read out signal X to the digital process circuit 6 as the second output signal.

Figure 28:
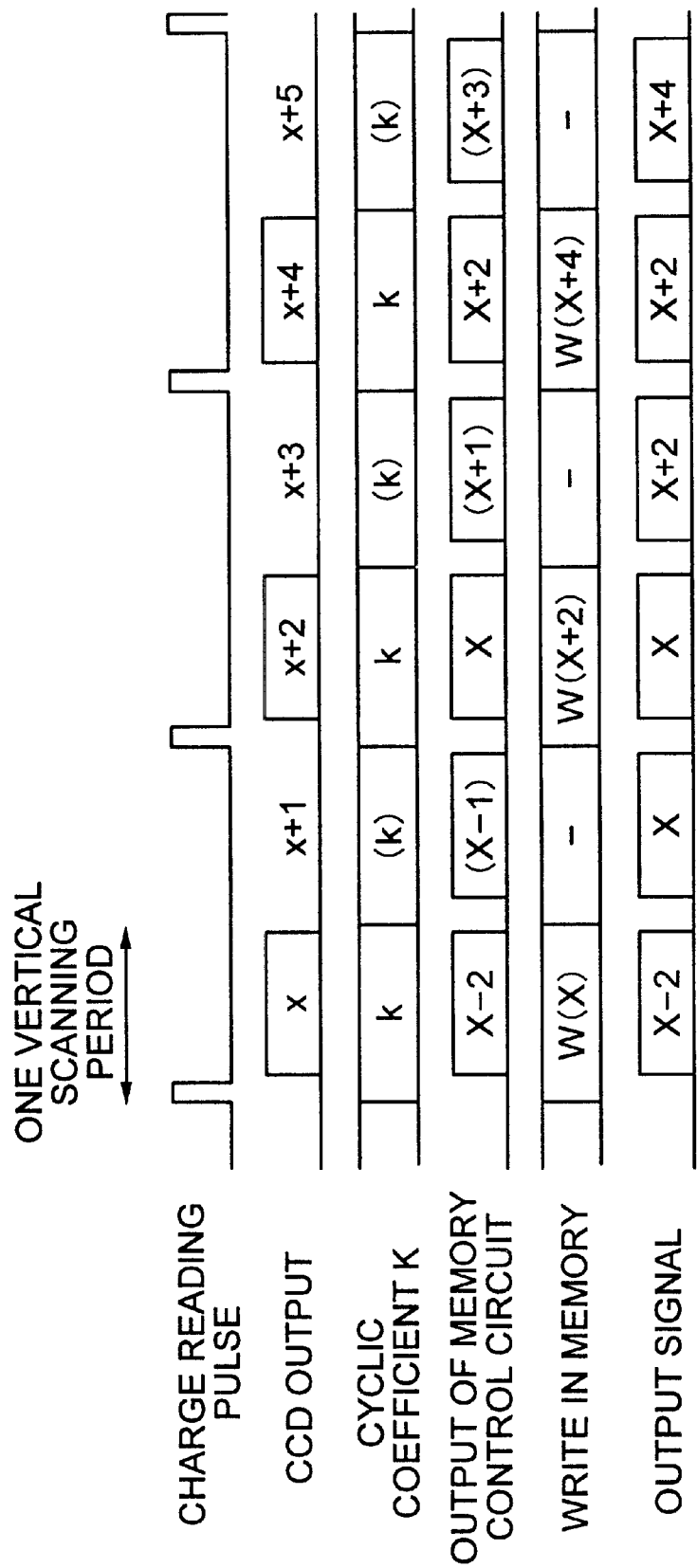
FIG. 28 is a timing chart showing the operation timing of the imaging apparatus according to the third embodiment in the 2n-times accumulation sensitivity increase operation.

Next, the operation timing of this imaging apparatus in the 2-times accumulation sensitivity increase operation will be described with reference to FIG. 28.

At the timing when an image signal x is output from the CCD 1, the cyclic coefficient K which is input from the microcomputer 10 to the recursive NR circuit 5 is set to be k. The arithmetic process is performed using the image signal x and the first output signal X−2 of the memory control circuit 8. The memory control circuit 8 controls writes the output signal X of the recursive NR circuit 5 to the memory 9 and reads out the signal X−2 stored in the memory 9 to output the read-out signal X−2 to the digital process circuit 6 as the second output signal.

At the timing of an image signal x+1, since the image signal x+1 is not output from the CCD 1, the output signal of the recursive NR circuit 5 is not written to the memory 9, and the first output signal of the memory control circuit 8 may be the signal of arbitrary timing. However, since the image signal X−1 is output as the first output signal, the accumulation sensitivity increasing operation can be controlled in the same way as the normal operation, and the first output signal can be simply controlled.

In addition, since the cyclic coefficient K may be the arbitrary value, the cyclic coefficient K is set to be k. Thereby, there is no need to switch the cyclic coefficients according to the timing, and the cyclic coefficient can be simply controlled.

According to this imaging apparatus, in the normal operation, the signal stored in the memory 9 is used as the cyclic signal to the recursive NR circuit 5. Thus, the noise reduction by the recursive NR process can be made without deteriorating the vertical resolution by use of the both-fields signals of the interlaced signal. Also, even if the 2n-times accumulation sensitivity increase operation is performed by changing the accumulation time of CCD 1, the recursive NR circuit 5 can be properly operated, and the cyclic coefficient and the memory output can be simply controlled.

Next, the operation timing of this imaging apparatus when the normal operation is changed to the 2n-times accumulation sensitivity increase operation will be described with reference to FIG. 29.

Figure 29:
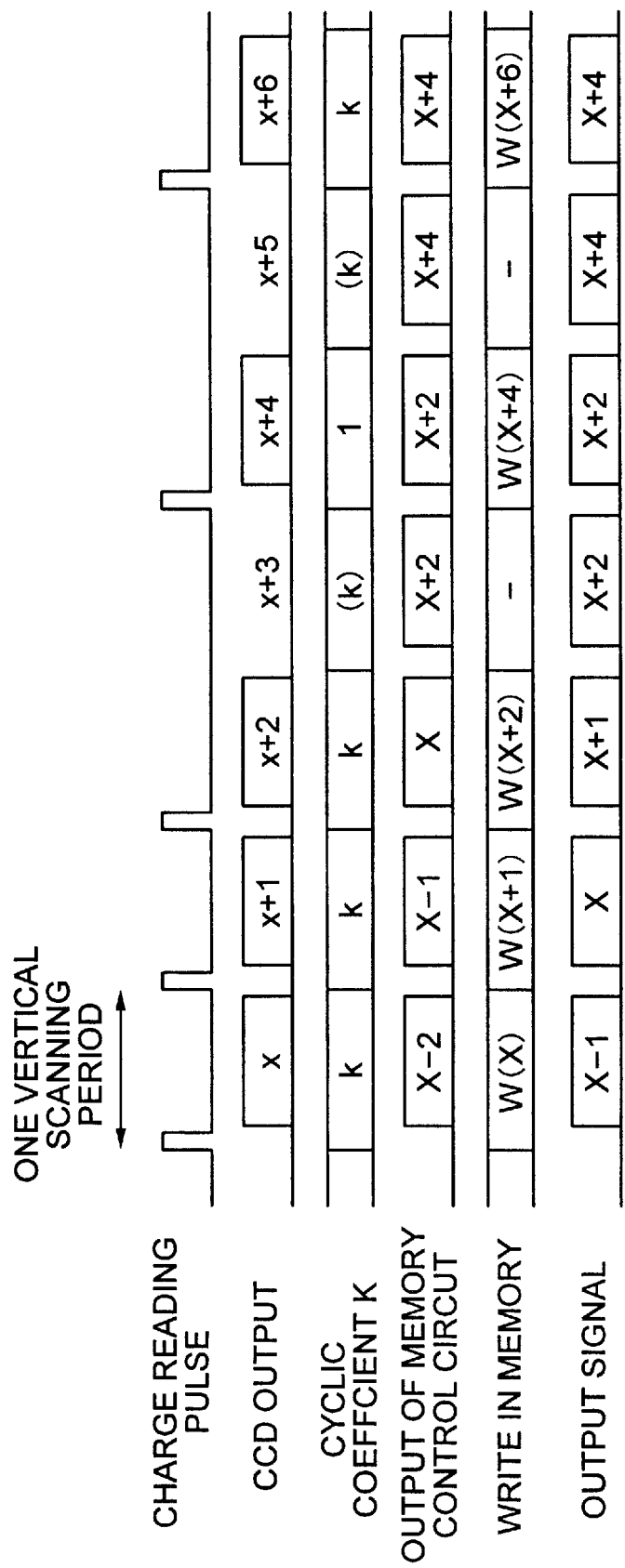
FIG. 29 is a timing chart showing the operation timing of the imaging apparatus according to the third embodiment when the normal operation is changed to the 2n-times accumulation sensitivity increase operation.

As illustrated in FIG. 29, the CCD 1 performs the normal operation until the timing of an image signal x+2, and then performs the 2-times (n=1) accumulation sensitivity increase operation.

The 2-times accumulation sensitivity increase operation begins from the timing of an image signal x+3. At the timing of an image signal x+4, an image signal X+2 in the normal operation and the image signal x+4 in the 2-times accumulation sensitivity increase operation are supplied to the recursive NR circuit 5.

However, the recursive NR circuit 5 cannot properly operate because it performs the arithmetic operation using the two signals with different amplitudes. Consequently, a signal with uncomfortable feeling is output from the recursive NR circuit 5.

Thus, at the timing of the image signal x+4 after two vertical scanning periods from the change of operation, the cyclic coefficient K is set to be "1" so that the image signal from the CCD 1 can be output.

In this way, even when the normal operation is changed to the 2n-times accumulation sensitivity increase operation, the cyclic coefficient after 2n vertical scanning periods from this change is set to be "1". Thereby, the recursive NR circuit 5 can be prevented from the erroneous operation, and the change from the normal operation to the 2n-times accumulation sensitivity increase operation can be made without any uncomfortable feeling.

Next, the operation timing of this imaging apparatus when the 2m-times (m is an integer of "1" or more) accumulation sensitivity increase operation is changed to the 2n-times (n is an integer of "1" or more) accumulation sensitivity increase operation will be described with reference to FIG. 30.

Figure 30:
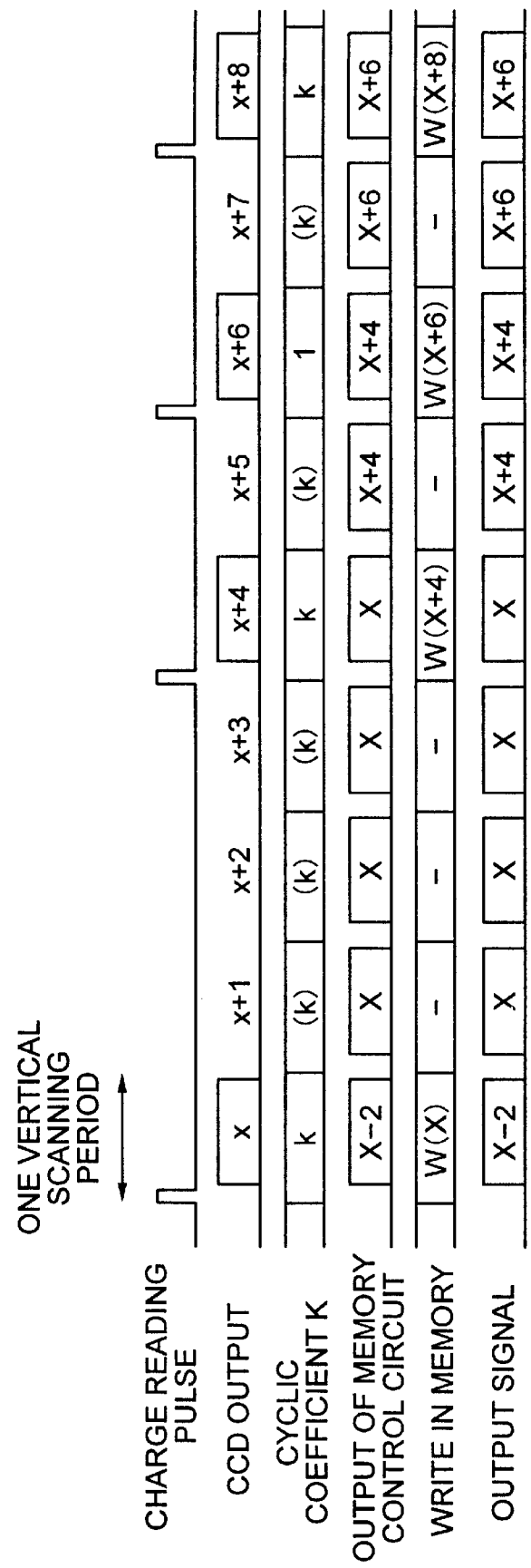
FIG. 30 is a timing chart showing the operation timing of the imaging apparatus according to the third embodiment when the 2m-times accumulation sensitivity increase operation is changed to the 2n-times accumulation sensitivity increase operation.

As illustrated in FIG. 30, the CCD 1 performs the 4-times (m=2) accumulation sensitivity increase operation until the timing of an image signal x+4, and then performs the 2-times (n=1) accumulation sensitivity increase operation.

The 2-times accumulation sensitivity increase operation begins from the timing of an image signal x+5. At the timing of an image signal x+6, an image signal X+4 in the 4-times accumulation sensitivity increase operation and an image signal x+6 in the 2-times accumulation sensitivity increase operation are supplied to the recursive NR circuit 5.

However, the recursive NR circuit 5 cannot properly operate because it performs the arithmetic operation using the two signals with different amplitudes. Consequently, a signal with uncomfortable feeling is output from the recursive NR circuit 5.

Thus, at the timing of the image signal x+6 after two vertical scanning periods from the change of operation, the cyclic coefficient K is set to be "1" so that the image signal from the CCD 1 is output.

In this way, even when the 2m-times accumulation sensitivity increase operation is changed to the 2n-times accumulation sensitivity increase operation, the cyclic coefficient after 2n vertical scanning periods from this change is set to be "1". Thereby, the recursive NR circuit 5 can be prevented from the erroneous operation, and the change from the 2m-times accumulation sensitivity increase operation to the 2n-times accumulation sensitivity increase operation can be made without any uncomfortable feeling.

Next, the operation timing of this imaging apparatus when the 2n-times (n is an integer of "1" or more) accumulation sensitivity increase operation is changed to the normal operation will be described with reference to FIG. 31.

Figure 31:
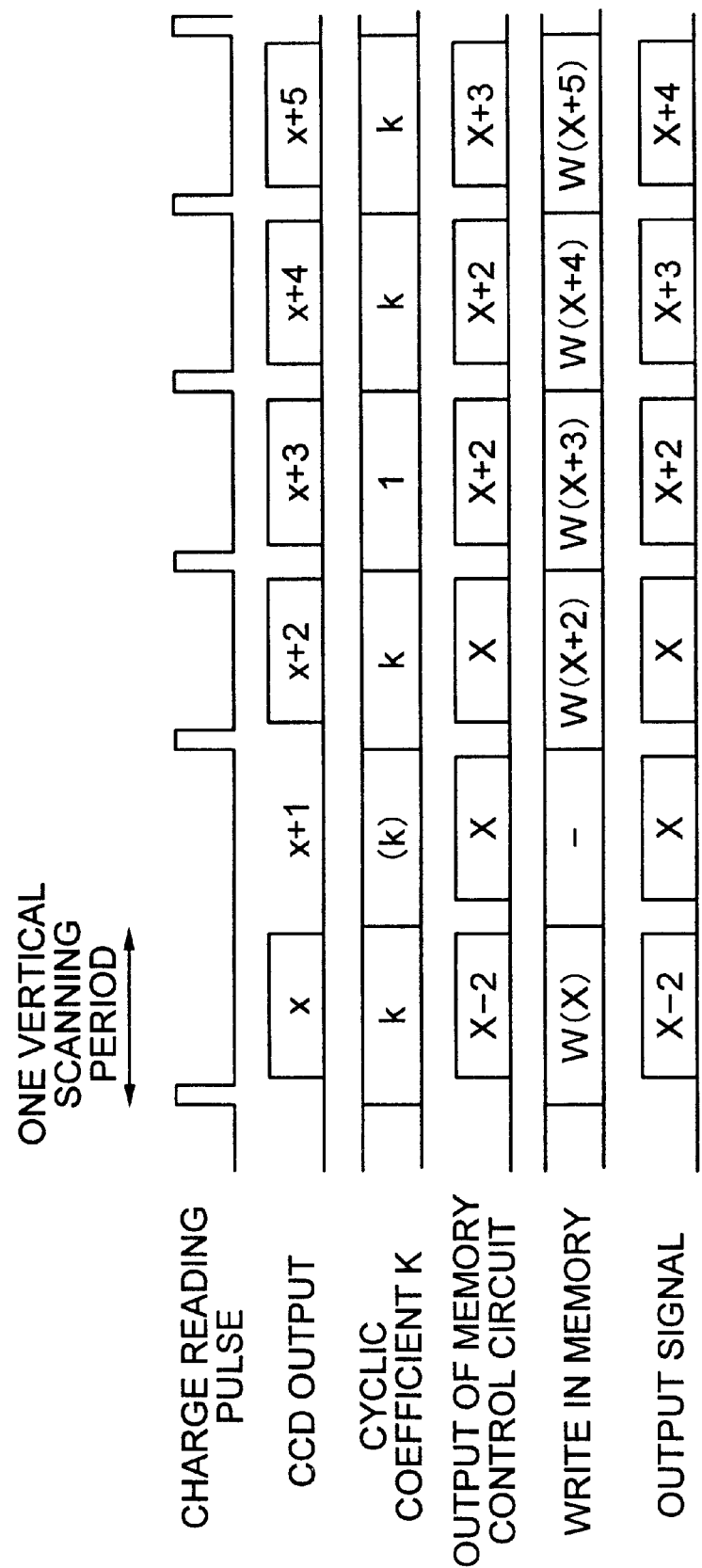
FIG. 31 is a timing chart showing the operation timing of the imaging apparatus according to the third embodiment when the 2n-times accumulation sensitivity increase operation is changed to the normal operation.

As illustrated in FIG. 31, the CCD 1 performs the 2-times (n=1) accumulation sensitivity increase operation until the timing of an image signal x+2, and then performs the normal operation.

The normal operation begins from the timing of an image signal x+3. At the timing of the image signal x+3, an image signal X+1 should be essentially supplied to the recursive NR circuit 5. However, since the 2-times (n=1) accumulation sensitivity increase operation is performed during the accumulation sensitivity increase operation, the operation is performed using only the one-field signals of the interlaced signal. As a result, the image signal X+1 is not the correct signal which has just been written to the memory 9. Therefore, the recursive NR circuit 5 cannot properly operate because it performs the arithmetic operation using the incorrect signal, so that a signal with uncomfortable feeling is output from the recursive NR circuit 5.

Thus, at the timing of the image signal x+3 after one vertical scanning period from the change of operation, the cyclic coefficient K is set to be "1" so that the image signal from the CCD 1 is output.

The memory control circuit 8 reads out the signal X+2 from the memory 9 in order to output the signal X+2 as the second output signal.

In this way, even when the 2n-times accumulation sensitivity increase operation is changed to the normal operation, the cyclic coefficient K in one vertical scanning period after one vertical scanning period from this change is set to be "1". Thereby, the recursive NR circuit 5 can be prevented from the erroneous operation, and the change from the 2n-times accumulation sensitivity increase operation to the normal operation can be made without any uncomfortable feeling.

Figure 32:
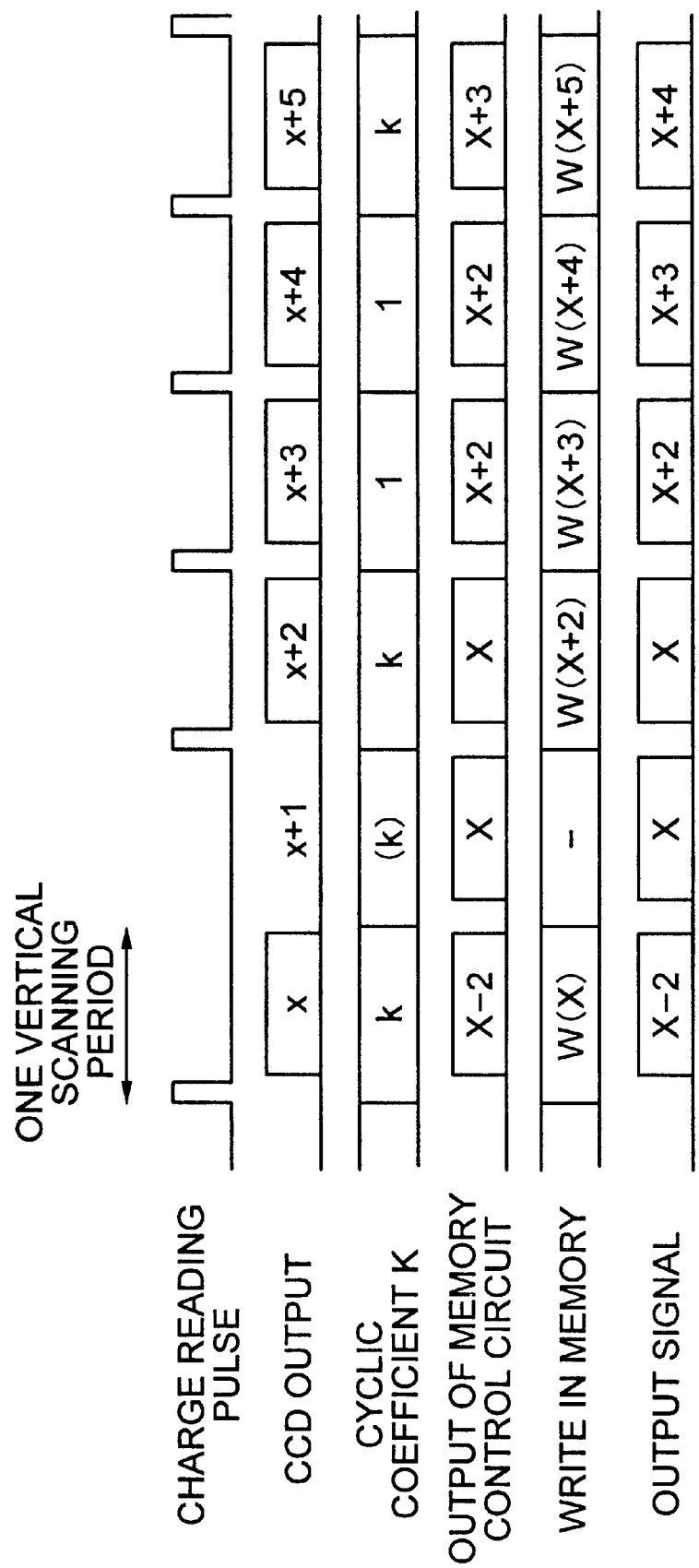
FIG. 32 is a timing chart showing the operation timing of the imaging apparatus according to the third embodiment when the 2n-times accumulation sensitivity increase operation is changed to the normal operation.

Next, another operation timing of this imaging apparatus when the 2n-times (n is an integer of "1" or more) accumulation sensitivity increase operation is changed to the normal operation will be described with reference to FIG. 32.

According to the operation timing shown in FIG. 31, a signal X+3 written to the memory 9 is an image signal x+3 from the CCD 1, and an image signal X+4 is a signal the noise component of which is reduced in the recursive NR circuit 5. As a result, the signal between the fields of the interlaced signal has uncomfortable feeling.

Thus, at the timings of image signals x+3 and x+4 in two vertical scanning periods after one vertical scanning period from the change of operation, the cyclic coefficient K is set to be "1" so that the image signal from the CCD 1 is output.

In this way, even when the 2n-times accumulation sensitivity increase operation is changed to the normal operation, the cyclic coefficient K is set to be "1" at the timings of the image signals in two vertical scanning periods after one vertical scanning period from the change of operation. Thereby, the recursive NR circuit 5 can be prevented from the erroneous operation, and the change from the 2n-times accumulation sensitivity increase operation to the normal operation can be made without any uncomfortable feeling.

Next, still another operation timing of this imaging apparatus when 2n-times (n is an integer of "1" or more) accumulation sensitivity increase operation is changed to the normal operation will be described with reference to FIG. 33.

Figure 33:
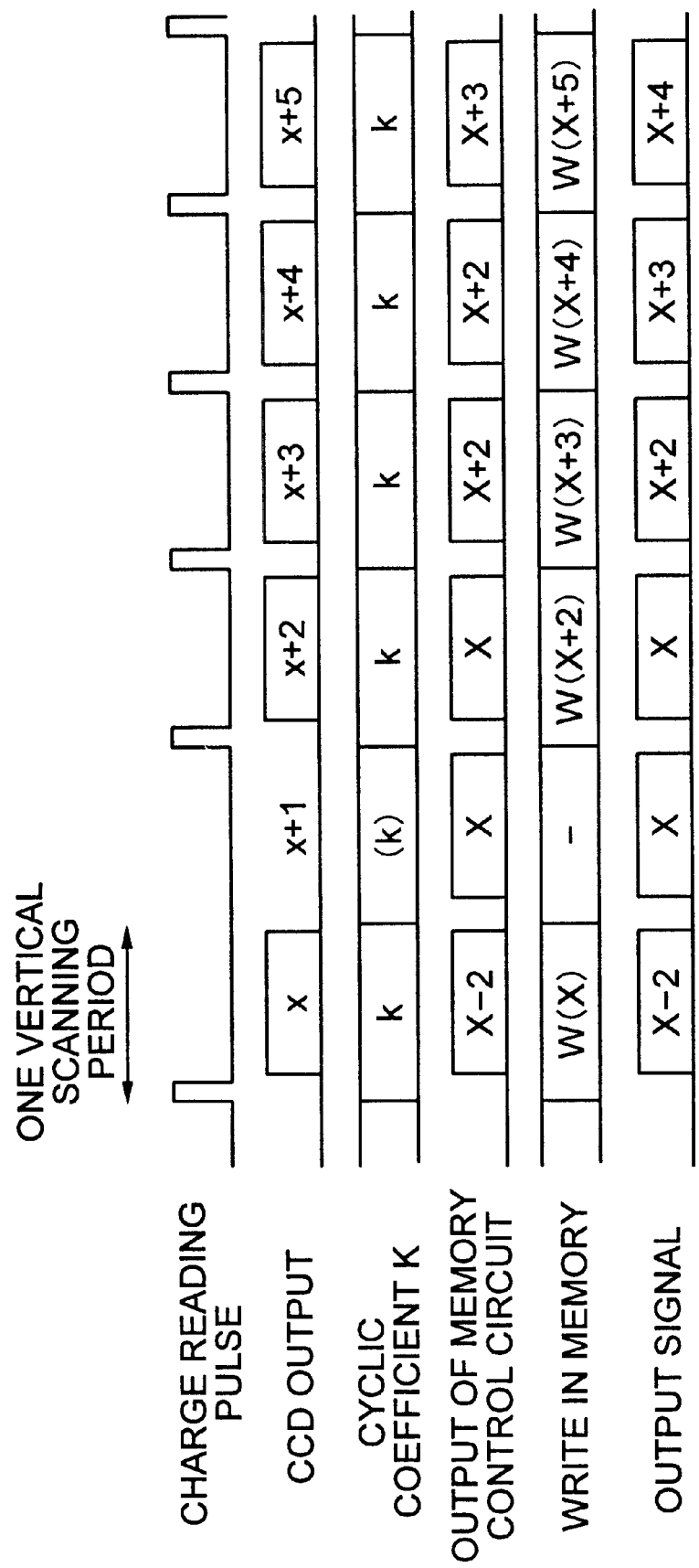
FIG. 33 is a timing chart showing the operation timing of the imaging apparatus according to the third embodiment when the 2n-times accumulation sensitivity increase operation is changed to the normal operation.

As illustrated in FIG. 33, the CCD 1 performs the 2-times (n=1) accumulation sensitivity increase operation until the timing of an image signal x+2, and then performs the normal operation.

The normal operation begins from the timing of an image signal x+3. Since there is no cyclic signal corresponding to the timing of the image signal x+3, a signal X+2 of the opposite field which has just been written to the memory 9 is output from the memory control circuit 8.

Thus, at the timing of the image signal x+3, the cyclic coefficient K is maintained to be k, and the noise reduction can be performed intermittently without any uncomfortable feeling.

In this way, even when the 2n-times accumulation sensitivity increase operation is changed to the normal operation, the opposite-field signal is output as the cyclic data in one vertical scanning period after one vertical scanning period from this change. Thereby, the recursive NR circuit 5 can be prevented from the erroneous operation, and the change from 2n-times accumulation sensitivity increase operation to the normal operation can be made without any uncomfortable feeling.

Another imaging apparatus according to this embodiment will be described with reference to FIG. 34. In the imaging apparatus shown in FIG. 34, the same blocks as those of the imaging apparatus shown in FIG. 1 are identified by the same reference numerals, and their constructions and operations will not be described.

Figure 34:
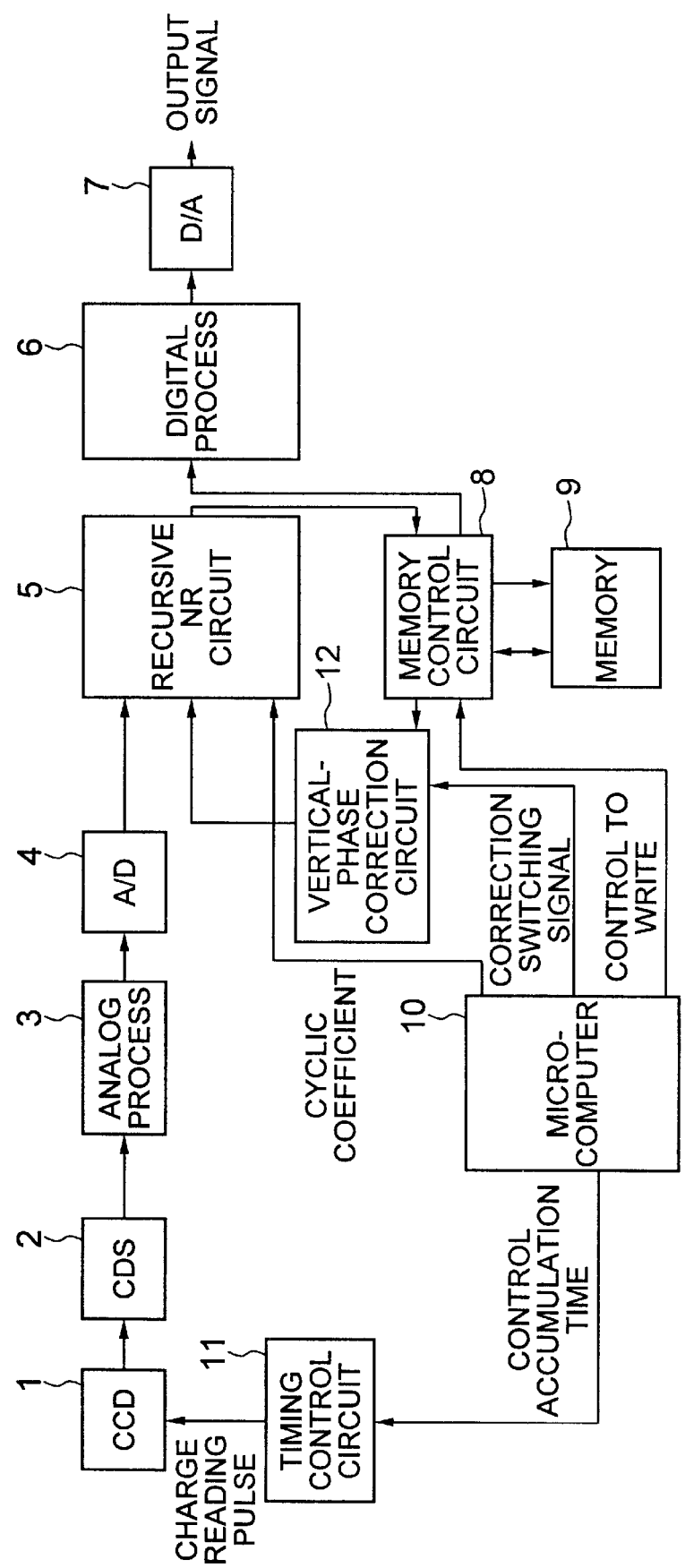
FIG. 34 is a block diagram showing a modification of the imaging apparatus according to the third embodiment.

The imaging apparatus shown in FIG. 34 includes the vertical-phase correction circuit 12 that performs the vertical-phase correction process in which the ½-line spatial phase shift is corrected to the image signal of the opposite field read out by the memory control circuit 8, to supply the vertical-phase-correction processed image signal to the recursive NR circuit 5.

The vertical-phase correction circuit 12, as shown in FIG. 10, includes: the memory 13 for delaying by one horizontal scanning period the image signal read out by the memory control circuit 8; the adder 14 for adding the image signal read out by the memory control circuit 8 and the image signal delayed by one horizontal scanning period by the line memory 13 and diving the sum by "2"; and the selector 15 for switching the output of the adder 14 and the image signal read out by the memory control circuit 8 in accordance with the correction switching signal from the microcomputer 10.

Next, the operation timing of this imaging apparatus when the 2n-times accumulation sensitivity increase operation is changed to the normal operation will be described with reference to FIG. 35.

Figure 35:
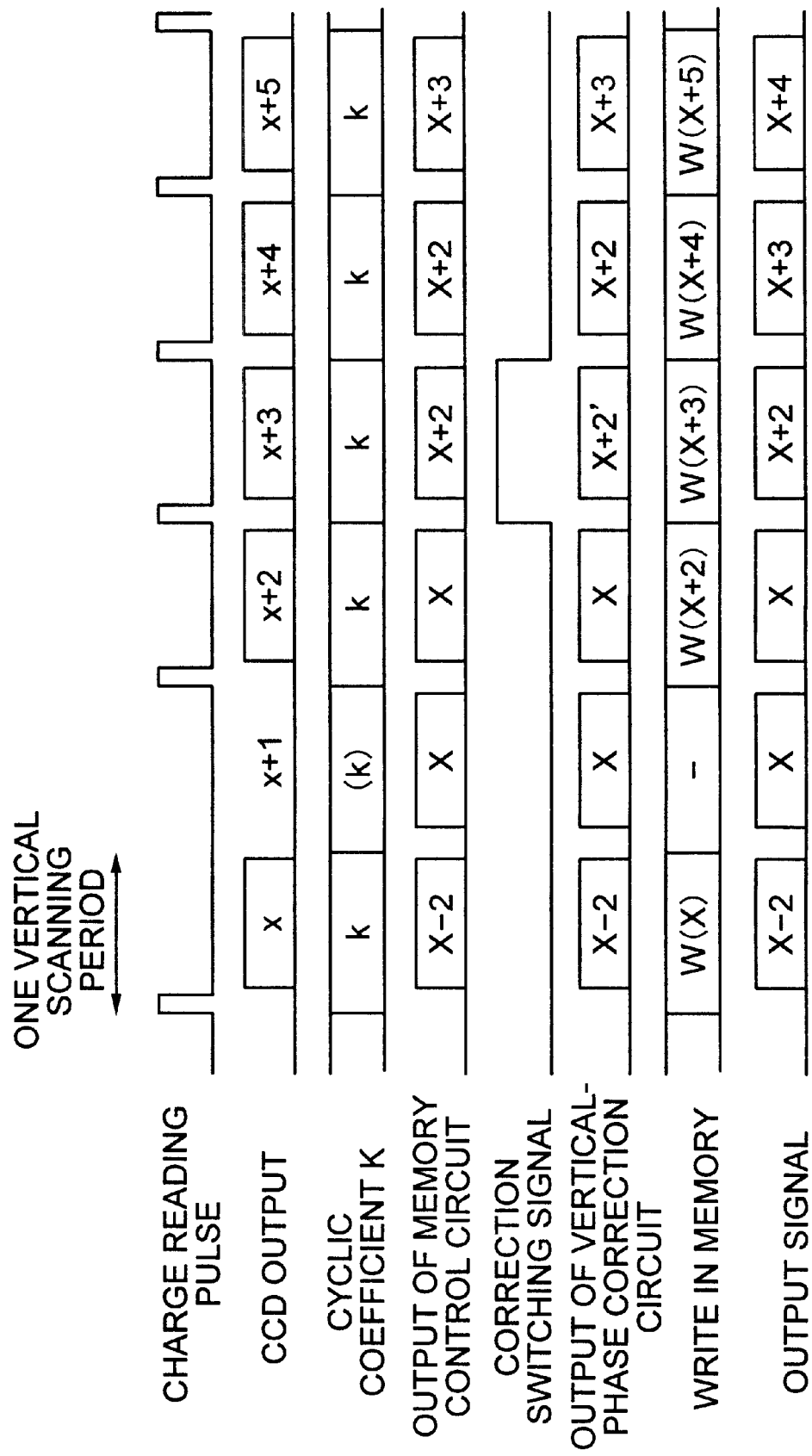
FIG. 35 is a timing chart showing the operation timing of the imaging apparatus shown in FIG. 34 when the 2n-times accumulation sensitivity increase operation is changed to the normal operation.

As illustrated in FIG. 35, the CCD 1 performs the 2-times (n=1) accumulation sensitivity increase operation until the timing of an image signal x+2, and then performs the normal operation.

The normal operation begins from the timing of an image signal x+3. Since there is no cyclic signal corresponding to the timing of the image signal x+3, a signal X+2 of the opposite field which has just been written to the memory 9 is output from the memory control circuit 8.

Since the signal X+2 is the opposite-field signal of the interlaced signal, the vertical phase of the signal X+2 deviates by ½ line from the image signal x+3.

Thus, a ½-line corrected signal X+2' is output from the vertical-phase correction circuit 12 by changing the correction switching signal at the timing of the image signal x+3. Consequently, at the timing of the image signal x+3, the cyclic coefficient K is maintained to be k and the ½-line vertical phase shift is corrected, so that the noise reduction can be performed without any uncomfortable feeling.

In this way, even when the 2n-times accumulation sensitivity increase operation is changed to the normal operation, the opposite-field signal is output as the cyclic data in one vertical scanning period after one vertical scanning period from this change to correct the ½-line vertical phase shift. Thereby, the recursive NR circuit 5 can be prevented from the erroneous operation, and the change from the 2n-times accumulation sensitivity increase operation to the normal operation can be made without any uncomfortable feeling.

Next, another operation timing of this imaging apparatus when the 2n-times(n is an integer of "1" or more) accumulation sensitivity increase operation is changed to the normal operation will be described with reference to FIG. 36.

Figure 36:
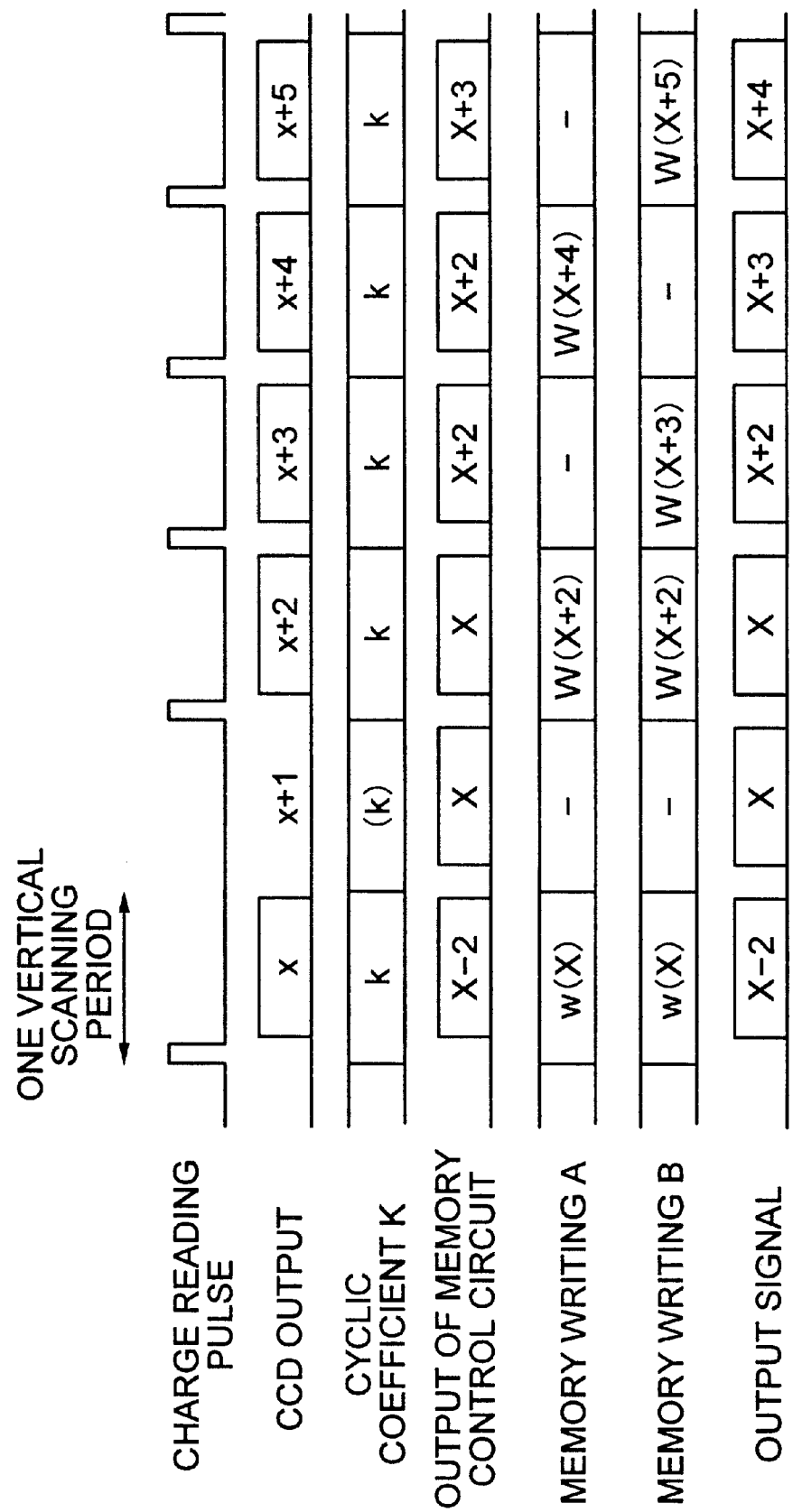
FIG. 36 is a timing chart showing the operation timing of the imaging apparatus according to the third embodiment when the 2n-times accumulation sensitivity increase operation is changed to the normal operation.

As illustrated in FIG. 36, the CCD 1 performs the 2-times (n=1) accumulation sensitivity increase operation until the timing of an image signal x+2, and then performs the normal operation.

During the accumulation sensitivity increase operation, the memory writing A and the memory writing B which respectively correspond to the two fields are always controlled so that the field signals are written to the two memories.

The normal operation begins from the timing of an image signal x+3. Since a signal X+2 is previously written to the memory 9 at this timing, the recursive NR process is performed using the image signal x+3 and the signal X+2. Thereby, at the timing of the image signal x+3, the cyclic coefficient K is maintained to be k and the noise reduction can be intermittently made without any uncomfortable feeling.

Thus, the signals are written to both memories corresponding to the two fields during the accumulation sensitivity increase operation. Thereby, even when the 2n-times accumulation sensitivity increase operation is changed to the normal operation, the recursive NR circuit 5 can be prevented from the erroneous operation, and the change from the 2n-times accumulation sensitivity increase operation to the normal operation can be made without any uncomfortable feeling.

Figure 37:
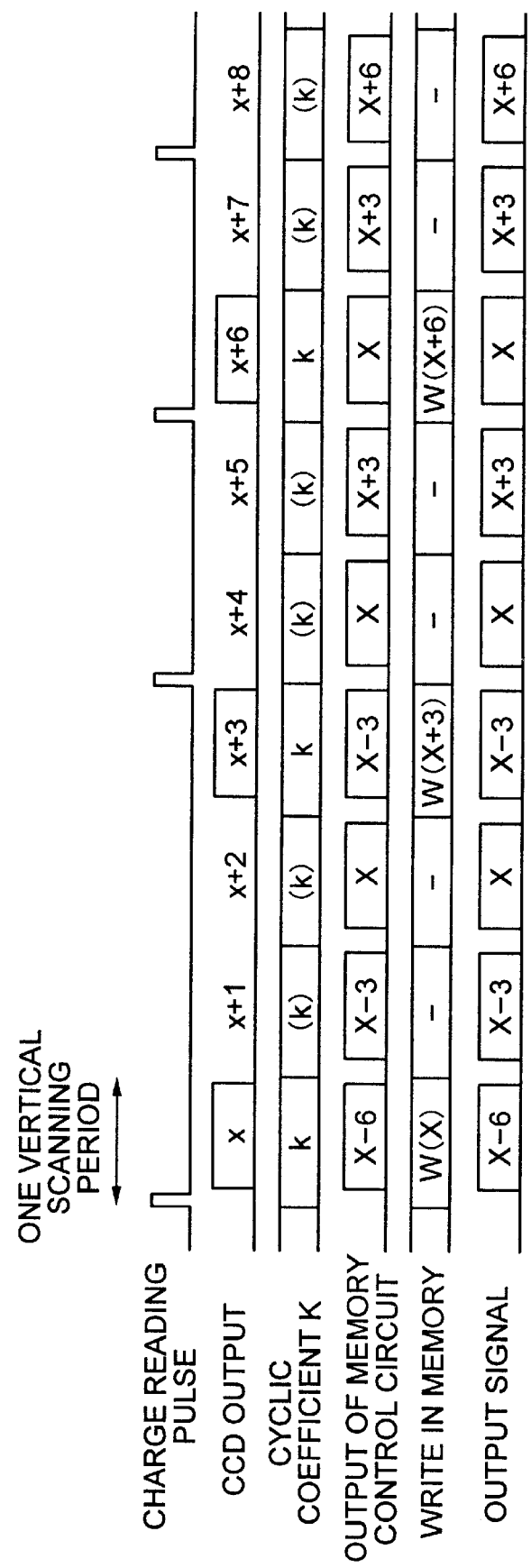
FIG. 37 is a timing chart showing the operation timing of the imaging apparatus according to the third embodiment in the (2n+1)-times accumulation sensitivity increase operation.
Figure 38:
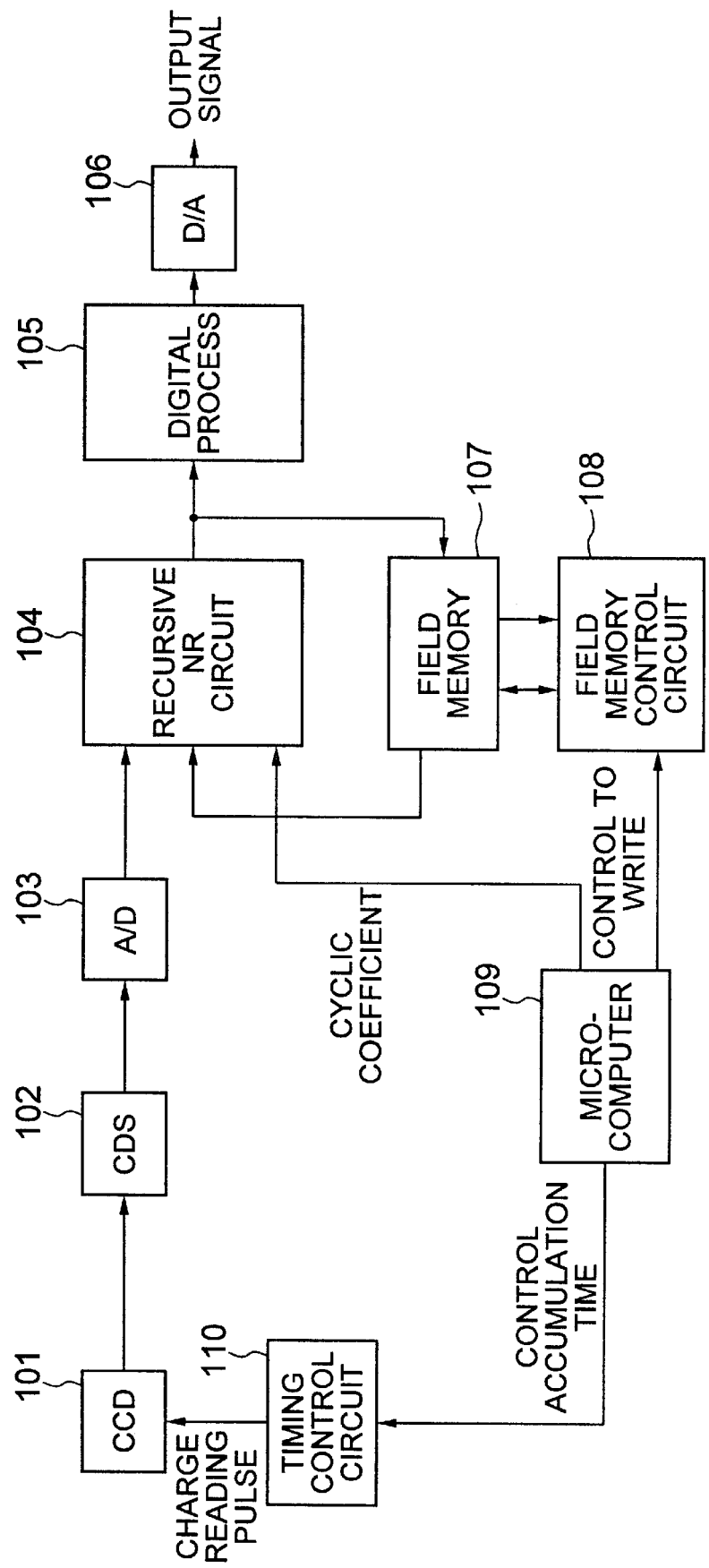
FIG. 38 is a schematic block diagram of a conventional imaging apparatus.
Figure 39:
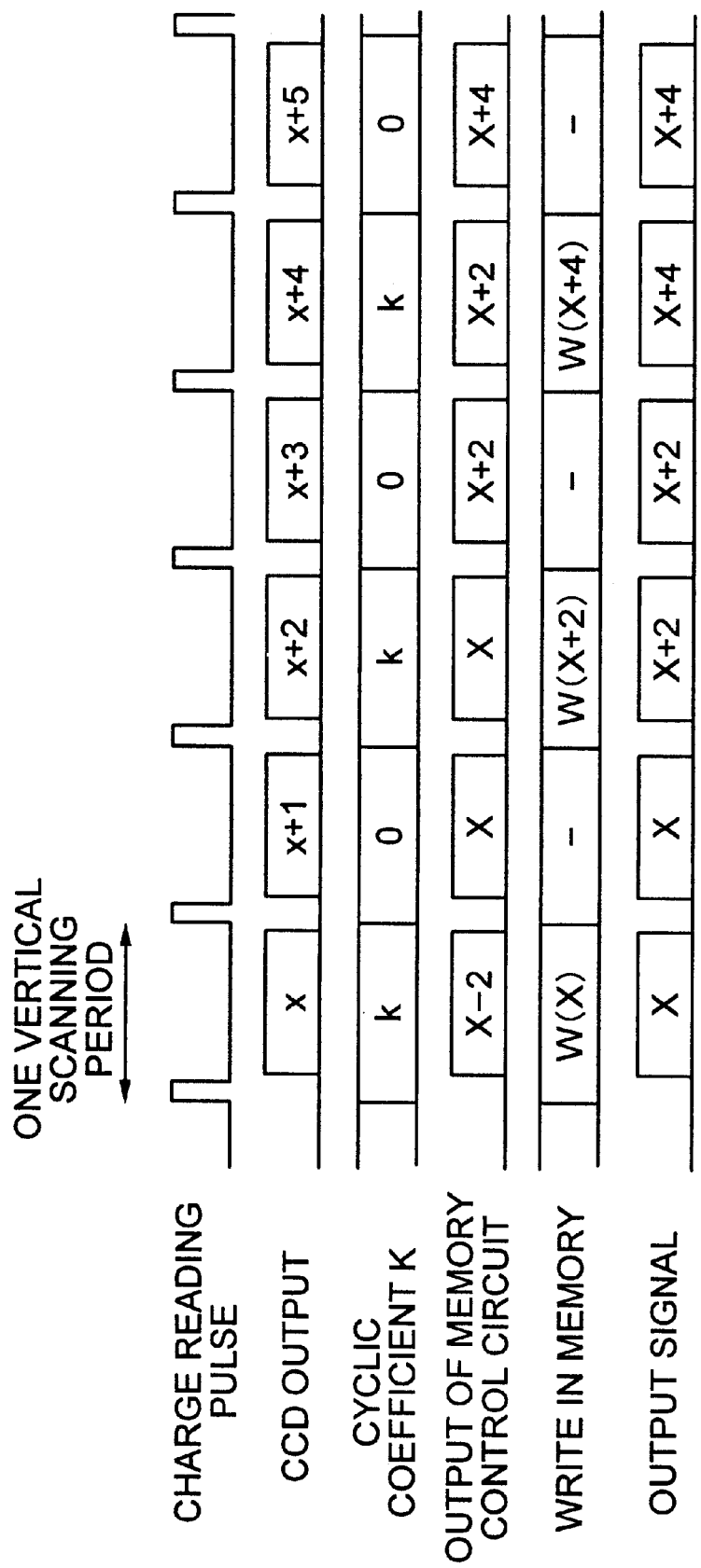
FIG. 39 is a timing chart showing the operation timing of the conventional imaging apparatus in the normal operation.
Figure 40:
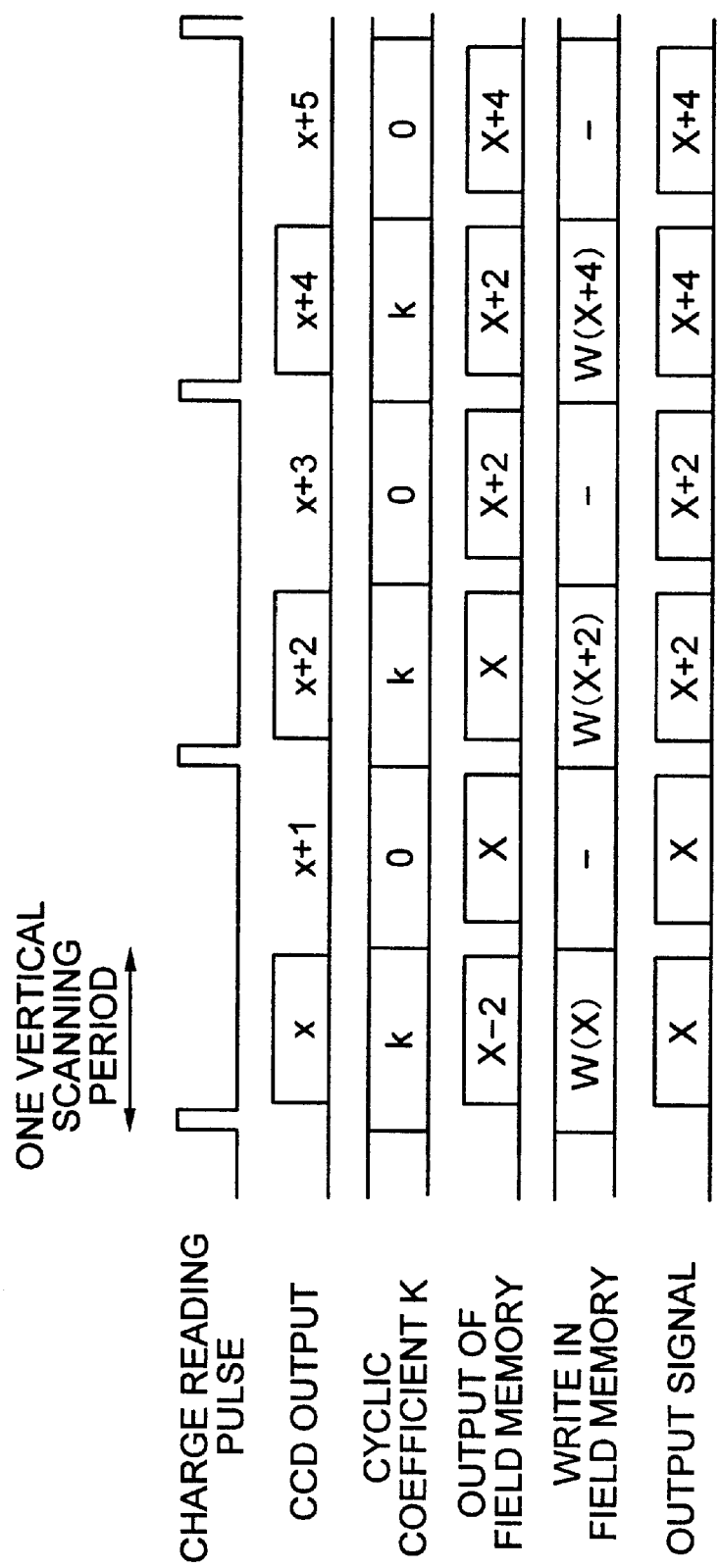
FIG. 40 is a timing chart showing the operation timing of the conventional imaging apparatus in the 2n-times accumulation sensitivity increase operation.

Next, the operation timing of this imaging apparatus in the (2n+1) (n is an integer of "1" or more) accumulation sensitivity increase operation will be described with reference to FIG. 37.

At the timing when an image signal x is output from the CCD 1, the cyclic coefficient K which is input from the microcomputer 10 to the recursive NR circuit 5 is set to be k. The memory control circuit 8 outputs as the first output signal a signal X−6 which is the most adjacent signal with the same vertical phase as the image signal x in the interlaced signal. The recursive NR circuit 5 performs the arithmetic operation using the image signal x and the first output signal X−6. The memory control circuit 8 writes the output signal X of the recursive NR circuit 5 to the memory 9 and outputs the signal X−6 to the digital process circuit 6 as the second output signal.

At the timings of image signals x+1 and x+2, the memory control circuit 8 outputs the output signals X−3 and X as the second output signal, respectively.

Thus, even when the (2n+1) accumulation sensitivity increase operation is performed, the vertical resolution of the output signal can be prevented from deterioration, and the recursive NR process can be performed using the interlaced signals with the same vertical phase.

In the first through third embodiments mentioned above, the analog process circuit 3, the recursive NR circuit 5 and the digital process circuit 6 are connected in this order. However, the same effect can be achieved even though the order of the connection of these circuits is changed as in the connection of the recursive NR circuit 5, the analog process circuit 3 and the digital process circuit 6, the connection of the analog process circuit 3, the digital process circuit 6 and the recursive NR circuit 5, or the replacement between the analog process circuit 3 and the digital process circuit 6.

Further, in the first through third embodiments mentioned above, the memory control circuit 8 is used to control the memory 9 to write/read. However, it is of course possible to use such an arrangement that the memory 9 directly performs the write/read operation without using the memory control circuit 8.

What is claimed is:

1. An imaging apparatus comprising:

imaging means for accumulating an image signal by an n-times long time accumulation (n is an integer of "1" or more);

timing control means for controlling to read out the image signal stored in the imaging means according to the n-times long time accumulation;

memory means for storing the image signal read out by the timing control means for one frame period or more;

memory control means for controlling the memory means; and recursive noise reduction means for performing a noise reduction process on the basis of the image signal read out from the imaging means and the one-frame-period-or-more delayed image signal read out from the memory means to generate a noise-reduction processed image signal, wherein when the imaging means performs a 2n-times long time accumulation, in a vertical scanning period in which the image signal is output from the imaging means, the memory control means writes to the memory means the image signal generated by the recursive noise reduction means, and the recursive noise reduction means outputs the generated image signal as an output signal as it is; and in a vertical scanning period in which the image signal is not output from the imaging means, the memory control means inhibits the writing of the image signal generated by the recursive noise reduction means to the memory means, and the recursive noise reduction means outputs the image signal read out from the memory means, as the output signal as it is.

2. An imaging apparatus set forth in claim 1, wherein when the long time accumulation in the imaging means changes from one-time to 2n-times, after 2n vertical scanning periods from this change, the recursive noise reduction means outputs the image signal from the imaging means as the output signal as it is, without performing the noise reduction process.

3. An imaging apparatus set forth in claim 1, wherein when the long time accumulation in the imaging means changes from 2m-times (m is an integer of "1" or more, m≠n) to 2n-times, after 2n vertical scanning periods from this change, the recursive noise reduction means outputs the image signal from the imaging means as the output signal as it is, without performing the noise reduction process.

4. An imaging apparatus set forth in claim 1, wherein when the long time accumulation in the imaging means changes from 2n-times to one-time, in a vertical scanning period after one vertical scanning period from this change, the recursive noise reduction means outputs the image signal from the imaging means as the output signal as it is, without performing the noise reduction process.

5. An imaging apparatus set forth in claim 1, wherein when the long time accumulation in the imaging means changes from 2n-times to one-time, in two or more vertical scanning periods after one vertical scanning period from this change, the recursive noise reduction means outputs the image signal from the imaging means as the output signal as it is, without performing the noise reduction process.

6. An imaging apparatus set forth in claim 1, wherein when the long time accumulation in the imaging means changes from 2n-times to one-time, in a vertical scanning period after one vertical scanning period from this change, the memory control means reads out an image signal of an opposite field stored to the memory means, and makes the recursive noise reduction means perform the noise reduction process on the basis of the read-out image signal of the opposite field and the image signal from the imaging means.

7. An imaging apparatus set forth in claim 1, wherein when the long time accumulation in the imaging means changes from 2n-times to one-time, in a vertical scanning period after one vertical scanning period from this change, the memory control means reads out an image signal of an opposite field stored in the memory means, makes vertical-phase correction means perform a vertical-phase correction process to correct the read-out image signal of the opposite field for ½ line spatial phase shift, and makes the recursive noise reduction means perform the noise reduction process on the basis of the vertical-phase-correction processed image signal and the image signal from the imaging means.

8. An imaging apparatus set forth in claim 1, further comprising two of the memory means, wherein when the imaging means performs the long time accumulation, in a vertical scanning period in which the image signal is output from the imaging means, the memory control means writes the image signal generated by the recursive noise reduction means to each memory means.

9. An imaging apparatus set forth in claim 1, wherein when the imaging means performs a (2n+1)-times long time accumulation, in a vertical scanning period in which the image signal is output from the imaging means, the memory control means writes the image signal generated from the recursive noise reduction means to the memory means, and the recursive noise reduction means outputs the generated image signal as the output signal as it is; and in a vertical scanning period in which the image signal is not output from the imaging means, the memory control means inhibits the writing of the image signal generated from the recursive noise reduction means to the memory means, and the recursive noise reduction means outputs the image signal read out from the memory means, as the output signal as it is, without performing the noise reduction process.

10. An imaging apparatus comprising:

imaging means for accumulating an image signal by an n-times long time accumulation (n is an integer of "1" or more);

timing control means for controlling to read out the image signal stored in the imaging means according to the n-times long time accumulation;

memory means for storing the image signal read out by the timing control means for one frame period or more;

memory control means for controlling the memory means; and recursive noise reduction means for performing a noise reduction process on the basis of the image signal read out from the imaging means and the one-frame-period-or-more delayed image signal read out from the memory means to generate a noise-reduced image signal, and for outputting the generated image signal to the memory control means, wherein when the imaging means performs a 2n-times long time accumulation, in a vertical scanning period in which the image signal is output from the imaging means, the memory control means reads out the one-frame-period-or-more delayed image signal stored in the memory means, outputs the read-out image signal, and writes the image signal generated by the recursive noise reduction means to the memory means; and in a vertical scanning period in which the image signal is not output from the imaging means, the memory control means inhibits the writing of the image signal generated by the recursive noise reduction means to the memory means, reads out the one-frame-period-or-more delayed image signal stored in the memory means, and outputs the read-out image signal as an output signal as it is.

11. An imaging apparatus set forth in claim 10, wherein when the long time accumulation in the imaging means changes from one-time to 2n-times, after 2n vertical scanning periods from this change, the recursive noise reduction means reads out the image signal stored in the memory means, and outputs the read-out image signal as the output signal as it is, without performing the noise reduction process by the recursive noise reduction means.

12. An imaging apparatus set forth in claim 10, wherein when the long time accumulation in the imaging means changes from 2m-times (m is an integer of "1" or more, m≠n) to 2n-times, after 2n vertical scanning periods from this change, the recursive noise reduction means reads out the image signal stored in the memory means, and outputs the read-out image signal as the output signal as it is, without performing the noise reduction process by the recursive noise reduction means.

13. An imaging apparatus set forth in claim 10, wherein when the long time accumulation in the imaging means changes from 2n-times to one-time, in one vertical scanning period after one vertical scanning period from this change, the recursive noise reduction means reads out the image signal stored in the memory means, and outputs the read-out image signal as the output signal as it is, without performing the noise reduction process by the recursive noise reduction means.

14. An imaging apparatus set forth in claim 10, wherein when the long time accumulation in the imaging means changes from 2n-times to one-time, in two vertical scanning periods or more after one vertical scanning period from this change, the recursive noise reduction means reads out the image signal stored in the memory means, and outputs the read-out image signal as the output signal as it is, without performing the noise reduction process by the recursive noise reduction means.

15. An imaging apparatus set forth in claim 10, wherein when the long time accumulation in the imaging means changes from 2n-times to one-time, in a vertical scanning period after one vertical scanning period from this change, the memory control means reads out an image signal of an opposite field stored to the memory means, and makes the recursive noise reduction means perform the noise reduction process on the basis of the read-out image signal of the opposite field and the image signal from the imaging means.

16. An imaging apparatus set forth in claim 10, wherein when the long time accumulation in the imaging means changes from 2n-times to one-time, in one vertical scanning period after one vertical scanning period from this change, the memory control means reads out an image signal of an opposite field stored in the memory means, makes vertical-phase correction means perform a vertical-phase correction process to correct the read-out image signal of the opposite field for ½ line spatial phase shift, and makes the recursive noise reduction means perform the noise reduction process on the basis of the vertical-phase-correction processed image signal and the image signal from the imaging means.

17. An imaging apparatus set forth in claim 10, further comprising two of the memory means, wherein
when the imaging means performs the long time accumulation, in a vertical scanning period in which the image signal is output from the imaging means, the memory control means writes the image signal generated by the recursive noise reduction means to each memory means.

18. An imaging apparatus set forth in claim 10, wherein when the imaging means performs a (2n+1)-times long time accumulation, in a vertical scanning period in which the image signal is output from the imaging means, the memory control means reads out the one-frame-or-more delayed image signal stored in the memory means, outputs the read-out image signal as an output signal as it is, and writes the image signal generated from the recursive noise reduction means to the memory means; and
in a vertical scanning period in which the image signal is not output from the imaging means, the memory control means inhibits the writing of the image signal generated from the recursive noise reduction means to the memory means, and the recursive noise reduction means outputs the image signal read out from the memory means, as the output signal as it is.

19. An imaging apparatus comprising:
imaging means for accumulating an image signal by an n-times long time accumulation (n is an integer of "1" or more);
timing control means for controlling to read out the image signal stored in the imaging means according to the n-times long time accumulation;
memory means for storing the image signal read out by the timing control means for one frame period or more, and having first and second outputs;
memory control means for controlling the memory means; and
recursive noise reduction means for performing a noise reduction process on the basis of the image signal read out from the imaging means and the one-frame period or more delayed image signal read out from the first output of the memory means to generate a noise-reduced image signal, and outputs the noise-reduced image signal to the memory control means, wherein
when the imaging means performs a 2n-times long time accumulation, in a vertical scanning period in which the image signal is output from the imaging means, the memory control means writes to the memory means the image signal generated by the recursive noise reduction means, reads out the one-frame-period-or-more delayed image signal from the second output of the memory means, and outputs the read-out image signal as an output signal as it is; and
in a vertical scanning period in which the image signal is not output from the imaging means, the memory control means inhibits the writing of the image signal generated by the recursive noise reduction means to the memory means, reads out the one-frame-period-or-more delayed image signal from the second output of the memory means, and outputs the read-out image signal as an output signal as it is.

20. An imaging apparatus set forth in claim 19, wherein when the long time accumulation in the imaging means changes from one-time to 2n-times, after 2n vertical scanning periods from this change, the memory control means reads out from the second output the image signal stored in the memory means, and output the read-out image signal as the output signal as it is, without performing the noise reduction process by the recursive noise reduction means.

21. An imaging apparatus set forth in claim 19, wherein when the long time accumulation in the imaging means changes from 2m-times (m is an integer of "1" or more, m≠n) to 2n-times, after 2n vertical scanning periods from this change, the memory control means reads out from the second output the image signal stored in the memory means, and outputs the read-out image signal as the output signal as it is, without performing the noise reduction process by the recursive noise reduction means.

22. An imaging apparatus set forth in claim 19, wherein when the long time accumulation in the imaging means changes from 2n-times to one-time, in one vertical scanning period after one vertical scanning period from this change, the memory control means reads out from the second output the image signal stored in the memory means, and outputs the read-out image signal as the output signal as it is, without performing the noise reduction process by the recursive noise reduction means.

23. An imaging apparatus set forth in claim 19, wherein when the long time accumulation in the imaging means changes from 2n-times to one-time, in two vertical scanning periods or more after one vertical scanning period from this change, the memory control means reads out from the second output the image signal stored in the memory means, and outputs the read-out image signal as the output signal as it is, without performing the noise reduction process by the recursive noise reduction means.

24. An imaging apparatus set forth in claim 19, wherein when the long time accumulation in the imaging means changes from 2n-times to one-time, in a vertical scanning period after one vertical scanning period from this change, the memory control means reads out an image signal of an opposite field stored to the memory means, and makes the recursive noise reduction means perform the noise reduction process on the basis of the read-out image signal of the opposite field and the image signal from the imaging means.

25. An imaging apparatus set forth in claim 19, wherein when the long time accumulation in the imaging means
(1) changes from 2n-times to one-time, in one vertical scanning period after one vertical scanning period from this change, the memory control means reads out an image signal of an opposite field stored in the memory means, makes vertical-phase correction means perform a vertical-phase correction process to correct the read-out image signal of the opposite field for ½ line spatial phase shift, and makes the recursive noise reduction means perform the noise reduction process on the basis of the vertical-phase-correction processed image signal and the image signal from the imaging means.

26. An imaging apparatus set forth in claim 19, further comprising two of the memory means, wherein when the imaging means performs the long time accumulation, in a vertical scanning period in which the image signal is output from the imaging means, the memory control means writes the image signal generated by the recursive noise reduction means to each memory means.

27. An imaging apparatus set forth in claim 19, wherein when the imaging means performs a (2n+1)-times long time accumulation, in a vertical scanning period in which the image signal is output from the imaging means, the memory control means writes the image signal generated by the recursive noise reduction means to the memory means, reads out the one-frame-or-more delayed image signal stored in the memory means from the second output, and outputs the read-out image signal as an output signal as it is; and in a vertical scanning period in which the image signal is not output from the imaging means, the memory control means inhibits the writing of the image signal generated from the recursive noise reduction means to the memory means, reads out the one-frame-or-more delayed image signal stored in the memory means from the second output, and outputs the read-out image signal as the output signal as it is.

* * * * *